US009800899B2

(12) United States Patent
Puri et al.

(10) Patent No.: US 9,800,899 B2
(45) Date of Patent: Oct. 24, 2017

(54) CONTENT ADAPTIVE QUALITY RESTORATION FILTERING FOR NEXT GENERATION VIDEO CODING

(71) Applicant: Intel Corporation, Santa Clara, CA (US)

(72) Inventors: Atul Puri, Redmond, WA (US); Daniel Socek, Miami, FL (US)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 14/334,184

(22) Filed: Jul. 17, 2014

(65) Prior Publication Data

US 2014/0328414 A1 Nov. 6, 2014

Related U.S. Application Data

(63) Continuation-in-part of application No. PCT/US2013/078114, filed on Dec. 27, 2013, and a
(Continued)

(51) Int. Cl.
| | |
|---|---|
| H04N 19/80 | (2014.01) |
| H04N 19/82 | (2014.01) |
| H04N 19/176 | (2014.01) |
| H04N 19/119 | (2014.01) |
| H04N 19/147 | (2014.01) |
| H04N 19/46 | (2014.01) |
| H04N 19/122 | (2014.01) |
| H04N 19/136 | (2014.01) |
| H04N 19/85 | (2014.01) |
| H04N 19/12 | (2014.01) |
| H04N 19/172 | (2014.01) |
| H04N 19/44 | (2014.01) |
| H04N 19/513 | (2014.01) |
| H04N 19/61 | (2014.01) |
| H04N 19/91 | (2014.01) |
| H04N 19/573 | (2014.01) |
| H04N 19/105 | (2014.01) |

(Continued)

(52) U.S. Cl.
CPC .......... *H04N 19/82* (2014.11); *H04N 19/105* (2014.11); *H04N 19/119* (2014.11); *H04N 19/12* (2014.11); *H04N 19/122* (2014.11); *H04N 19/136* (2014.11); *H04N 19/139* (2014.11); *H04N 19/147* (2014.11); *H04N 19/172* (2014.11); *H04N 19/176* (2014.11); *H04N 19/44* (2014.11); *H04N 19/46* (2014.11); *H04N 19/513* (2014.11); *H04N 19/527* (2014.11); *H04N 19/573* (2014.11); *H04N 19/61* (2014.11); *H04N 19/85* (2014.11); *H04N 19/91* (2014.11)

(58) Field of Classification Search
None
See application file for complete search history.

(56) References Cited

U.S. PATENT DOCUMENTS 4,736,448 A * 4/1988 Umemura ................. G06T 5/20
382/260
6,828,967 B1 * 12/2004 King ....................... G06T 9/007
345/428

(Continued)

*Primary Examiner* — Mohammad J Rahman
(74) *Attorney, Agent, or Firm* — Jordan IP Law, LLC

(57) ABSTRACT

Techniques related to quality restoration filtering for video coding are described.

26 Claims, 30 Drawing Sheets

Related U.S. Application Data continuation-in-part of application No. PCT/US2013/069960, filed on Nov. 13, 2013.

(60) Provisional application No. 61/758,314, filed on Jan. 30, 2013, provisional application No. 61/725,576, filed on Nov. 13, 2012.

(51) Int. Cl.
*H04N 19/139* (2014.01)
*H04N 19/527* (2014.01)

(56) References Cited

U.S. PATENT DOCUMENTS

| | | | | |
|---|---|---|---|---|
| 8,625,681 B2* | 1/2014 | Xu | ........................ | H04N 19/147 375/240.27 |
| 2005/0276510 A1* | 12/2005 | Bosco | ........................ | G06T 5/20 382/275 |
| 2006/0294171 A1* | 12/2006 | Bossen | ................ | H04N 19/139 708/300 |
| 2009/0003435 A1* | 1/2009 | Cho | ........................ | H04N 19/46 375/240.1 |
| 2010/0008417 A1* | 1/2010 | Xu | ........................ | H04N 19/147 375/240.02 |
| 2012/0051438 A1* | 3/2012 | Chong | ................ | H04N 19/176 375/240.25 |
| 2012/0155532 A1* | 6/2012 | Puri | ........................ | H04N 19/70 375/240.02 |
| 2012/0155533 A1* | 6/2012 | Puri | ........................ | H04N 19/176 375/240.02 |
| 2012/0189064 A1* | 7/2012 | Kossentini | ............ | H04N 19/147 375/240.25 |
| 2012/0213293 A1* | 8/2012 | Chong | ............... | H04N 7/26255 375/240.24 |
| 2013/0022107 A1* | 1/2013 | Van der Auwera | ............ | H04N 19/00133 375/240.03 |
| 2013/0101016 A1* | 4/2013 | Chong | ................... | H04N 19/82 375/240.02 |
| 2013/0107973 A1* | 5/2013 | Wang | ..................... | H04N 19/70 375/240.29 |
| 2015/0365703 A1* | 12/2015 | Puri | ..................... | H04N 19/176 375/240.24 |

* cited by examiner

1000

| c(0) | c(1) | c(2) | c(3) | c(4) | c(5) | c(6) | c(7) | c(8) |
|---|---|---|---|---|---|---|---|---|
| c(9) | c(10) | c(11) | c(12) | c(13) | c(14) | c(15) | c(16) | c(17) |
| c(18) | c(19) | c(20) | c(21) | c(22) | c(23) | c(24) | c(25) | c(26) |
| c(27) | c(28) | c(29) | c(30) | c(31) | c(32) | c(33) | c(34) | c(35) |
| c(36) | c(37) | c(38) | c(39) | c(40) | c(41) | c(42) | c(43) | c(44) |
| c(45) | c(46) | c(47) | c(48) | c(49) | c(50) | c(51) | c(52) | c(53) |
| c(54) | c(55) | c(56) | c(57) | c(58) | c(59) | c(60) | c(61) | c(62) |
| c(63) | c(64) | c(65) | c(66) | c(67) | c(68) | c(69) | c(70) | c(71) |
| c(72) | c(73) | c(74) | c(75) | c(76) | c(77) | c(78) | c(79) | c(80) |

FIG. 10

PRIOR ART

1100

| c(0) | c(1) | c(2) | c(3) | c(4) | c(5) | c(6) | c(7) | c(8) |
|---|---|---|---|---|---|---|---|---|
| c(9) | c(10) | c(11) | c(12) | c(13) | c(14) | c(15) | c(16) | c(17) |
| c(18) | c(19) | c(20) | c(21) | c(22) | c(23) | c(24) | c(25) | c(26) |
| c(27) | c(28) | c(29) | c(30) | c(31) | c(32) | c(33) | c(34) | c(35) |
| c(36) | c(37) | c(38) | c(39) | c(40) | c(39) | c(38) | c(37) | c(36) |
| c(35) | c(34) | c(33) | c(32) | c(31) | c(30) | c(29) | c(28) | c(27) |
| c(26) | c(25) | c(24) | c(23) | c(22) | c(21) | c(20) | c(19) | c(18) |
| c(17) | c(16) | c(15) | c(14) | c(13) | c(12) | c(11) | c(10) | c(9) |
| c(8) | c(7) | c(6) | c(5) | c(4) | c(3) | c(2) | c(1) | c(0) |

FIG. 11

PRIOR ART

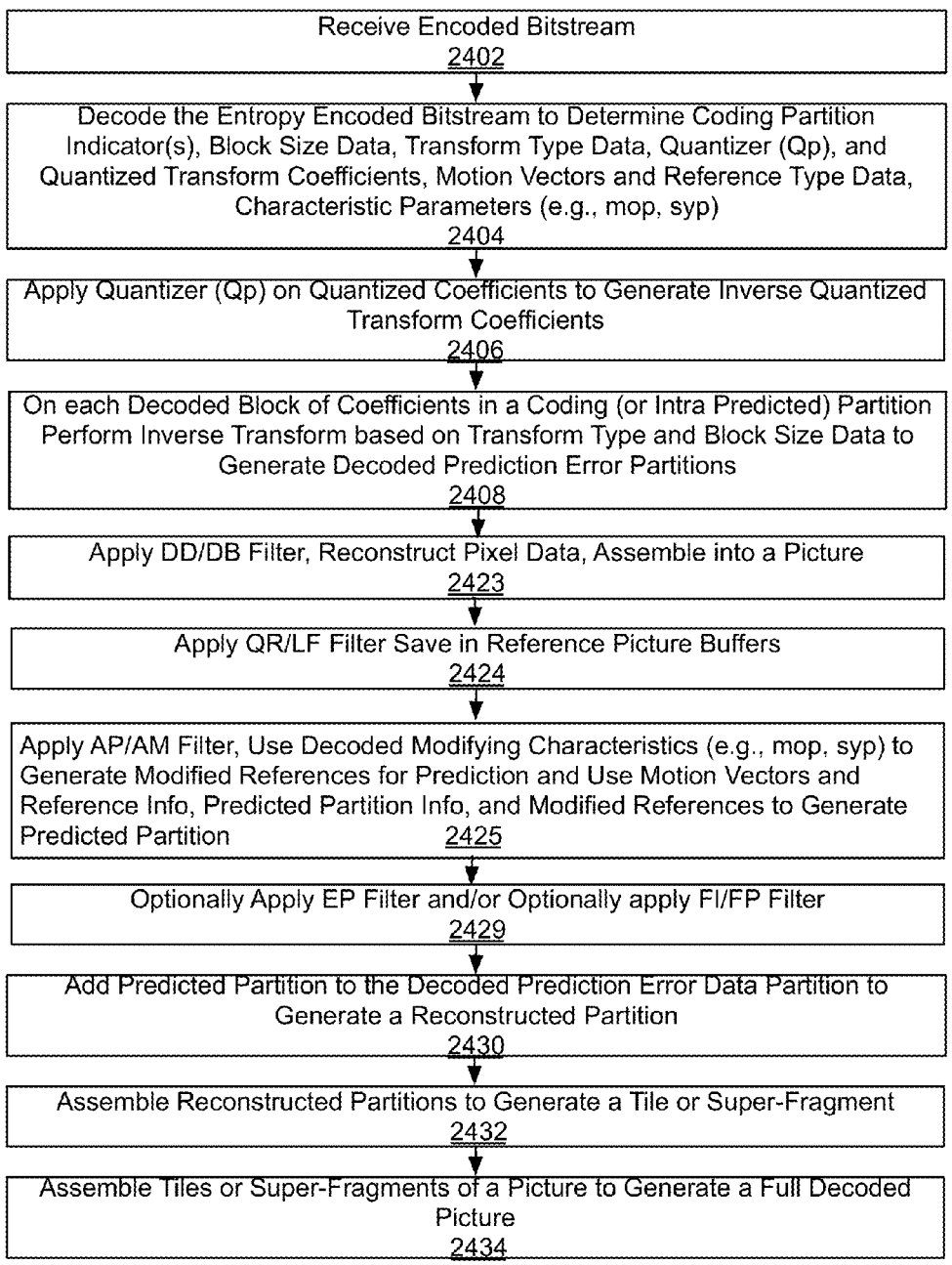

2600

Determine a first quality restoration filter for a first partition of a reconstructed picture and a second quality restoration filter for a second partition of the reconstructed picture

2602

Apply the first quality restoration filter to at least a portion of the first partition and the second quality restoration filter to at least a portion of the second partition to generate a final reconstructed picture

2604

Store the final reconstructed picture in a picture buffer

2700
Determine a quality restoration Wiener filter for at least a partition of a reconstructed picture
2702
Apply the quality restoration Wiener filter may be applied to at least a portion of the partition of the reconstructed picture
2704
Store the final reconstructed picture in a picture buffer
2706
FIG. 27

CONTENT ADAPTIVE QUALITY RESTORATION FILTERING FOR NEXT GENERATION VIDEO CODING

RELATED APPLICATIONS

The present application is a continuation-in-part of international application no. PCT/US2013/078114, filed 27 Dec. 2013, which in turn claims the benefit of U.S. Provisional Application No. 61/758,314 filed 30 Jan. 2013; the present application also is a continuation-in-part of PCT/US13/69960 filed 13 Nov. 2013, which in turn claims the benefit of U.S. Provisional Application No. 61/725,576 filed 13 Nov. 2012 as well as U.S. Provisional Application No. 61/758,314 filed 30 Jan. 2013; the contents of which are expressly incorporated herein in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 10 is an illustrative diagram of an example array of filter coefficients;

FIG. 11 is an illustrative diagram of an example array of filter coefficients;

FIG. 13 is an illustrative diagram of an example array of filter coefficients;

FIG. 14 is an illustrative diagram of an example array of filter coefficients;

FIG. 23 illustrates an example bitstream;

FIG. 24 is a flow diagram illustrating an example decoding process;

FIG. 26 is a flow diagram illustrating an example video encoding process;

FIG. 27 is a flow diagram illustrating an example video encoding process;

DETAILED DESCRIPTION

Figure 1:
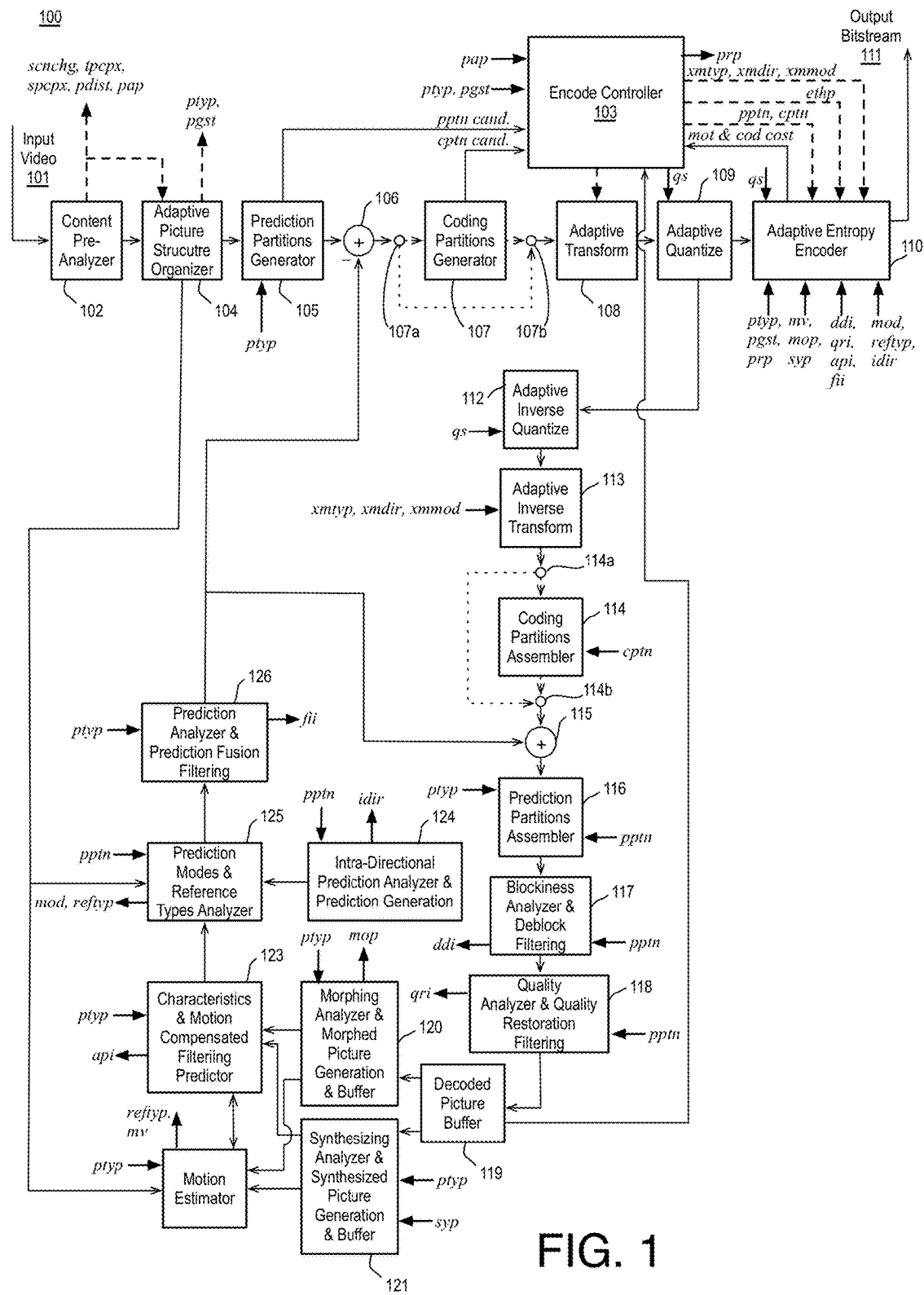
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to quality restoration filtering of prediction and reconstruction signals for video coding.

As discussed above, there are several reasons why HEVC standard's filtering subsystem, while a good step forward, may not be sufficient for getting full gains from filtering. For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

Alternatively, a previous in-loop filtering method referred to as Quality Restoration (QR) filtering that uses codebook for filtering was introduced to address shortcomings of existing approaches. The 9×9 codebook based design included sending update to filter coefficients in the codebook, efficient searching, as well as low cost representation of filters by codebook indices rather than sending full filter coefficients. Despite its many advantages, it did not address decoding complexity fully and was bounded by complexity of 9×9 non-separable filtering.

As will be described in greater detail below, the approach(es) described in the implementations discussed herein address the problem of how to improve efficiency of prediction signal, and quality of reconstruction signal both of which enable higher compression efficiency in video coding. For example, techniques described herein may improve the overall video compression efficiency in interframe video coding by improving the compression gains by improving video reconstructed video. If decoded video quality may be further improved due to matched filtering in coding loop, it may not only improve reconstructed visual quality but also may have a feedback effect in improving quality of the prediction signal reducing the prediction error bit cost thus improving the video compression efficiency/quality even further.

More specifically, techniques described herein may use a hybrid (e.g., partly symmetric and partly non-symmetric) subset of a rectangular (11×9) or square shape (9×9). For efficient filtering, overhead may be minimized by use of a codebook search, so either the computed coefficients (after prediction) are encoded and sent to the decoder or an index to a filter or codebook filter is sent to the decoder. Both luma and chroma signals may be filtered and may use different shapes and filter sizes.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions.

The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1(a), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:

scnchg Scene change information
spcpx Spatial complexity information
tpcpx Temporal complexity information
pdist Temporal prediction distance information
pap Pre Analysis parameters (placeholder for all other pre analysis parameters except scnchg, spcpx, tpcpx, pdist)
ptyp Picture types information
pgst Picture group structure information
pptn cand. Prediction partitioning candidates
cptn cand. Coding Partitioning Candidates
prp Preprocessing
xmtyp Transform type information
xmdir Transform direction information
xmmod Transform mode
ethp One eighth (⅛th) pel motion prediction
pptn Prediction Partitioning
cptn Coding Partitioning
mot&cod cost Motion and Coding Cost
qs quantizer information set (includes Quantizer parameter (Qp), Quantizer matrix (QM) choice)
mv Motion vectors
mop Morphing Paramters
syp Synthesizing Parameters
ddi Deblock and dither information
qri Quality Restoration filtering index/information
api Adaptive Precision filtering index/information
fii Fusion Filtering index/information
mod Mode information
reftyp Reference type information
idir Intra Prediction Direction The various signals and data items that may need to be sent to the decoder, e.g., pgst, ptyp, prp, pptn, cptn, modes, reftype, ethp, xmtyp, xmdir, xmmod, idir, mv, qs, mop, syp, ddi, qri, api, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
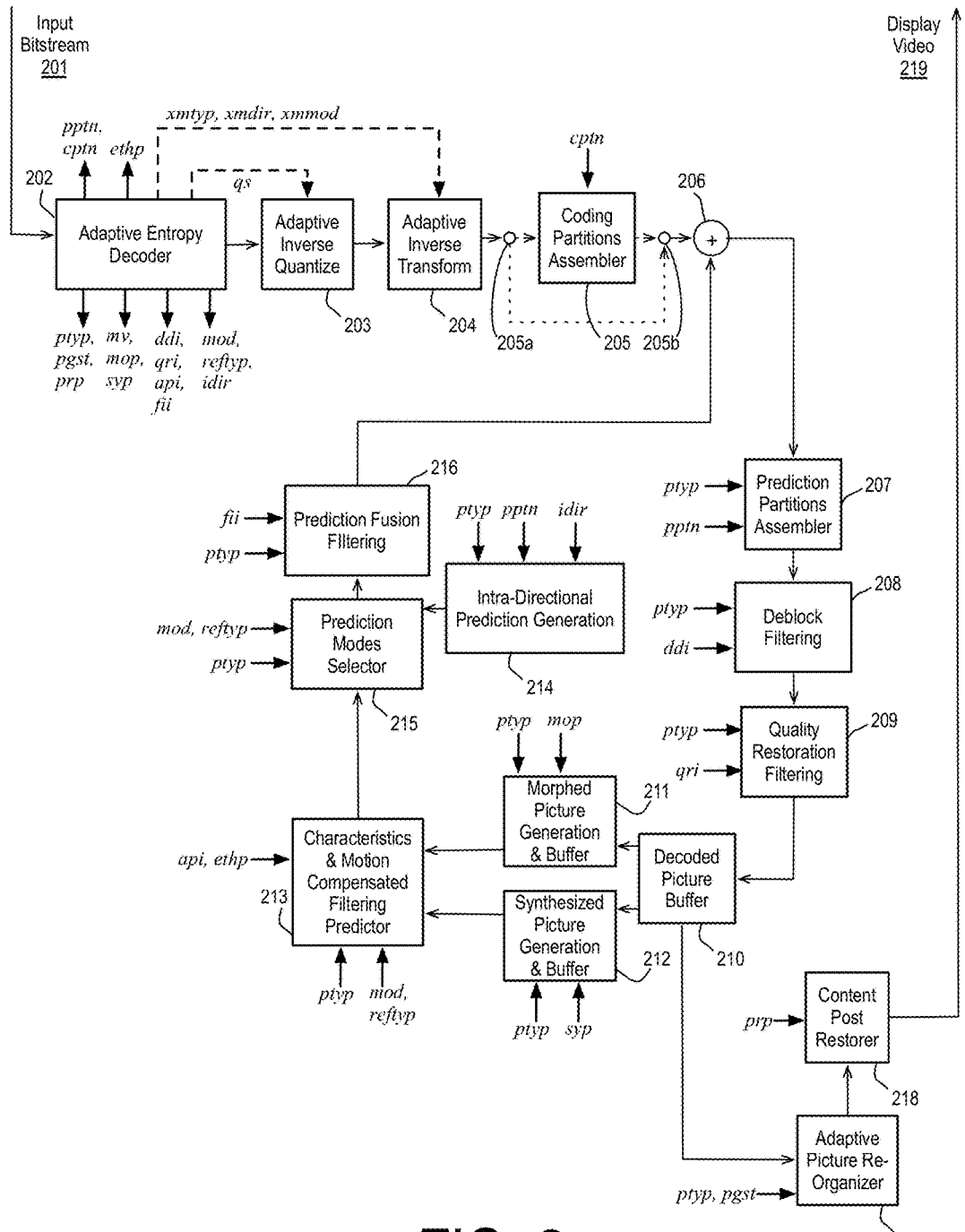
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 2, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
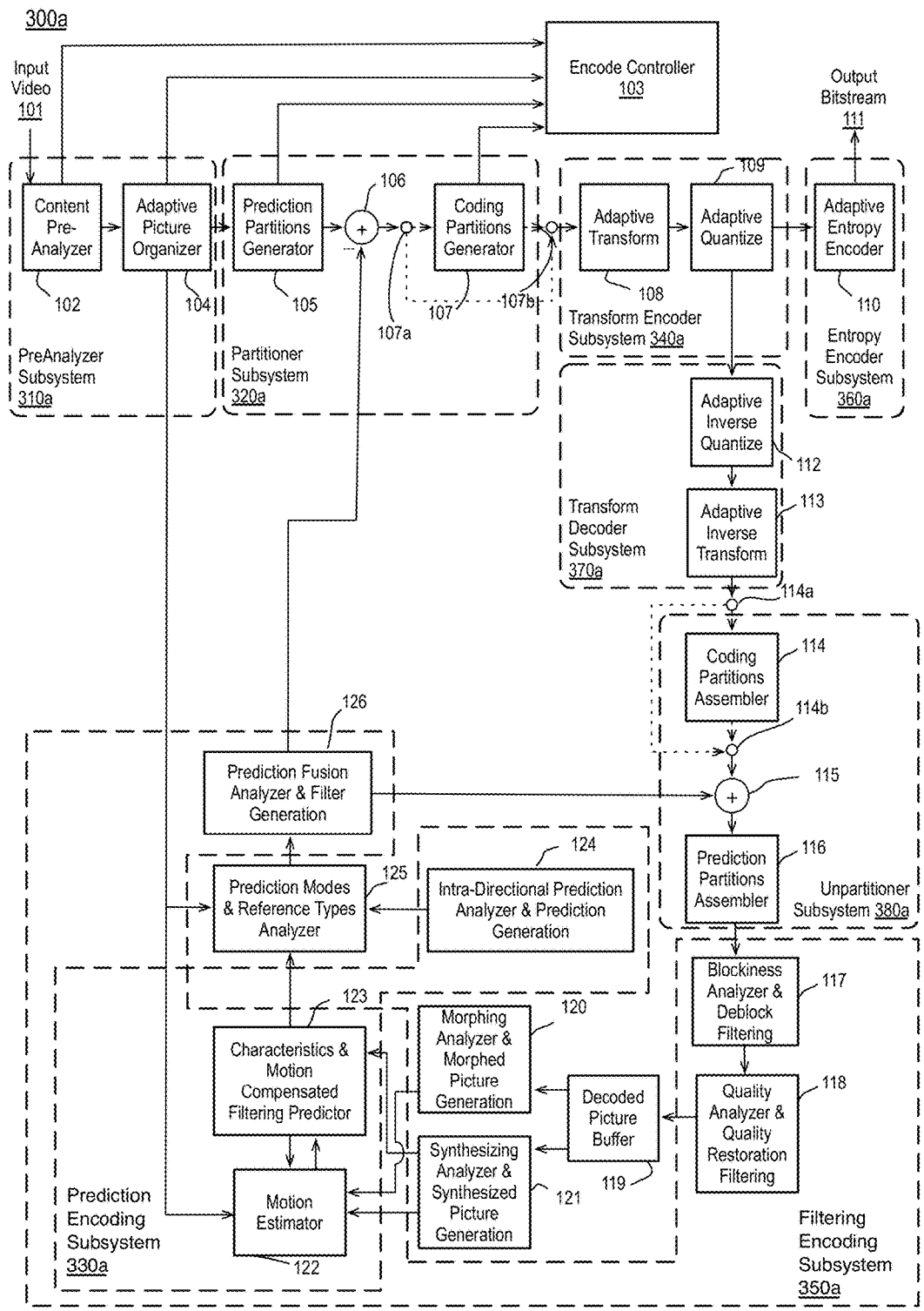
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal.

Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyper-threading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
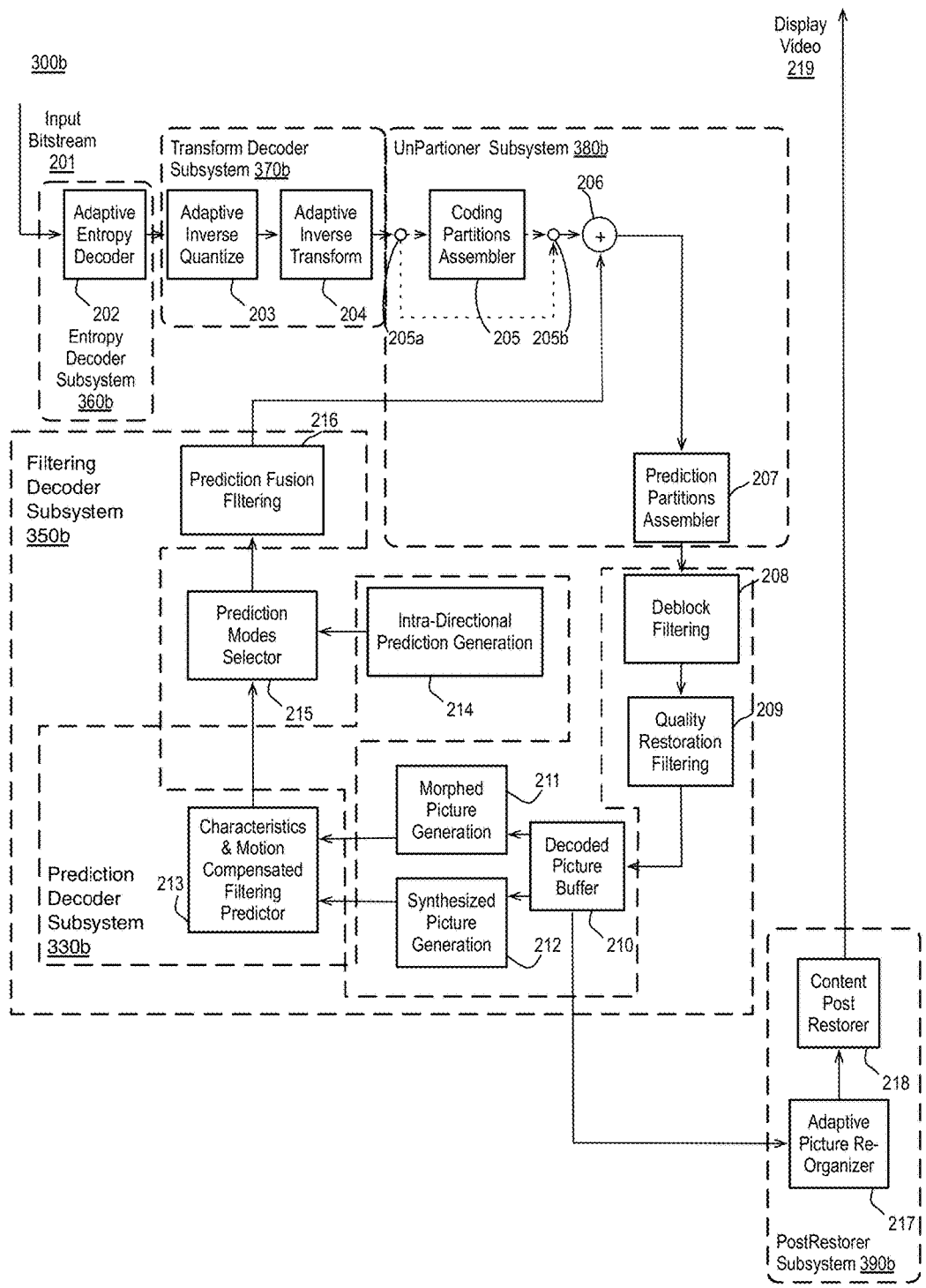
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390*b* of decoder 300*b* is an optional block that may perform further improvement of perceptual quality of decoded video. This processing can be done either in response to quality improvement parameters sent by encoder 100, or it can be standalone decision made at the postrestorer subsystem 390*b*. In terms of specific parameters computed at encoder 100 that can be used to improve quality at postrestorer subsystem 390*b* may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390*b* may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390*b*.

While subsystems 330*b* through 390*b* are illustrated as being associated with specific example functional modules of decoder 300*b* in FIG. 3(*b*), other implementations of decoder 300*b* herein may include a different distribution of the functional modules of decoder 300*b* among subsystems 330*b* through 390*b*. The present disclosure is not limited in this regard and, in various examples, implementation of the example subsystems 330*b* through 390*b* herein may include the undertaking of only a subset of the specific example functional modules of decoder 300*b* shown, additional functional modules, and/or in a different arrangement than illustrated.

Figure 4:
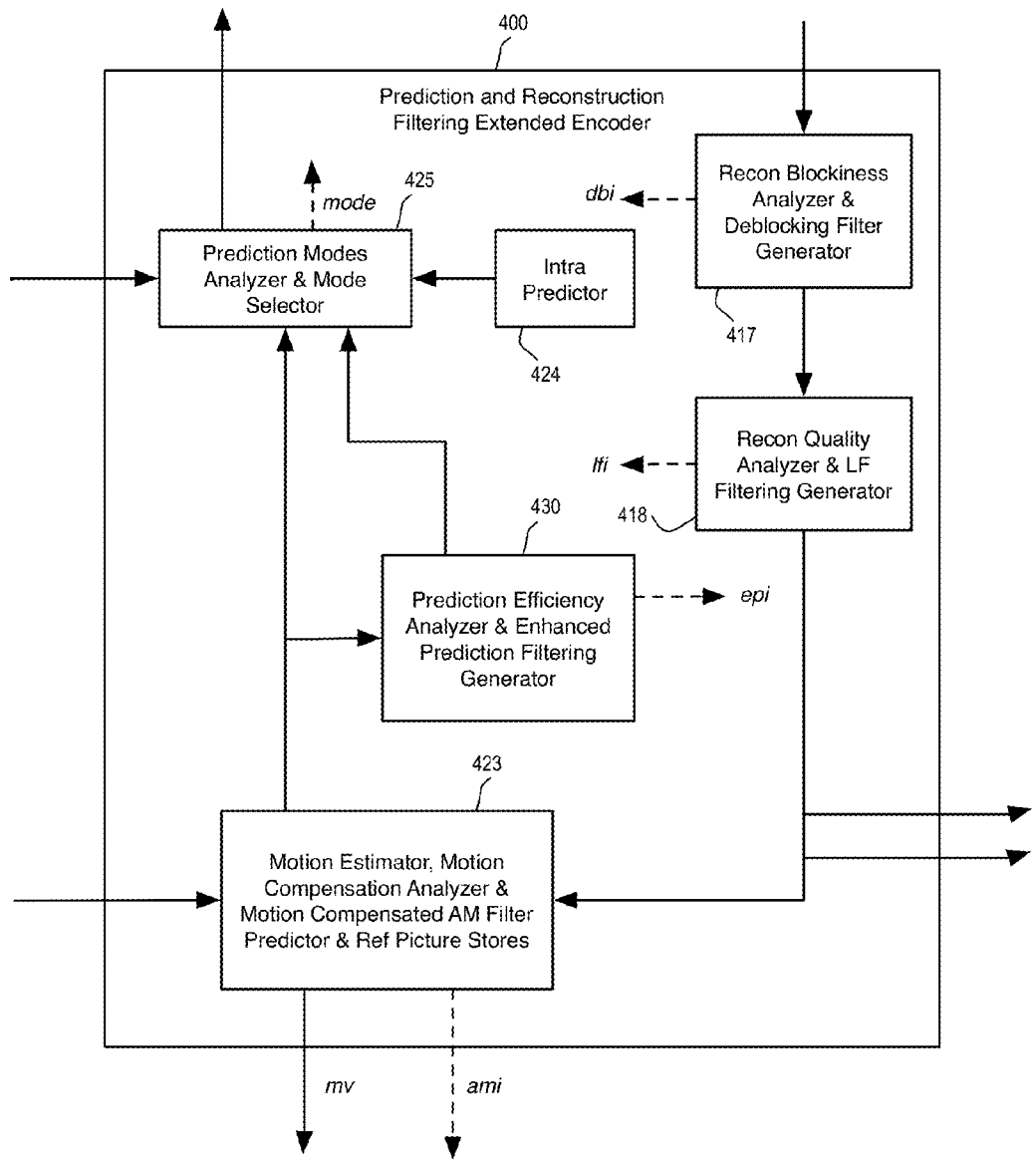
FIG. 4 is an illustrative diagram of an example encoder filter subsystem.

FIG. 4 is an illustrative diagram of an example encoder filtering subsystem 400, arranged in accordance with at least some implementations of the present disclosure. As illustrated, filtering subsystem 400 may include recon blockiness analyzer & deblocking filter generator 417, recon quality analyzer & LF filtering generator 418, motion estimator, motion compensation analyzer & motion compensated AM filter predictor & ref picture stores 423, intra predictor 424, prediction modes analyzer & mode selector 425, and/or prediction efficiency analyzer & enhanced prediction filtering generator 430.

In the illustrated implementation, recon blockiness analyzer & deblocking filter generator 417 may be capable of analysis of blocking produced during coding, determining dbi parameters to control how deblocking is applied.

In the illustrated implementation, recon quality analyzer & LF filtering generator 418 may be capable of analyzing and performing loop filtering, determining lfi parameters (e.g., filter coefficients, filter index, filter block map, or the like).

In the illustrated implementation, motion estimator, motion compensation analyzer & motion compensated AM filter predictor & ref picture stores 423 may be capable of improving motion compensated prediction, determining ami parameters.

In the illustrated implementation, intra predictor 424 may be capable of performing intra prediction.

In the illustrated implementation, prediction modes analyzer & mode selector 425 may be capable of selecting between various motion prediction modes and intra prediction modes available on a block basis, and selecting prediction references.

In the illustrated implementation, prediction efficiency analyzer & enhanced prediction filtering generator 430 may be capable of optionally filtering the prediction signal so that both the filtered version as well as not filtered version can be provided to prediction modes analyzer & mode selector 425, determining epi parameters.

Figure 5:
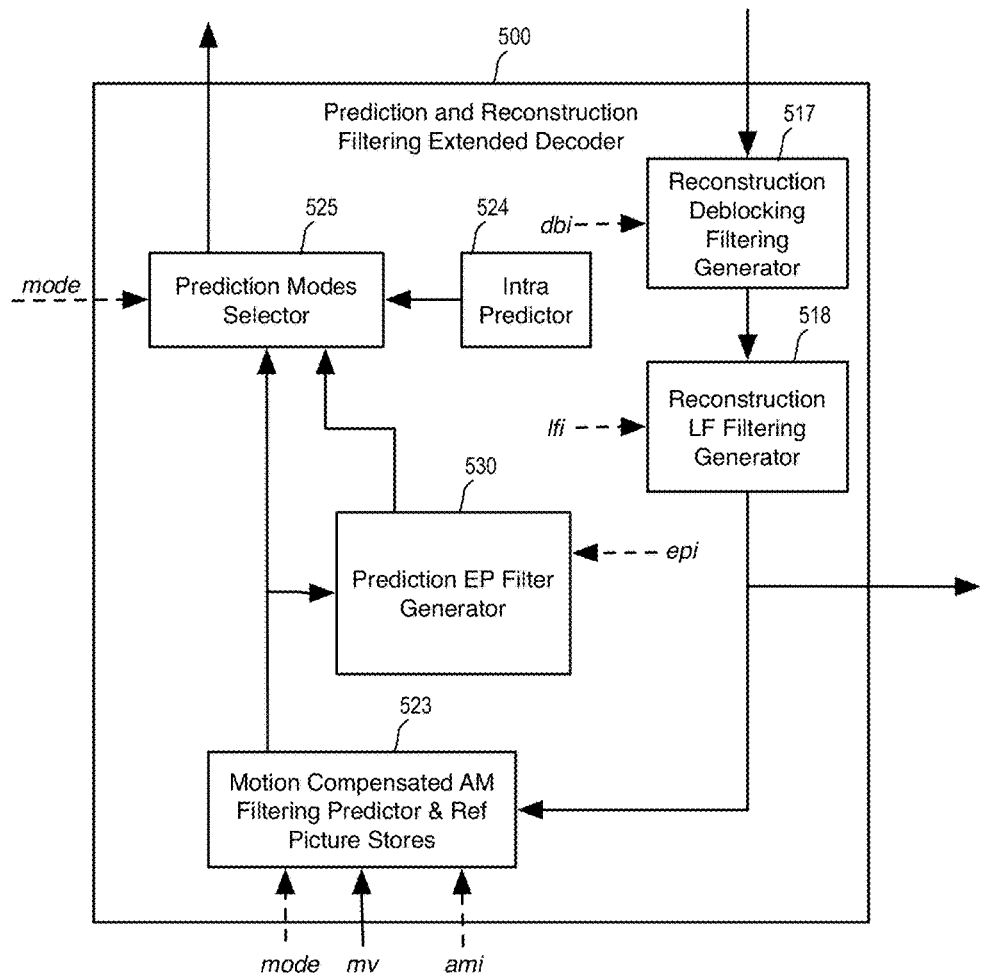
FIG. 5 is an illustrative diagram of an example decoder filter subsystem.

FIG. 5 is an illustrative diagram of an example decoder subsystem 500, arranged in accordance with at least some implementations of the present disclosure. As shown, decoder subsystem 500 may include reconstruction deblocking filtering generator 517, reconstruction LF filtering generator 518, motion compensated AM filtering predictor & ref picture stores 523, intra predictor 524, prediction modes selector 525, and/or prediction EP filter generator 530.

In the illustrated implementation, reconstruction deblocking filter generator 517 may be capable of deblocking. The operation of reconstruction deblocking filter generator 517 may be controlled by dbi parameters received from, for example, encoder 100 of FIG. 1.

In the illustrated implementation, reconstruction LF filtering generator 518 may be capable of performing loop filtering. The operation of reconstruction LF filtering generator 518 may be controlled by lfi parameters received from, for example, encoder 100 of FIG. 1.

In the illustrated implementation, motion compensated AM filtering predictor & ref picture stores 523 may be capable of AM filtering. The operation of motion compensated AM filtering predictor & ref picture stores 523 may be controlled by ami parameters received from, for example, encoder 100 of FIG. 1.

In the illustrated implementation, intra predictor 524 may be capable of performing intra prediction.

In the illustrated implementation, prediction modes selector 525 may be capable of determining a prediction mode selection from among, "skip", "auto", "inter", "multi", and "intra", for each prediction partition of a tile, all of which may apply to P- and F/B-pictures, based on mode selection data in, for example, input bitstream 201. In addition to prediction modes, prediction modes selector 525 also allows for selection of reference types that can be different depending on "inter" or "multi" mode, as well as for P- and F/B-pictures.

Figure 6:
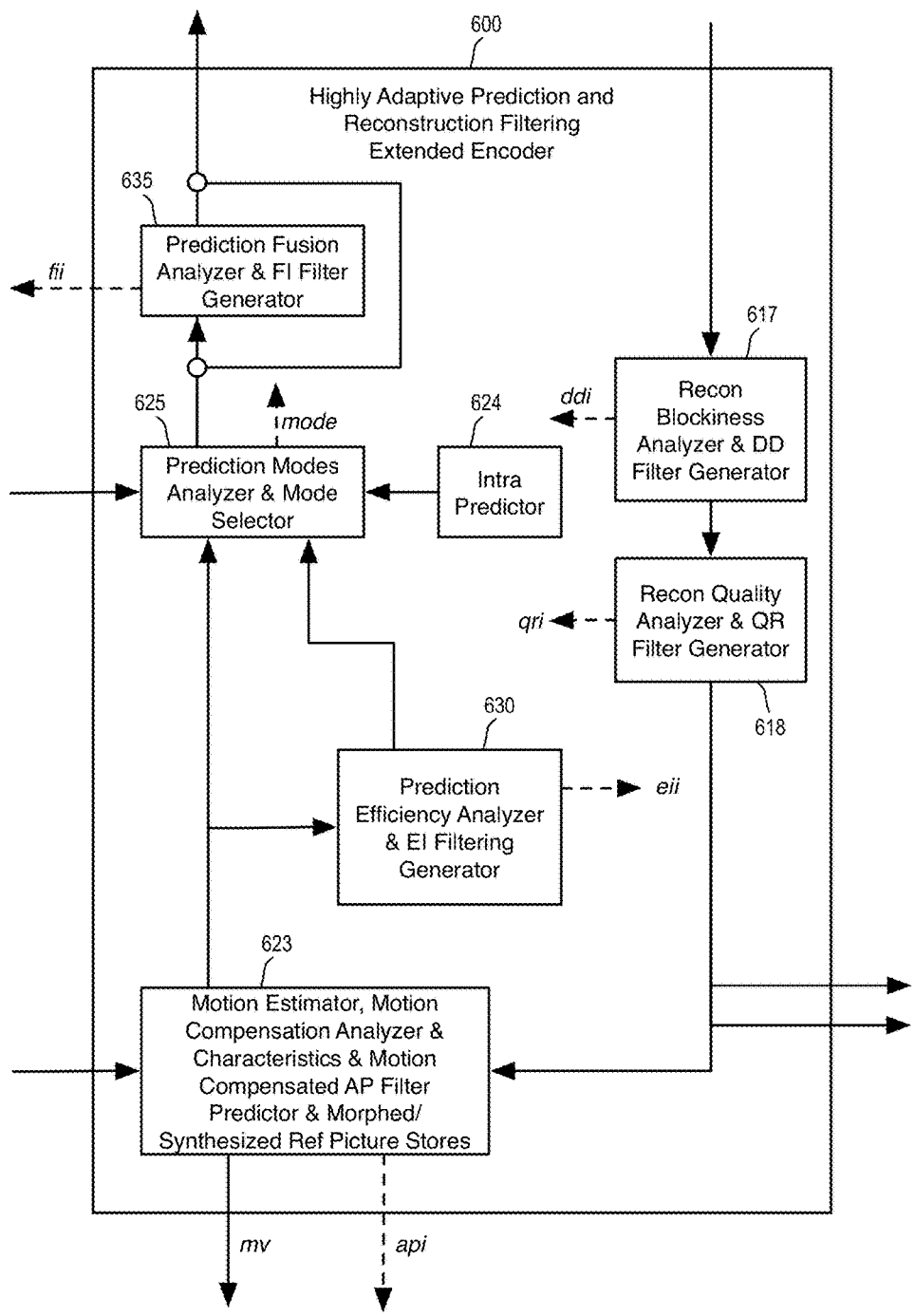
FIG. 6 is an illustrative diagram of an example encoder filter subsystem.

FIG. 6 is an illustrative diagram of an example encoder subsystem 600, arranged in accordance with at least some implementations of the present disclosure. As shown, encoder subsystem 600 may include recon blockiness analyzer & DD filter generator 617, recon quality analyzer & QR filter generator 618, motion estimator, motion compensation analyzer & characteristics & motion compensated AP filter predictor & morphed/synthesized ref picture stores 623, intra predictor 624, prediction modes analyzer & mode selector 625, prediction efficiency analyzer & EI filtering generator 630, and/or prediction fusion analyzer & FI filter generator 635.

In the illustrated implementation, recon blockiness analyzer & DD filter generator 617 may be capable of analysis of blocking produced during coding, determining ddi parameters to control how deblocking may be applied. Recon blockiness analyzer & DD filter generator 1617 may operate on 4 pixels at a time to remove blockiness from encoded video that may use a variety of block sizes for motion compensation and transform coding. Recon blockiness analyzer & DD filter generator 617 may also use a dithering operation that may further reduces the appearance of blockiness without reducing statistical (PSNR) metrics.

In the illustrated implementation, recon quality analyzer & QR filter generator 618 may be capable of performing quality restoration filtering, outputting qri parameters that may be sent to the decoder via the bitstream. Recon quality analyzer & QR filter generator 618 may use a Wiener filter that may be non-symmetric, point symmetric or hybrid (party symmetric partly non-symmetric) of 9×9 square or shapes that are a subset of 9×9 or 11×9 coefficients. Recon quality analyzer & QR filter generator 618 may minimize filtering overhead by use of a codebook search, so either the computed coefficients (after prediction) may be encoded and sent to the decoder or an index to a history filter or codebook filter may be sent to the decoder. Recon quality analyzer & QR filter generator 618 may correct filter coefficients from a codebook by sending a correction term, and the codebook may be updated while encoding progresses. Both luma and chroma signals may be filtered and may use different shapes and filter sizes.

In the illustrated implementation, motion estimator, motion compensation analyzer & characteristics & motion compensated AP filter predictor & morphed/synthesized ref picture stores 623 may be capable of performing adaptive precision filtering and outputting api parameters that may be sent to the decoder via the bitstream. Motion estimator, motion compensation analyzer & characteristics & motion compensated AP filter predictor & morphed/synthesized ref picture stores 623 may use a Wiener filter that may use explicitly computed filters for each of 16, ¼ pel location. Motion estimator, motion compensation analyzer & characteristics & motion compensated AP filter predictor & morphed/synthesized ref picture stores 623 may generate filtering combinations using a series of available filters in the codebook by using a mix and match approach, allowing for different types of content, such as slow motion to high motion (blurry content) with corresponding filters. Motion estimator, motion compensation analyzer & characteristics & motion compensated AP filter predictor & morphed/ synthesized ref picture stores 623 may create new filter combinations from mixing and matching specific ¼ pel locations from multiple filters.

In the illustrated implementation, intra predictor 624 may be capable of performing intra prediction.

In the illustrated implementation, prediction modes analyzer & mode selector 625 may be capable of may be capable of selecting between various motion prediction modes and intra prediction modes available on a block basis, and selecting prediction references.

In the illustrated implementation, prediction efficiency analyzer & EI filtering generator 630 may be capable of outputting filtered prediction signals and eii filter parameters that may be sent to the decoder via bitstream.

In the illustrated implementation, prediction fusion analyzer & FI filter generator 635 may be capable of receiving output from prediction modes analyzer & mode selector 625 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fii information. Prediction fusion analyzer & FI filter generator 635 may use a Wiener filter that may be non-symmetric, point symmetric or hybrid (party symmetric partly non-symmetric) of 9×9 square or shapes that are a subset of 9×9 or 11×9 coefficients. Prediction fusion analyzer & FI filter generator 635 may minimize filtering overhead by use of a codebook search, so either the computed coefficients (after prediction) may be encoded and sent to the decoder or an index to a history filter or codebook filter may be sent to the decoder. Prediction fusion analyzer & FI filter generator 635 may correct filter coefficients from a codebook by sending a correction term, and the codebook may be updated while encoding progresses. Both luma and chroma signals may be filtered and may use different shapes and filter sizes.

Figure 7:
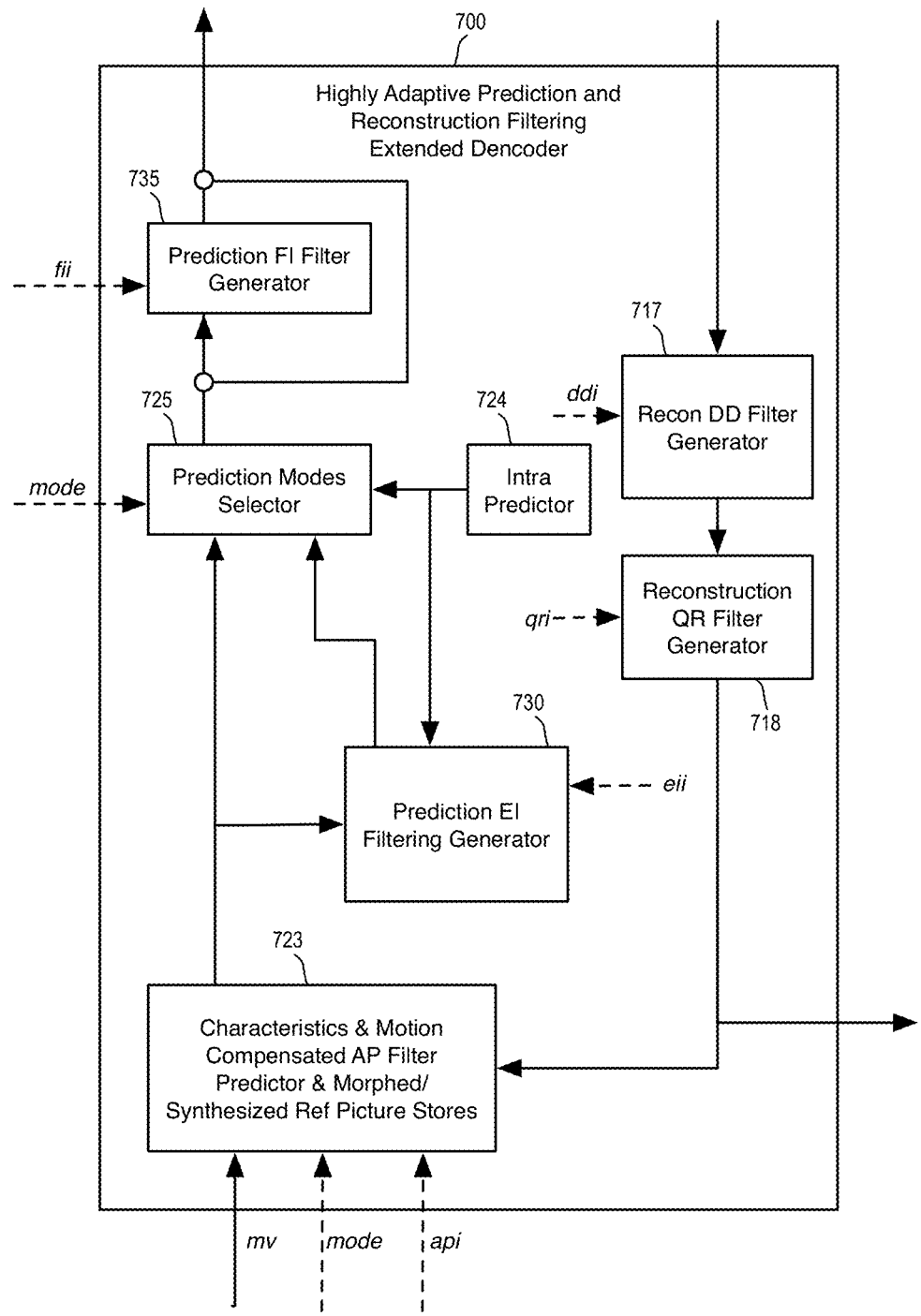
FIG. 7 is an illustrative diagram of an example decoder filter subsystem.

FIG. 7 is an illustrative diagram of an example decoder subsystem 700, arranged in accordance with at least some implementations of the present disclosure. As shown, decoder subsystem 700 may include reconstruction DD filter generator 717, reconstruction QR filter generator 718, characteristics & motion compensated AP filter predictor & morphed/synthesized ref picture stores 723, intra predictor 724, prediction modes selector 725, prediction EI filtering generator 730, and/or prediction FI filter generator 735.

In the illustrated implementation, reconstruction DD filter generator 717 may be capable of deblocking and de-dithering the reconstructed signal, guided by the ddi parameters that are decoded at the decoder from the bitstream.

In the illustrated implementation, reconstruction QR filter generator 718 may be capable of performing QR filtering, guided by qri filtering parameters decoded from the bitstream.

In the illustrated implementation, characteristics & motion compensated AP filter predictor & morphed/synthesized ref picture stores 723 may be capable of performing adaptive precision filtering, guided by api filtering parameters decoded from the bitstream.

In the illustrated implementation, intra predictor 724 may be capable of performing intra prediction.

In the illustrated implementation, prediction modes selector 725 may be capable of selecting between various motion prediction modes and intra prediction modes available on a block basis, and selecting prediction references.

In the illustrated implementation, prediction EI filtering generator 730 may be capable of generating filtered prediction for selection by prediction modes analyzer & mode selector 725 based on the prediction mode information sent in the bitstream by the encoder. Prediction efficiency analyzer & EI filtering generator 730 may perform filtering which may be locally block adaptive and responsive to the mode information carried via the bitstream to the decoder.

In the illustrated implementation, prediction FI filter generator 735 may be capable of performing fusion improvement filtering by receiving output from prediction modes selector 725 and, under guidance from the fii information, performing actual filtering.

Figure 8:
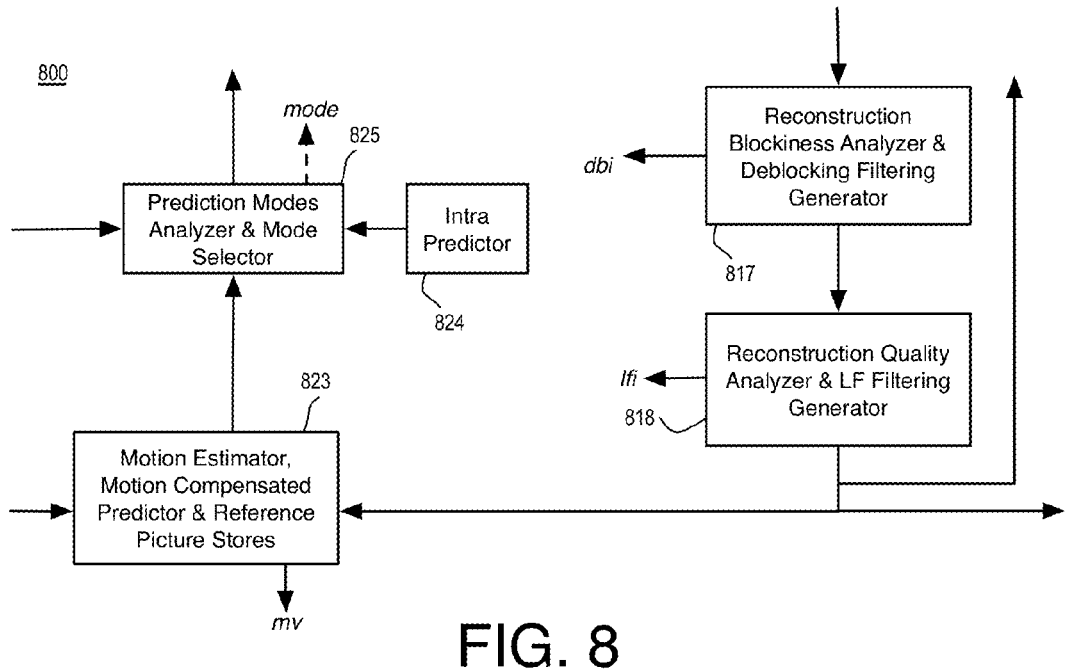
FIG. 8 is an illustrative diagram of an example encoder filter subsystem.

FIG. 8 is an illustrative diagram of an example encoder filtering subsystem 800, arranged in accordance with at least some implementations of the present disclosure. As illustrated, filtering subsystem 800 may include recon blockiness analyzer & deblocking filter generator 817, recon quality analyzer & LF filtering generator 818, motion estimator, motion compensated predictor & ref picture stores 823, intra predictor 824, and/or prediction modes analyzer & mode selector 825.

In the illustrated implementation, recon blockiness analyzer & deblocking filter generator 817 may be capable of analysis of blocking produced during coding, determining dbi parameters to control how deblocking is applied.

In the illustrated implementation, recon quality analyzer & LF filtering generator 818 may be capable of analyzing and performing loop filtering, determining lfi parameters (e.g., filter coefficients, filter index, filter block map, or the like).

In the illustrated implementation, motion estimator, motion compensated predictor & reference picture stores 823 may perform prediction of "inter" signal and intra-directional based on motion and/or other morphed/synthesized parameters.

In the illustrated implementation, intra predictor 824 may be capable of performing intra prediction.

In the illustrated implementation, prediction modes analyzer & mode selector 825 may be capable of selecting between various motion prediction modes and intra prediction modes available on a block basis, and selecting prediction references.

Figure 9:
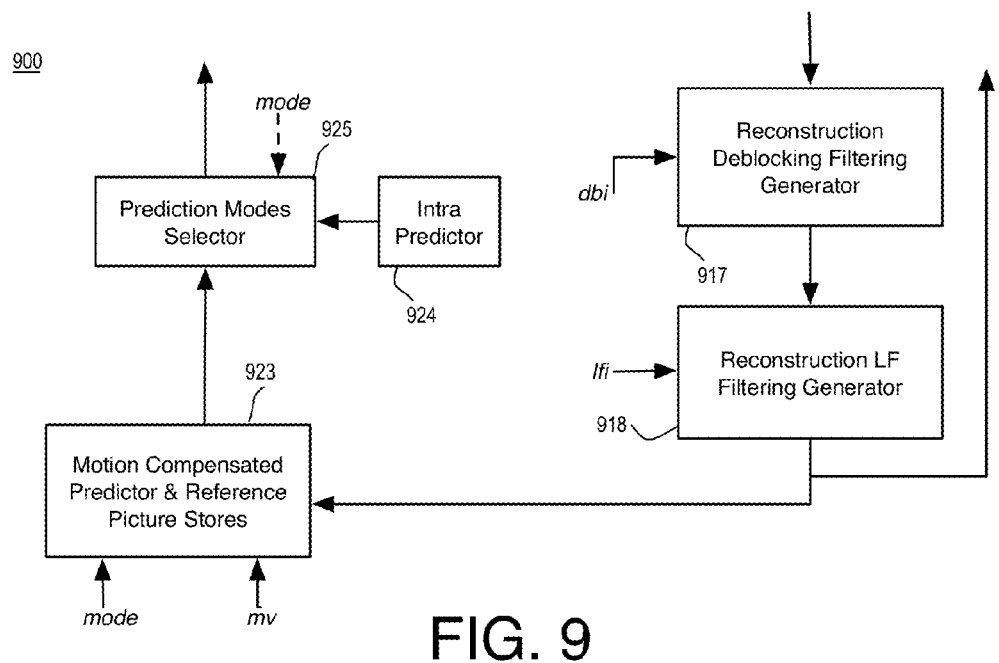
FIG. 9 is an illustrative diagram of an example decoder filter subsystem.

FIG. 9 is an illustrative diagram of an example decoder subsystem 900, arranged in accordance with at least some implementations of the present disclosure. As shown, decoder subsystem 900 may include reconstruction deblocking filtering generator 917, reconstruction LF filtering generator 918, motion compensated predictor & ref picture stores 923, intra predictor 924, prediction modes selector 925, and/or prediction EP filter generator 930.

In the illustrated implementation, reconstruction deblocking filter generator 917 may be capable of deblocking. The operation of reconstruction deblocking filter generator 917 may be controlled by dbi parameters received from, for example, encoder 100 of FIG. 1.

In the illustrated implementation, reconstruction LF filtering generator 918 may be capable of performing loop filtering. The operation of reconstruction LF filtering generator 918 may be controlled by lfi parameters received from, for example, encoder 100 of FIG. 1.

In the illustrated implementation, motion compensated predictor & ref picture stores 923 may be capable of may perform prediction of "inter" signal and intra-directional based on motion and/or other morphed/synthesized parameters. The operation of motion compensated predictor & ref picture stores 923 may be controlled by mode and my parameters received from, for example, encoder 100 of FIG. 1.

In the illustrated implementation, intra predictor 924 may be capable of performing intra prediction.

In the illustrated implementation, prediction modes selector 925 may be capable of determining a prediction mode selection from among, "skip", "auto", "inter", "multi", and "intra", for each prediction partition of a tile, all of which may apply to P- and F/B-pictures, based on mode selection data in, for example, input bitstream 201. In addition to prediction modes, prediction modes selector 925 also allows for selection of reference types that can be different depending on "inter" or "multi" mode, as well as for P- and F/B-pictures.

Referring to both FIGS. 8 and 9, by introducing additional filtering of the recon signal referred to as In-loop filtering (LF) improvements can be obtained. Encoder subsystem 800 shows a modified subsystem incorporating a processing unit right after deblock filtering to analyze and perform loop filtering, referred to here as Reconstruction Quality Analyzer & LF Filtering Generator 818. The lfi parameters (e.g., including filter coefficients, filter index, filter block map, etc.) generated by this processing unit may be sent to the decoder.

Since coding quality can vary a lot depending on content of video sequences, contrast ratio, noise level, and operating bit-rates, for example, it is proposed herein that the filters are adaptive rather than fixed to get maximum benefit of such a filter to improve prediction and thus help improve compression efficiency. The mathematical procedure used to compute filter coefficients may be based on Wiener Hopf equation and computes filter coefficients (e.g. an array of 5×5 or 7×7 or 9×9 coefficients), which may be either directly or differentially sent for each frame of every video sequence.

According to the theory of adaptive filtering, cross-correlation and autocorrelation matrices are accumulated, from which the optimal Wiener filter can be computed by solving the Wiener Hopf equation as follows.

Let x(n) be the input signal, y(n) be the output, and h(n) represent filter coefficients.

Filter output:

$$y(n) = \sum_{k=0}^{N-1} h(k)x(n-k)$$

Error signal:

$$e(n)=d(n)-y(n)$$

Mean Square Error:

$$J=E[e^2(n)]$$

In vector form:

$$x(n) = \begin{bmatrix} x(n) \\ x(n-1) \\ \vdots \\ x(n-N+1) \end{bmatrix}$$

and $$h = \begin{bmatrix} h(0) \\ h(1) \\ \vdots \\ h(N-1) \end{bmatrix}$$

$$y(n)=h^T x(n)=x(n)^T h$$

$$E[e^2(n)] = E[(d(n)-y(n))^2]$$
$$= E[d^2(n)] - 2E[d(n)x(n)^T]h + h^T E[x(n)x(n)^T]h$$
$$= P_d - 2R_{dx}^T h + h^T R_{xx} h$$

Where, $P_d$ is a scalar.

Crosscorrelation row vector:

$$R_{dx}=E[d(n)x(n)^T]$$

Autocorrelation matrix:

$$R_{xx}=E[x(n)x(n)^T]$$

To find minimum, the derivative is taken and set to zero as follows:

$$\frac{\partial E[e^2(n)]}{\partial h(k)} = -2R_{dx}^T + 2R_{xx}h$$
$$= 0$$

Solving for h, the Wiener Hopf equation is as follows:

$$h = R_{xx}^{-1} R_{dx}$$

The Wiener Hopf equation determines optimum filter coefficients in mean square error, and the resulting filter is called the 'wiener' filter.

In the above equation, h is the vector of filter coefficients, $R_{xx}$ is the autocorrelation matrix (or block data of reference frame) and $R_{dx}$ is a cross-correlation matrix/row vector (between the source frame and reference frame block data).

While the aforementioned mathematical procedure can calculate filter coefficients, there are significant issues in practical use of directly computed wiener filters in a video coding system. For example, calculation of Wiener Filter is computationally expensive. Further, calculation of multiple wiener filters as needed for fully adaptive wiener filtering presents a complexity that is very prohibitive especially due to the need for fast encoding for many applications. Additionally, high resolutions and high quality may necessitate filtering using large filters (such as 9×9 or even higher), which from decoder standpoint can be computationally expensive, especially for 1080p and higher resolution video. Further, since encoder computes the filter coefficients, and decoder simply uses the filter coefficients, these coefficients need to transmitted via bitstream to the decoder. Accordingly, the coding cost of filter coefficients can be high, especially if filters are large, e.g., 9×9 so efficient representation of filters is necessary. Additionally, picture based filtering can increase coding dependency and thus the processing delay. Typically, filtering is needed both for Luma and chroma signals. While each chroma signal is at one-half the size/complexity of luma signals, since there are two chroma signals, it adds 50% more to the cost of luma computations.

FIG. 10 is an illustrative diagram of an example prior art array 1000 of filter coefficients. For example, the array of filter coefficients may utilize a 9×9 non-separable arrangement of filter coefficients with center at c(40) used to filter a pixel at that location. As shown in FIG. 10, a 9×9 array of filter coefficients may include 81 unique filter coefficients c(0) through c(80). As shown, no symmetry is present because each filter coefficient is unique.

FIG. 11 is an illustrative diagram of an example prior art array 1100 of filter coefficients. For example, the prior art array 1100 of filter coefficients may utilize a straightforward method for reducing complexity of actual filtering. For example, this straightforward method for reducing complexity of actual filtering as well as overhead of filtering may implement a fully point symmetric filter with coefficients as shown in prior art array 1100. However, simply making filters point symmetric can also have the adverse impact of reducing quality obtainable from filtering thus any simplification of filter needs to be done carefully.

For example, prior art array 1100 may exhibit full point symmetry such that all coefficients may be determined from original or unique coefficients by inversion through the center of the filter. As shown in FIG. 11, a 9×9 array of filter coefficients may include 41 unique filter coefficients c(0) through c(40). For example, referring to FIG. 11, the original coefficient c(0) at position 1 from the left and 1 from the top may be copied to position 9 from the left and 9 from the top via an inversion through position 5 from the left and 5 from the top (e.g., the center of the filter). Similarly, the original coefficient c(10) at position 2 from the left and 2 from the top may be copied to position 8 from the left and 8 from the top via an inversion through position 5 from the left and 5 from the top (e.g., the center of the filter). Similarly, each original coefficient c(0) through c(39) represented in non-grayscale may be copied to a corresponding grayscale position via an inversion through position 5 from the left and 5 from the top (e.g., the center of the filter). Therefore, the filter illustrated in FIG. 11 may exhibit full point symmetry (e.g., with respect to the center of the filter).

Figure 12:
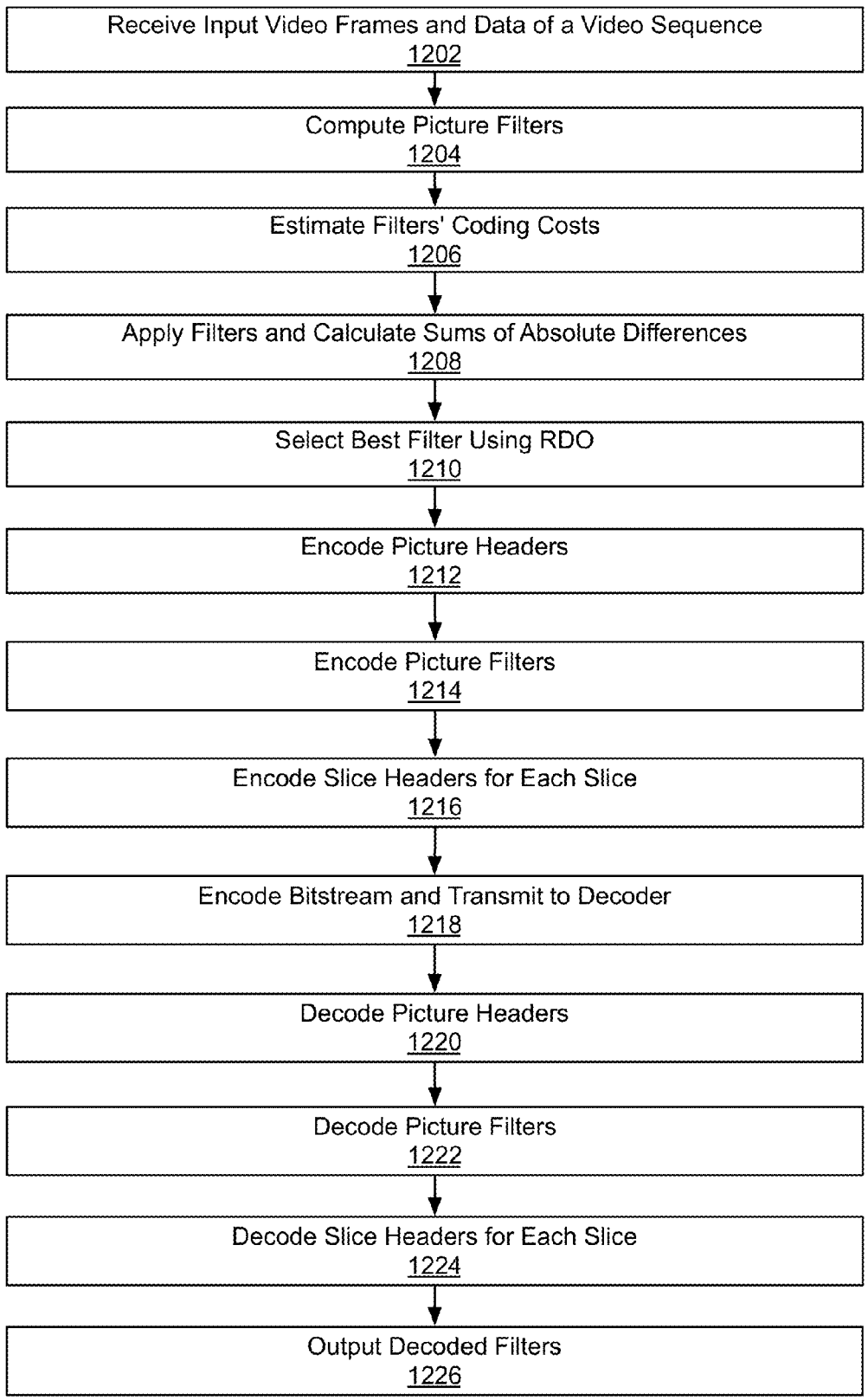
FIG. 12 is a flow diagram illustrating an example encoding and decoding process.

FIG. 12 is a flow diagram illustrating an example process 1200, arranged in accordance with at least some implementations of the present disclosure. Process 1200 may include one or more operations, functions or actions as illustrated by one or more operations. Process 1200 may form at least part of a next generation video coding process. By way of non-limiting example, process 1200 may form at least part of a next generation video encoding and decoding process as undertaken by encoder system 100 of FIG. 1, decoder system 200 of FIG. 2 and/or any other encoder system or subsystems described herein.

Process 1200 may begin at operation 1202, "Receive Input Video Frames and Data of a Video Sequence", where input video frames and data of a video sequence may be received, for example, by encoder 100. The input video frames and data of a video sequence may include, for example, input video 101.

Process 1200 may continue at operation 1204, "Compute Picture Filters", where picture filters may be computed.

Process 1200 may continue at operation 1206, "Estimate Filters' Coding Costs", where coding costs of filters may be estimated.

Process 1200 may continue at operation 1208, "Apply Filters and Calculate Sums of Absolute Differences", where filters may be applied and sums of absolute differences may be calculated.

Process 1200 may continue at operation 1210, "Select Best Filter Using RDO", where a best filter may be selected using rate distortion optimization (RDO).

Process 1200 may continue at operation 1212, "Encode Picture Headers", where picture headers may be encoded.

Process 1200 may continue at operation 1214, "Encode Picture Filters", where picture filters may be encoded.

Process 1200 may continue at operation 1216, "Encode Slice Headers for Each Slice", where slice headers for each slice may be encoded.

Process 1200 may continue at operation 1218, "Encode Bitstream and Transmit to Decoder", where the bitstream may be encoded and transmitted to a decoder.

Process 1200 may continue at operation 1220, "Decode Picture Headers", where picture headers may be decoded.

Process 1200 may continue at operation 1222, "Decode Picture Filters", where picture filters may be decoded.

Process 1200 may continue at operation 1224, "Decode Slice Headers for Each Slice", where slice headers for each slice may be decoded.

Process 1200 may continue at operation 1226, "Output Decoded Filters", where decoded filters may be output.

As will be described in greater detail below, process 1200 may use a hybrid (e.g., partly symmetric and partly non-symmetric) subset of a rectangular (11×9) or square shape (9×9). For efficient filtering, overhead may be minimized by use of a codebook search, so either the computed coefficients (after prediction) are encoded and sent to the decoder or an index to a history filter or codebook filter is sent to the decoder. Both luma and chroma signals may be filtered and may use different shapes and filter sizes.

Figures 13, 14:
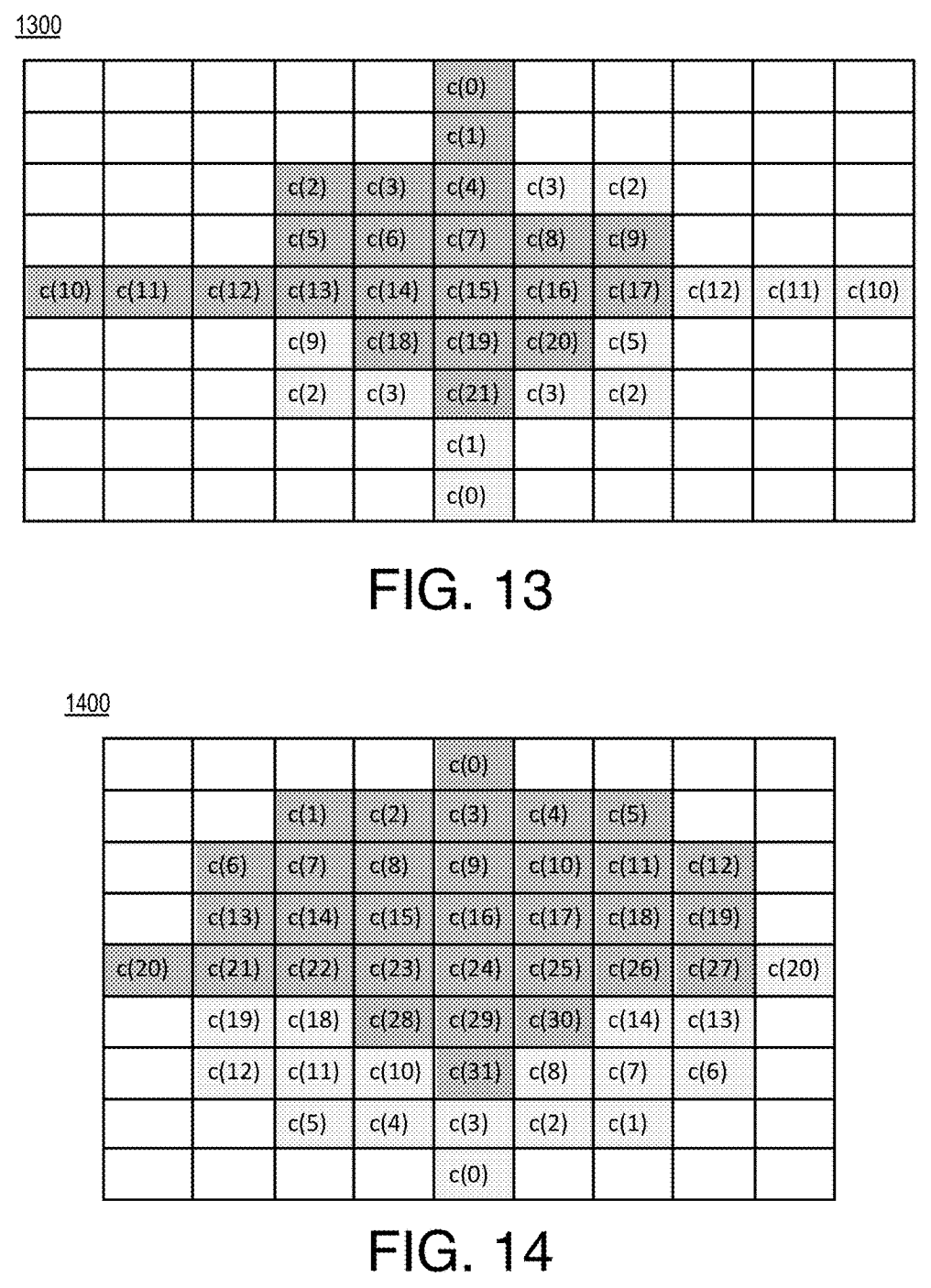

FIG. 13 is an illustrative diagram of an example array 1300 of filter coefficients. For example, the array of filter coefficients may represent a quality restoration filter. The quality restoration filter may exhibit one or more forms of symmetry.

As illustrated, array 1300 may be a rectangular array (e.g., 11×9) that may be used for Luma and/or Chroma data. In the illustrated example, only the coefficient locations used for filtering are shown as being filled with a number in the potential locations of array 1300. In this example, coefficients at 35 locations are utilized for filtering and are shown by cells with filled coefficient numbers. Of these 35 cells with filled coefficient numbers, 22 are unique coefficients and the remaining 13 are symmetric coefficients with non-unique values (e.g., 22 unique coefficients c(0) through c(21) with 35 total locations may also be referred to as 22/35 taps).

For example, the quality restoration filter may exhibit partial point symmetry such that some but not all coefficients may be determined from original or unique coefficients by inversion through the center of the filter. As shown in FIG. 13, a 11×9 array of filter coefficients may include 22 unique filter coefficients c(0) through c(21) illustrated in dark grayscale; 13 symmetric copied coefficients c(0) through c(3), c(5), and c(9) through c(12) illustrated in light grayscale; and 64 vacant coefficient locations. For example, referring to FIG. 13, the original coefficient c(0) at position 6 from the left and 1 from the top may be copied to position 6 from the left and 9 from the top via an inversion through position 6 from the left and 5 from the top (e.g., the center of the filter). However, original coefficient c(6) at position 5 from the left and 4 from the top may not be copied to position 7 from the left and 6 from the top as would be expected via full point symmetry. Instead, another original coefficient, c(20) may be provided. Therefore, the filter illustrated in FIG. 13 may exhibit partial point symmetry (e.g., with respect to the center of the filter).

In some implementations, the quality restoration filter may exhibit partial rotational symmetry such that some but not all coefficients may be determined from original or unique coefficients by rotation about the center of the filter by an amount of rotation such as 180 degrees. For example, referring to FIG. 13, the original coefficient c(2) at position 4 from the left and 3 from the top may be copied to position 8 from the left and 7 from the top via a rotation of 180 degrees about the position 6 from the left and 5 from the top (e.g., the center of the filter). However, original coefficient c(6) at position 5 from the left and 4 from the top may not be copied to position 7 from the left and 6 from the top as would be expected via full rotational symmetry via rotation of 180 degrees about the center. Instead, another original coefficient, c(20), may be provided. Therefore, the filter illustrated in FIG. 13 may exhibit partial rotational symmetry (e.g., with respect to the center of the filter).

In some examples, the array of filter coefficients may exhibit a rectangular shape. As shown in FIG. 13, the entire 11×9 array may form a rectangle. For example, the quality restoration filter may exhibit a substantially diamond shape. As shown in FIG. 13, the 22 unique filter coefficients c(0) through c(21) and the 13 symmetric copied coefficients c(0) through c(3), c(5), and c(9) through c(12) may form a substantially diamond shape, with 16 of the vacant coefficient locations at or extending from each corner of a rectangle enclosing the diamond shape.

FIG. 14 is an illustrative diagram of an example array 1400 of filter coefficients. For example, the array of filter coefficients may represent a quality restoration filter. The quality restoration filter may exhibit one or more forms of symmetry.

As illustrated, array 1400 may be a square array (e.g., 9×9) that may be used for Luma data. In the illustrated example, only the coefficient locations used for filtering are shown as being filled with a number in the potential locations of array 1400. In this example, coefficients at 45 locations are utilized for filtering and are shown by cells with filled coefficient numbers. Of these 45 cells with filled coefficient numbers, 32 are unique coefficients and the remaining 17 are symmetric coefficients with non-unique values (e.g., 32 unique coefficients c(0) through c(31) with 49 total locations may also be referred to as 32/45 taps).

For example, quality restoration filter 1400 may exhibit partial point symmetry such that some but not all coefficients may be determined from original or unique coefficients by inversion through the center of the filter. As shown in FIG. 14, a 9×9 array of filter coefficients may include 32 unique filter coefficients c(0) through c(31) illustrated in dark grayscale; 17 symmetric copied coefficients c(0) through c(8), c(10) through c(14), c(18), and c(19) illustrated in light grayscale; and 32 vacant coefficient locations. For example, referring to FIG. 14, the original coefficient c(0) at position 5 from the left and 1 from the top may be copied to position 5 from the left and 9 from the top via an inversion through position 5 from the left and 5 from the top (e.g., the center of the filter). However, original coefficient c(15) at position 4 from the left and 4 from the top may not be copied to position 6 from the left and 6 from the top as would be expected via full point symmetry. Instead, another original coefficient, c(30) may be provided. Therefore, the filter illustrated in FIG. 14 may exhibit partial point symmetry (e.g., with respect to the center of the filter).

For example, the quality restoration filter may exhibit partial rotational symmetry such that some but not all coefficients may be determined from original or unique coefficients by rotation about the center of the filter by an amount of rotation such as 180 degrees. For example, referring to FIG. 14, the original coefficient c(20) at position 1 from the left and 5 from the top may be copied to position 9 from the left and 5 from the top via a rotation of 180 degrees about the position 5 from the left and 5 from the top (e.g., the center of the filter). However, original coefficient c(21) at position 2 from the left and 5 from the top may not be copied to position 8 from the left and 5 from the top as would be expected via full rotational symmetry via rotation of 180 degrees about the center. Instead, another original coefficient, c(27), may be provided. Therefore, the filter illustrated in FIG. 14 may exhibit partial rotational symmetry (e.g., with respect to the center of the filter).

For example, the array of filter coefficients may exhibit a rectangular shape. As shown in FIG. 14, the entire 9×9 array may form a rectangle. For example, the quality restoration filter may exhibit a substantially diamond shape. As shown in FIG. 14, the 32 unique filter coefficients c(0) through c(31) and the 17 symmetric copied coefficients c(0) through c(8), c(10) through c(14), c(18), and c(19) may form a substantially diamond shape, with 8 of the vacant coefficient locations at or extending from each corner of a rectangle enclosing the diamond shape.

Figures 15A, 15B, 16:
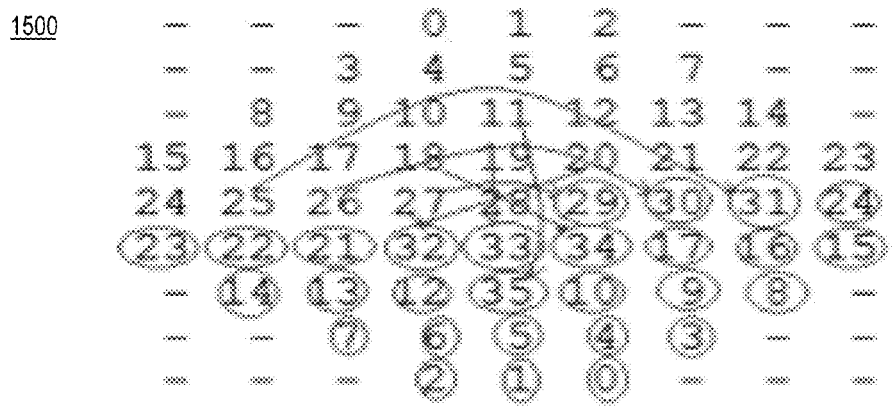
FIGS. 15(a) and 15(b) is an illustrative diagram of an example array of filter coefficients.
FIG. 16 is an illustrative diagram of an example array of filter coefficients.

FIG. 15(a) is an illustrative diagram of an example array 1500 of filter coefficients. For example, the array of filter coefficients may represent a quality restoration filter. The quality restoration filter may exhibit one or more forms of symmetry.

As illustrated, array 1500 may be a square array (e.g., 9×9) that may be used for Luma data. In the illustrated example, only the coefficient locations used for filtering are shown as being filled with a number in the potential locations of array 1500. In this example, coefficients at 57 locations are utilized for filtering and are shown by cells with filled coefficient numbers. Of these 57 cells with filled coefficient numbers, 36 are unique coefficients and the remaining 21 are symmetric coefficients with non-unique values (e.g., 36 unique coefficients c(0) through c(31) with 57 total locations may also be referred to as 36/57 taps).

As shown in FIG. 15(a), 9×9 array 1500 of filter coefficients may include 36 unique filter coefficients c(0) through c(35) illustrated in dark grayscale; 21 symmetric copied coefficients c(0) through c(10), c(12) through c(17), and c(21) through c(24) illustrated in light grayscale; and 24 vacant coefficient locations. As with FIGS. 13 and 14, and as shown in FIG. 15, the quality restoration filter may exhibit partial point symmetry and/or partial rotational symmetry (e.g., with respect to the center of the filter). While the point and rotational symmetries of FIG. 15 are not fully described for the sake of brevity as such symmetries were described for FIGS. 11, 13, and 14, it is sufficient to note with respect to FIG. 15 that the substantially diamond shape which may be formed by a group of unique and symmetric coefficients may vary from the specific shapes shown in the accompanying figures.

As shown in FIG. 15(a), the 36 unique filter coefficients c(0) through c(35) and the 21 symmetric copied coefficients c(0) through c(10), c(12) through c(17), and c(21) through c(24) may form a substantially diamond shape, with 6 of the vacant coefficient locations at or extending from each corner of a rectangle enclosing the diamond shape.

FIG. 16 is an illustrative diagram of an example array 1600 of filter coefficients. For example, the array of filter coefficients may represent a quality restoration filter. The quality restoration filter may exhibit one or more forms of symmetry.

As illustrated, array 1600 may be a rectangular array (e.g., 11×9) that may be used for Chroma data. In the illustrated example, only the coefficient locations used for filtering are shown as being filled with a number in the potential locations of array 1600. In this example, coefficients at 47 locations are utilized for filtering and are shown by cells with filled coefficient numbers. Of these 47 cells with filled coefficient numbers, 34 are unique coefficients and the remaining 13 are symmetric coefficients with non-unique values (e.g., 34 unique coefficients c(0) through c(31) with 57 total locations may also be referred to as 34/47 taps).

As shown in FIG. 16, 11×9 array 1600 of filter coefficients may include 34 unique filter coefficients c(0) through c(33) illustrated in dark grayscale; 13 symmetric copied coefficients c(0) through c(4), c(6) through c(10), and c(16) through c(18) illustrated in light grayscale; and 52 vacant coefficient locations. As with FIGS. 13, 14, and 15, and as shown in FIG. 16, the quality restoration filter may exhibit partial point symmetry and/or partial rotational symmetry (e.g., with respect to the center of the filter). While the point and rotational symmetries of FIG. 16 are not fully described for the sake of brevity as such symmetries were described for FIGS. 11, 13, and 14, it is sufficient to note with respect to FIG. 16 that the shape formed by a group of unique and symmetric coefficients may vary from the specific shapes shown in the accompanying figures.

As shown in FIG. 16, the 34 unique filter coefficients c(0) through c(33) and the 13 symmetric copied coefficients c(0) through c(4), c(6) through c(10), and c(16) through c(18) may form a substantially diamond shape, with 13 of the vacant coefficient locations at or extending from each corner of a rectangle enclosing the diamond shape.

Figure 17:
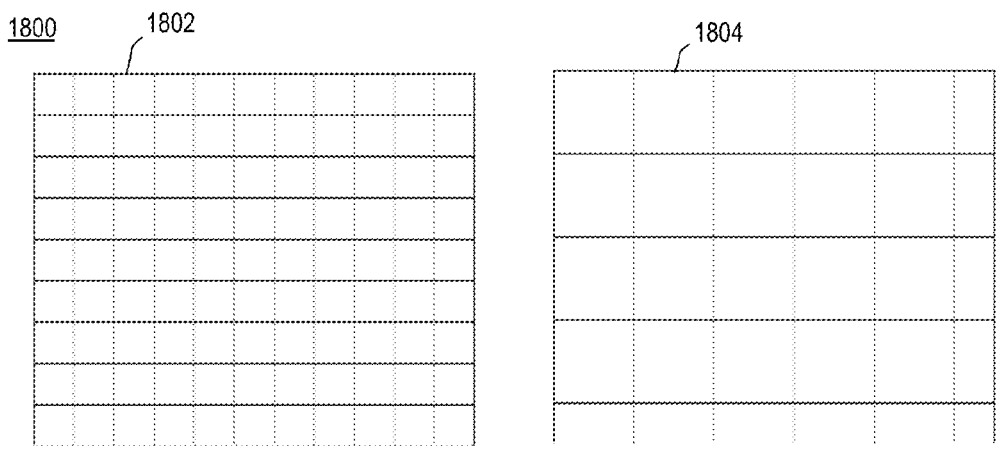
FIG. 17 is an illustrative diagram of an example array of filter coefficients.

FIG. 17 is an illustrative diagram of an example array 1700 of filter coefficients. For example, the array of filter coefficients may represent a quality restoration filter. The quality restoration filter may exhibit one or more forms of symmetry.

As illustrated, array 1700 may be a rectangular array (e.g., 11×9) that may be used for Chroma data. In the illustrated example, only the coefficient locations used for filtering are shown as being filled with a number in the potential locations of array 1700. In this example, coefficients at 55 locations are utilized for filtering and are shown by cells with filled coefficient numbers. Of these 55 cells with filled coefficient numbers, 33 are unique coefficients and the remaining 33 are symmetric coefficients with non-unique values (e.g., 33 unique coefficients c(0) through c(31) with 57 total locations may also be referred to as 33/55 taps).

As shown in FIG. 17, a 11×9 array of filter coefficients may include 33 unique filter coefficients c(0) through c(32) illustrated in dark grayscale; 22 symmetric copied coefficients c(0) through c(15) and c(19) through c(24) illustrated in light grayscale; and 44 vacant coefficient locations. As with FIGS. 13 through 16, and as shown in FIG. 17, the quality restoration filter may exhibit partial point symmetry and/or partial rotational symmetry (e.g., with respect to the center of the filter). While the point and rotational symmetries of FIG. 17 are not fully described for the sake of brevity as such symmetries were described for FIGS. 11, 13, and 14, it is sufficient to note with respect to FIG. 17 that the shape formed by a group of unique and symmetric coefficients may vary from the specific shapes shown in the accompanying figures.

As shown in FIG. 17, the 33 unique filter coefficients c(0) through c(32) and the 22 symmetric copied coefficients c(0) through c(15) and c(19) through c(24) may form a substantially diamond shape, with 11 of the vacant coefficient locations at or extending from each corner of a rectangle enclosing the diamond shape.

As will be described in greater detail below with regard to operation 1914 of FIG. 19, to compute a wiener filter of a specific shape for a given input signal X(n) and error signal Y(n) we may first describe the shape using the following parameters: 1) The rectangular base dimension (width W and height H); 2) $N_t$—number of taps; 3) $N_c$—number of unique coefficients; 4) symap array—an array of size $N_1$ of coefficient indices (with $N_c$ unique coefficient indices); 5) dxmap array—an array of coefficients location (x coordinate) relative to the center coefficient; and/or 6) dymap array—an array of coefficients location (y coordinate) relative to the center coefficient.

The first step in filter computation process may be to accumulate data for autocorrelation matrix R, and cross-correlation vector $R_{dx}$. For all n points/pixels (x,y) in the input and error signals X(n) and Y(n), pseudo code for filter generation for a specific shape can be listed as follows.

for i=0 to $N_t-1$
for j=0 to $N_t-1$
  $R_{xx}$(symap[i],symap[j])+=X(x+dxmap[i],y+dymap[i])* X(x+dxmap[j], y+dymap[j])
  R(symap[i])+=Y(x,y)*X(x+dxmap[i], y+dymap[i])
next j
next i The accumulation process may result in an $N_c \times N_c$ matrix $R_{xx}$ and an $N_c$-dimensional vector $R_{dx}$. Next, a linear equation solver may be applied to obtain an $N_c$-dimensional vector h such that:

$$h = R_{xx}^{-1} R_{dx}.$$

The final filter may be obtained by normalizing h to a 10-bit (1024) precision representation.

Figure 18:
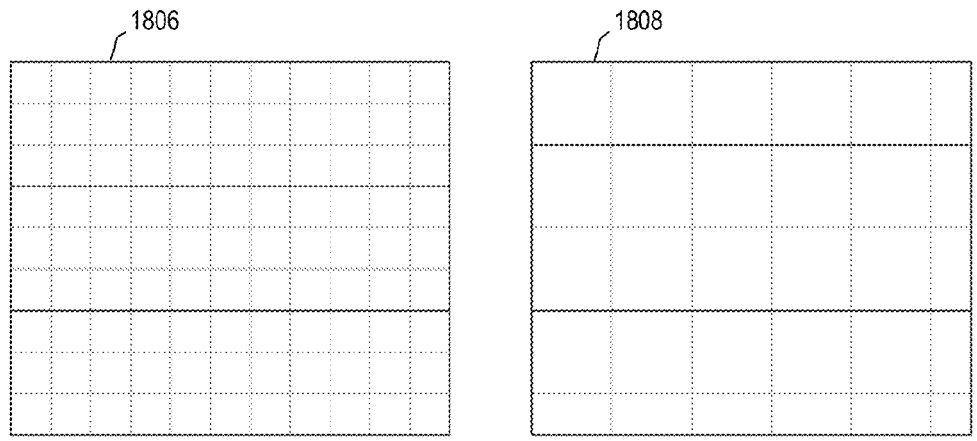
FIG. 18 is an illustrative diagram of example partitioned pictures.

FIG. 18 is an illustrative diagram of example partitioned pictures 1800. For example, pictures may be partitioned into smaller sections for further processing. As shown in FIG. 18, the pictures may be partitioned for filtering when using 32×32 and 64×64 tiles into three horizontal equal partitions 1806, three horizontal unequal partitions 1806, many equal partitions 1802, and/or many unequal partitions 1804.

As will be described in greater detail below with regard to operation 1912 of FIG. 19, certain notations may be utilized in accordance with at least some implementations of the present disclosure. For example Y0, Y1, and Y2 may represent top, middle and bottom partitions of the luma plane, and correspondingly U0, U1, U2 and V0, V1, V2 represent the top, middle and bottom partitions of the U and V planes.

Further, FY0, FY1, and FY2 may represent computed filters for top, middle and bottom partitions of the luma plane, and FcbY0, FcbY1, and FcbY2 may represent closest match by codebook to computed filters. Likewise, correspondingly FU0, FU1, FU2 and FV0, FV1, FV2 may represent the computed filters for top, middle and bottom partitions of the U and V planes. Further, FcbU0, FcbU1, FcbU2 and FcbV0, FcbV1, FcbV2 may represent the closest match by codebook to computed filters for top, middle and bottom partitions of the U and V planes.

Additionally, F(Pn) may represent "Part n of plane P filtered with filter F," whereas NF(Pn) may represent "no filtering applied on part n of plane P."

Further, cost(F) may represent "cost of coding filter F," whereas SAD(F(Pn)) may represent "SAD of part n of plane P filtered with filter F."

Figure 19A:
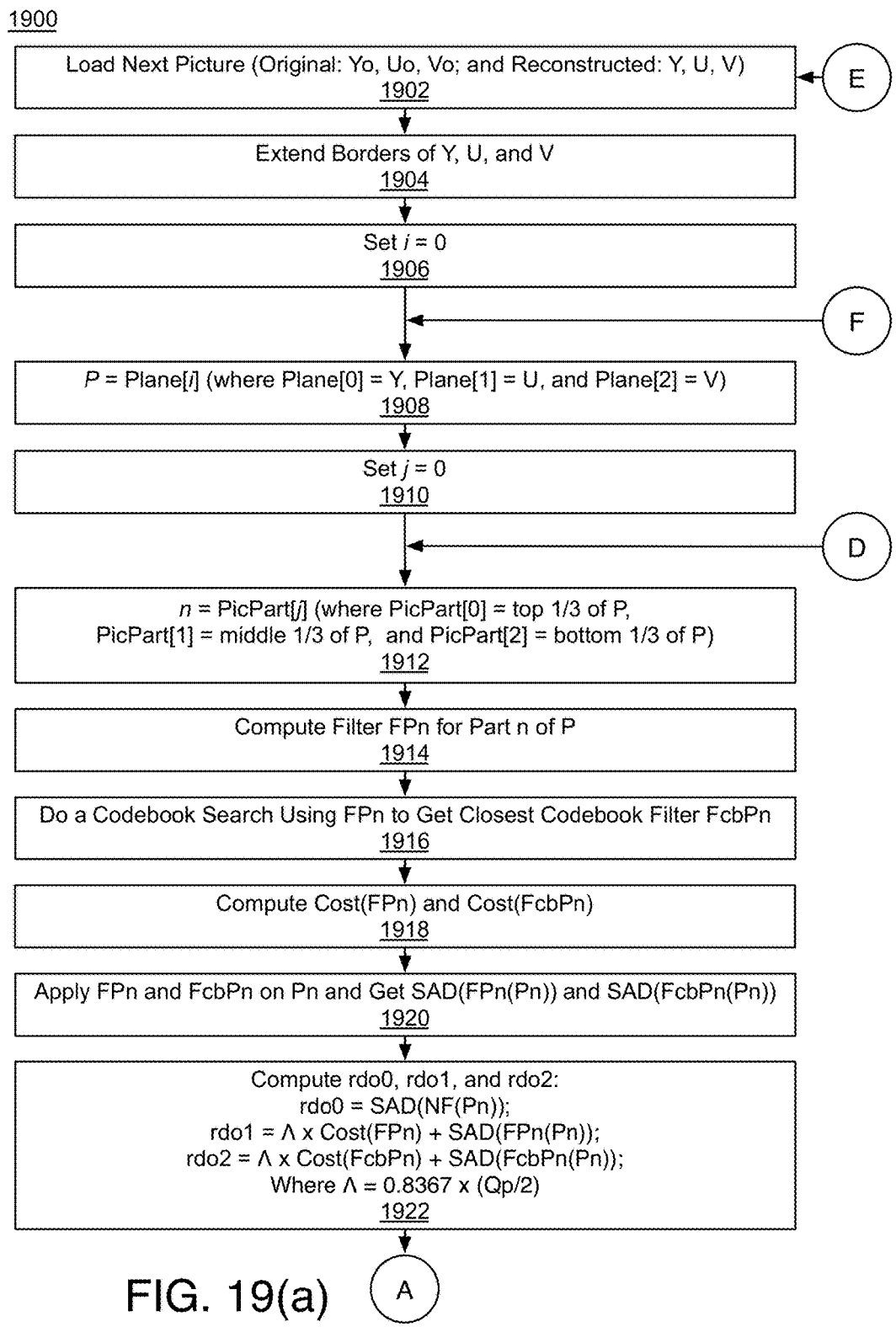
FIG. 19(a), 19(b), 19(c) is a flow diagram illustrating an example encoding process.
Figure 19B:
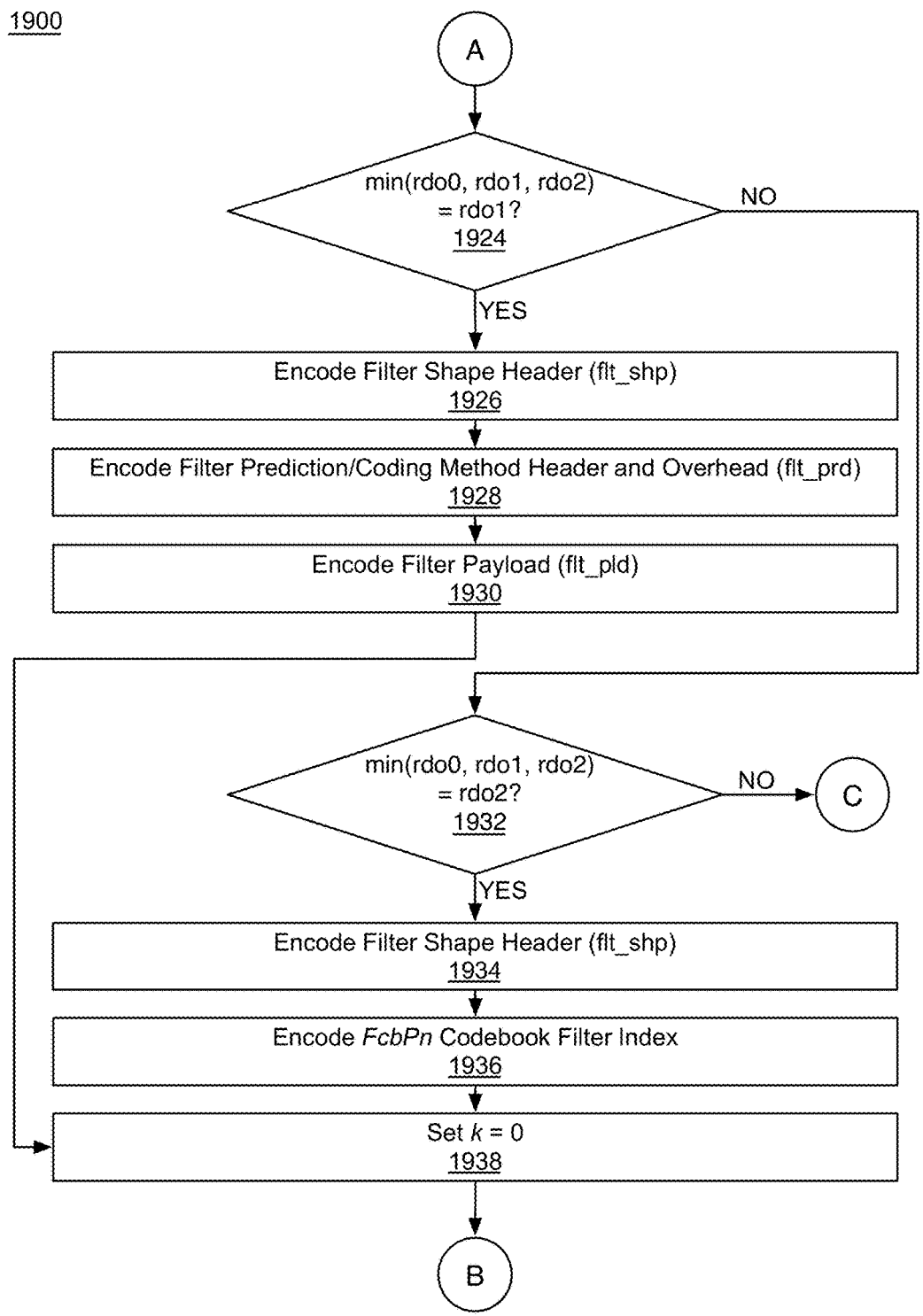
Figure 19C:
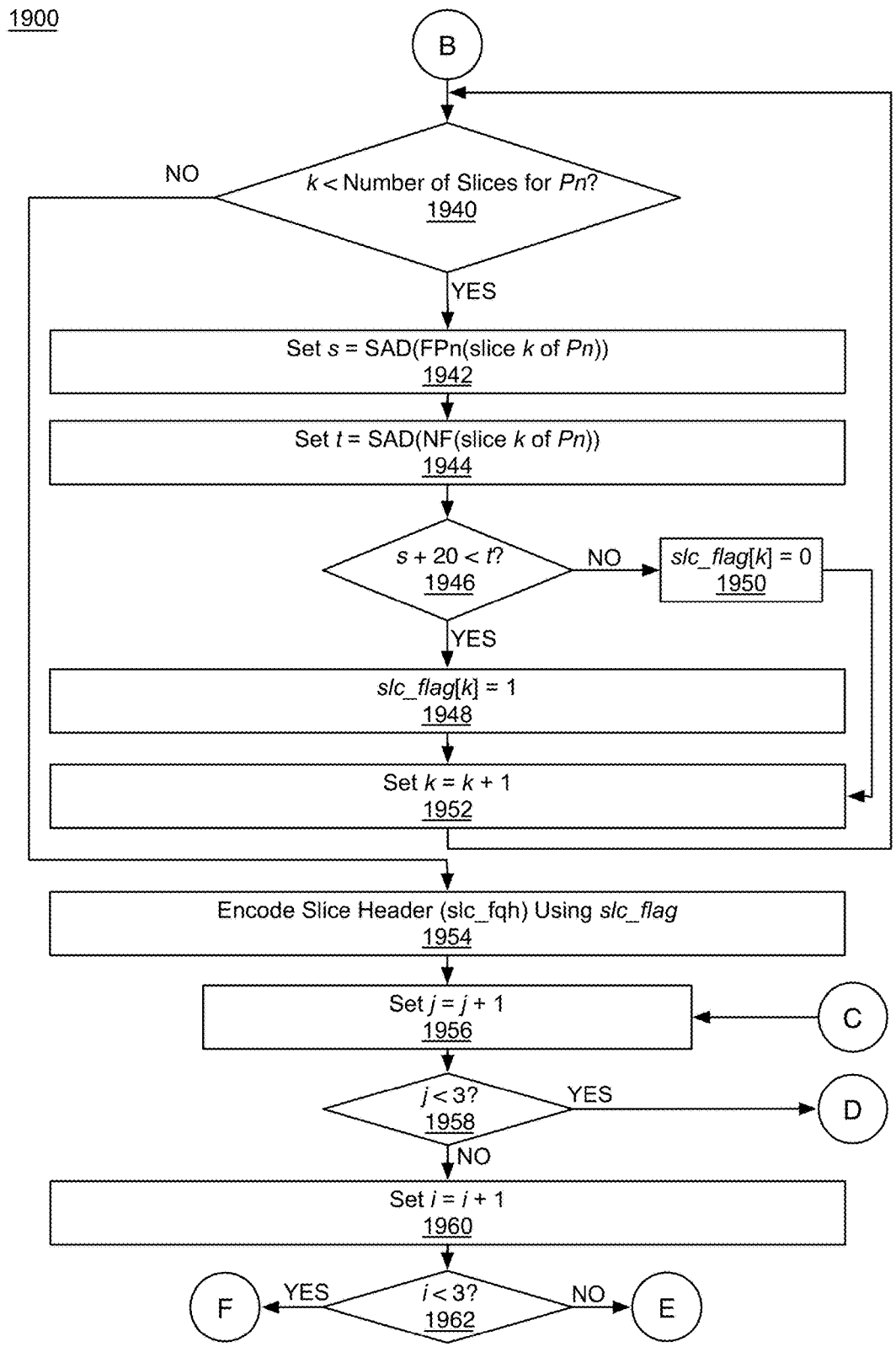

FIGS. 19(a) through 19(c) are a flow diagram illustrating an example process 1900, arranged in accordance with at least some implementations of the present disclosure. Process 1900 may include one or more operations, functions or actions as illustrated by one or more operations. Process 1900 may form at least part of a next generation video coding process. By way of non-limiting example, process 1900 may form at least part of a next generation video encoding process as undertaken by encoder system 100 of FIG. 1 and/or any other encoder system or subsystems described herein.

Process 1900 may begin at operation 1902, "Load Next Picture (Original: Yo, Uo, Vo; and Reconstructed: Y, U, V)", where a next picture may be loaded, including luma and chrominance planes of original and reconstructed pictures.

Process 1900 may continue at operation 1904, "Extend Borders of Y, U, and V", where the borders of the luma and chrominance planes may be extended.

Process 1900 may continue at operation 1906, "Set i=0", where a plane counter i may be set to zero.

Process 1900 may continue at operation 1908, "P=Plane [i] (where Plane[0]=Y, Plane[1]=U, and Plane[2]=V)", where the current plane may be selected based on the value of plane counter i.

Process 1900 may continue at operation 1910, "Set j=0", where a horizontal partition counter j may be set to zero.

Process 1900 may continue at operation 1912, "n=PicPart [j] (where PicPart[0]=top ⅓ of P, PicPart[1]=middle ⅓ of P, and PicPart[2]=bottom ⅓ of P)", where the current horizontal partition may be selected based on the value of horizontal partition counter j. As discussed above with respect to FIG. 18, such partitioning may not be limited to 3 partitions and may not be limited to equal partitions.

Process 1900 may continue at operation 1914, "Compute Filter FPn for Part n of P", where a computed filter FPn may be computed for the selected horizontal partition of the selected plane. As discussed above with respect to FIG. 17, such a computed filter shape may be selected, unique filter may be calculated and arranged in the computed filter shape, and the symmetric coefficients may be copied and arranged in the computed filter shape.

Process 1900 may continue at operation 1916, "Do a Codebook Search Using FPn to Get Closest Codebook Filter FcbPn", where a codebook may be searched for the closest matched filter to the computed filter.

Process 1900 may continue at operation 1918, "Compute Cost(FPn) and Cost(FcbPn)", where the bit cost of coding the computed filter and the closest matched filter may be calculated.

Process 1900 may continue at operation 1920, "Apply FPn and FcbPn on Pn and Get SAD(FPn(Pn)) and SAD (FcbPn(Pn))", where the computed filter and the closest matched filter may be applied to the selected horizontal partition of the selected plane, and the sum of absolute differences may be calculated for both the computed filter applied to the selected horizontal partition of the selected plane and the closest matched filter applied to the selected horizontal partition of the selected plane.

Process 1900 may continue at operation 1922, "Compute rdo0, rdo1, and rdo2: rdo0=SAD(NF(Pn)); rdo1=Λ×Cost (FPn)+SAD(FPn(Pn)); rdo2=Λ×Cost(FcbPn)+SAD(FcbPn (Pn)); Where Λ=0.8367×(Qp/2)", where rate distortion optimization values may be computed, with an initial rate distortion optimization value equaling the sum of absolute differences calculated for no filter applied to the selected horizontal partition of the selected plane, an additional rate distortion optimization value equaling Λ multiplied by the bit cost of coding the calculated filter with this product added to the sum of absolute differences calculated for the calculated filter applied to the selected horizontal partition of the selected plane, and a final rate distortion optimization value equaling Λ multiplied by the bit cost of coding the closest matched filter with this product added to the sum of absolute differences calculated for the closest matched filter applied to the selected horizontal partition of the selected plane, where Λ equals 0.8367 multiplied by a quantization parameter divided by 2.

Process 1900 may continue at operation 1924, "min(rdo0, rdo1, rdo2)=rdo1?", where a determination may be made as to whether the smallest of the rate distortion optimization values is the rate distortion optimization value computed using the calculated filter. If the smallest of the rate distortion optimization values is not the rate distortion optimization value computed using the calculated filter, process 1900 may continue at operation 1932 below.

If the smallest of the rate distortion optimization values is the rate distortion optimization value computed using the calculated filter, process 1900 may continue at operation 1926, "Encode Filter Shape Header (flt_shp)", where a filter shape header may be encoded for the calculated filter.

Process 1900 may continue at operation 1928, "Encode Filter Prediction/Coding Method Header and Overhead (flt_prd)", where filter prediction/coding method header and overhead may be encoded for the calculated filter.

Process 1900 may continue at operation 1930, "Encode Filter Payload (flt_pld)", where a filter payload may be encoded for the calculated filter. Process 1900 may then continue at operation 1938 below.

If, at operation 1924, the smallest of the rate distortion optimization values is not the rate distortion optimization value computed using the calculated filter, process 1900 may continue at operation 1932, "min(rdo0, rdo1, rdo2)=rdo2?", where a determination may be made as to whether the smallest of the rate distortion optimization values is the rate distortion optimization value computed using the closest matched filter. If the smallest of the rate distortion optimization values is not the rate distortion optimization value computed using the closest matched filter, process 1900 may continue at operation 1956 below, where process 1900 may default to a condition where neither a calculated filter nor a closest matched filter will be utilized.

If the smallest of the rate distortion optimization values is the rate distortion optimization value computed using the closest matched filter, process 1900 may continue at operation 1934, "Encode Filter Shape Header (flt_shp)", where a filter shape header may be encoded for the closest matched filter.

Process 1900 may continue at operation 1936, "Encode FcbPn Codebook Filter Index", where a codebook filter index may be encoded for the closest matched filter applied to the selected partition of the selected plane.

Process 1900 may continue at operation 1938, "Set k=0", where a slice counter k may be set to zero. For example, individual picture partitions discussed at operation 1912 may include one or more slices within each individual picture partition.

Process 1900 may continue at operation 1940, "k<Number of Slices for Pn", where a determination may be made as to whether slice counter k is less than the number of slices for the selected horizontal partition of the selected plane. If slice counter k is not less than the number of slices for the selected horizontal partition of the selected plane, process 1900 may continue at operation 1954 below.

If slice counter k is less than the number of slices for the selected horizontal partition of the selected plane, process 1900 may continue at operation 1942, "Set s=SAD(FPn (slice k of Pn))", where a comparator s may be set to equal the sum of absolute differences calculated for the calculated filter applied to the selected horizontal partition of the selected plane with respect to slice k.

Process 1900 may continue at operation 1944, "Set t=SAD(NF(slice k of Pn))", where a comparator t may be set to equal the sum of absolute differences calculated for no filter applied to the selected horizontal partition of the selected plane with respect to slice k.

Process 1900 may continue at operation 1946, "s+20<t?", where a determination may be made as to whether comparator s plus 20 is less than comparator t. If comparator s plus 20 is not less than comparator t, process 1900 may continue at operations 1950 below.

If comparator s plus 20 is less than comparator t, process 1900 may continue at operation 1948, "slc_flag[k]=1", where a slice flag for slice k may be set to one.

If, at operation 1946, comparator s plus 20 is not less than comparator t, process 1900 may continue at operation 1950, "slc_flag[k]=0", where a slice flag for slice k may be set to zero.

Process 1900 may continue at operation 1952, "Set k=k+1", where slice counter k may be incremented by one. Process 1900 may then continue at operation 1940 above.

If, at operation 1940, slice counter k is not less than the number of slices for the selected horizontal partition of the selected plane, process 1900 may continue at operation 1954, "Encode Slice Header (slc_fqh) Using slc_flag", where a slice header may be encoded using slc_flag.

Process 1900 may continue at operation 1956, "Set j=j+1" where horizontal partition counter j may be incremented by one. Also, as described above, at operation 1956 process 1900 may default to a condition where neither a calculated filter nor a closest matched filter will be utilized.

Process 1900 may continue at operation 1958, "j<3?", where a determination may be made as to whether horizontal partition counter j is less than three. If horizontal partition counter j is less than three, process 1900 may continue at operation 1912 above. As discussed above with respect to FIG. 18, such partitioning may not be limited to 3 partitions and may not be limited to equal partitions.

If horizontal partition counter j is not less than three, process 1900 may continue at operation 1960, "Set i=i+1", where plane counter i is incremented by one.

Process 1900 may continue at operation 1962, "i<3?", where a determination may be made as to whether plane counter i is less than three. If plane counter i is less than three, process 1900 may continue at operation 1908 above. If plane counter i is not less than three, process 1900 may continue at operation 1902 above.

In operation, process 1900 may operate so that for each of the three components C=(Y, U, V) operations 1902-1960 may be repeated. For example, at operation 1912 the frame may be into horizontal picture partitions (3, for example). At operation 1914, at encoder, a priori (content and quantizer based) a selection may be made regarding which one of possible shapes (e.g., from 3 possible shapes) will be used by the $n^{th}$, n=(0, 1, 2), horizontal partition and then the Wiener filter coefficients may be computed for that partition using pre-decided shape.

Next, via operations 1918-1922 cost, distortion, and rate distortion optimization may be determined as follows: Set rate[0]=0, distortion[0]=SAD(NCn(Cn)); set rate[1]=cost (FCn), distortion[1]=SAD(FCn(Cn)); set rate[2]=cost (FcbCn), distortion[2]=SAD(FcbCn(Cn)); and compute rdo[i], from rate[i] and distortion[i], i=0, 1, 2, where rdo[i]= lambda*rate[i]+distortion[i], and lambda=0.8367*(Qp/2).

Further, via operations 1924, 1932, and 1956 an index i may be selected from {0, 1, 2} such that rdo[i] is minimal. For example, if i=0, no filtering is performed on part n; if i=1, filtering is performed on part n using computed filter FCn. Filter coefficients are sent in this case, if i=2, filtering is performed on part n using computed filter FcbCn. Only codebook index is sent in this case. For each individual horizontal partition a determination may be made as to: 1) if no filtering is to be used, 2) if filter coefficients need sending, or 3) if codebook filter index is sent. Filter coefficients when sent maybe differentially coded. Symmetric coefficients may be predicted from within the filter. Filter coefficients of different shapes can be used for prediction.

Still further, via operations 1940-1954, for a Tile row or partial Tile row (also described as slices above) in this partition (part n) a determination may be made as to whether no filtering is better than filtering. The coding of filtering/no filtering may be done as follows: send one bit (e.g., 0) to indicate that all slices (e.g. Tile rows) need filtering. Else send one bit (e.g., 1) followed by a 1 bit per tile row. Operations 1940-1954 may be repeated for each tile row. Operations 1912-1958 may be repeated till all remaining partitions are done.

Figure 20A:
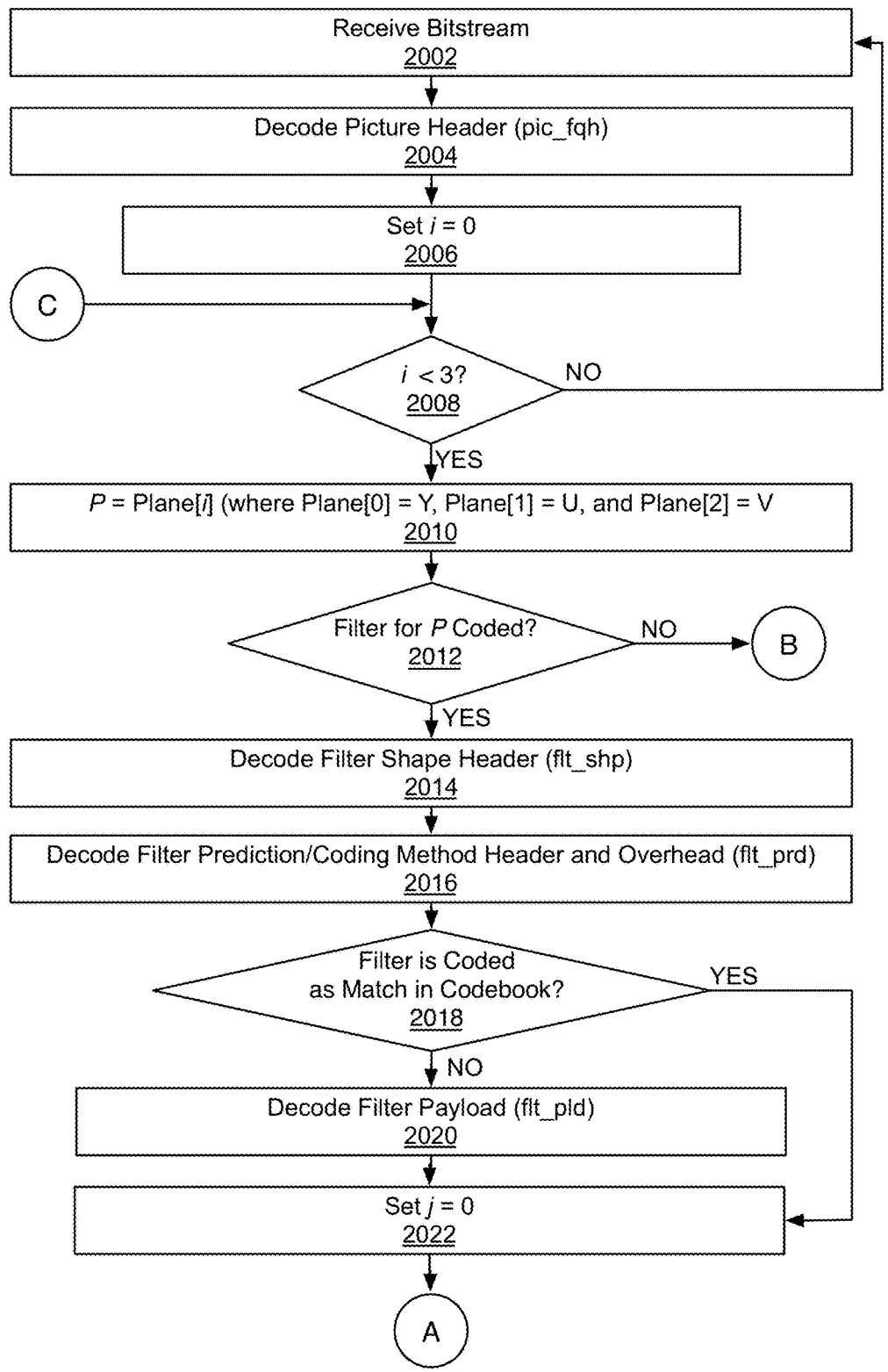
FIG. 20(a) and 20(b) is a flow diagram illustrating an example decoding process.
Figure 20B:
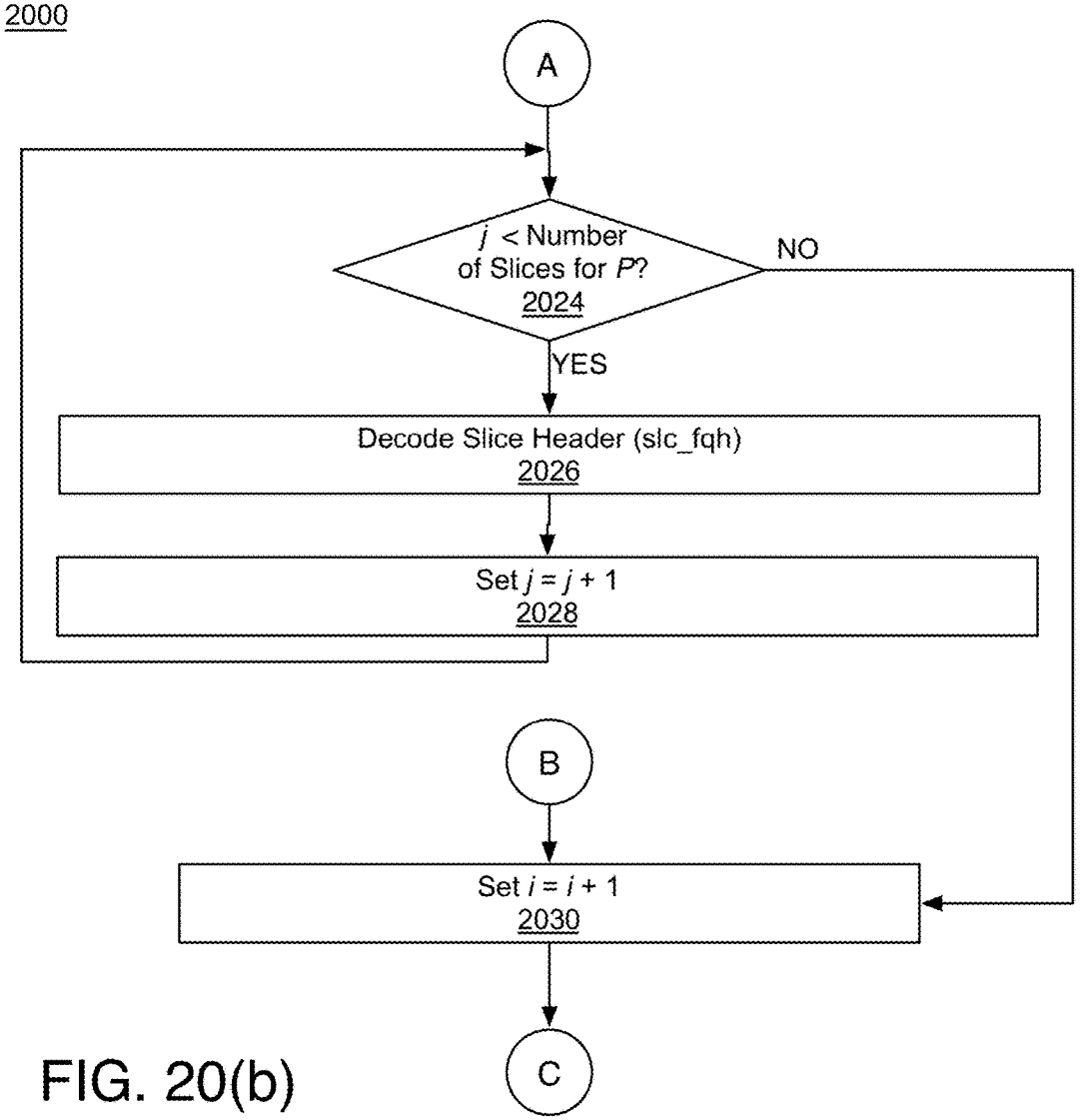

FIGS. 20(*a*) through 20(*b*) are a flow diagram illustrating an example process 2000, arranged in accordance with at least some implementations of the present disclosure. Process 2000 may include one or more operations, functions or actions as illustrated by one or more operations. Process 2000 may form at least part of a next generation video coding process. By way of non-limiting example, process 2000 may form at least part of a next generation video decoding process as undertaken by decoder system 200 of FIG. 2 and/or any other decoder system or subsystems described herein.

Process 2000 may begin at operation 2002, "Receive Bitstream", where a bitstream may be received.

Process 2000 may continue at operation 2004, "Decode Picture Header (pic_fqh)", where a picture header may be decoded.

Process 2000 may continue at operation 2006, "Set i=0", where a plane counter i may be set to zero.

Process 2000 may continue at operation 2008, "i<3?", where a determination may be made as to whether plane counter i is less than three. If plane counter i is not less than three, process 2000 may continue at operation 2002 above.

If plane counter i is less than three, process 2000 may continue at operation 2010, "P=Plane[i] (where Plane[0]=Y, Plane[1]=U, and Plane[2]=V)", where the current plane may be selected based on the value of plane counter i.

Process 2000 may continue at operation 2012, "Filter for P Coded?", where a determination may be made as to whether a filter for plane P is coded. If a filter for plane P is not coded, process 2000 may continue at operation 2030 below.

If a filter for plane P is coded, process 2000 may continue at operation 2014, "Decode Filter Shape Header (flt_shp)", where a filter shape header may be decoded.

Process 2000 may continue at operation 2016, "Decode Filter Prediction/Coding Method Header and Overhead (flt_prd)", where filter prediction/coding method header and overhead may be decoded.

Process 2000 may continue at operation 2018, "Filter is Coded as Match in Codebook?", where a determination may be made as to whether the coded filter for plane P is coded as a match in a codebook. If the coded filter for plane P is coded as a match in the codebook, process 2000 may continue at operation 2022 below.

If the coded filter for plane P is not coded as a match in the codebook, process 2000 may continue at operation 2020, "Decode Filter Payload (flt_pld)", where a filter payload is decoded.

Process 2000 may continue at operation 2022, "Set j=0", where a slice counter j may be set to equal zero.

Process 2000 may continue at operation 2024, "j<Number of Slices for P?", where a determination may be made as to whether slice counter j is less than the number of slices for plane P. If slice counter j is not less than the number of slices for plane P, process 2000 may continue at operation 2030 below.

If slice counter j is less than the number of slices for plane P, process 2000 may continue at operation 2026, "Decode Slice Header (slc_fqh)" where a slice header may be decoded.

Process 2000 may continue at operation 2028, "Set j=j+1", where slice counter j is incremented by one. Process 2000 may then continue at operation 2024 above.

Process 2000 may continue at operation 2030, "Set i=i+1", where plane counter i is incremented by one. Process 2000 may then continue at operation 2008 above.

Figure 21:
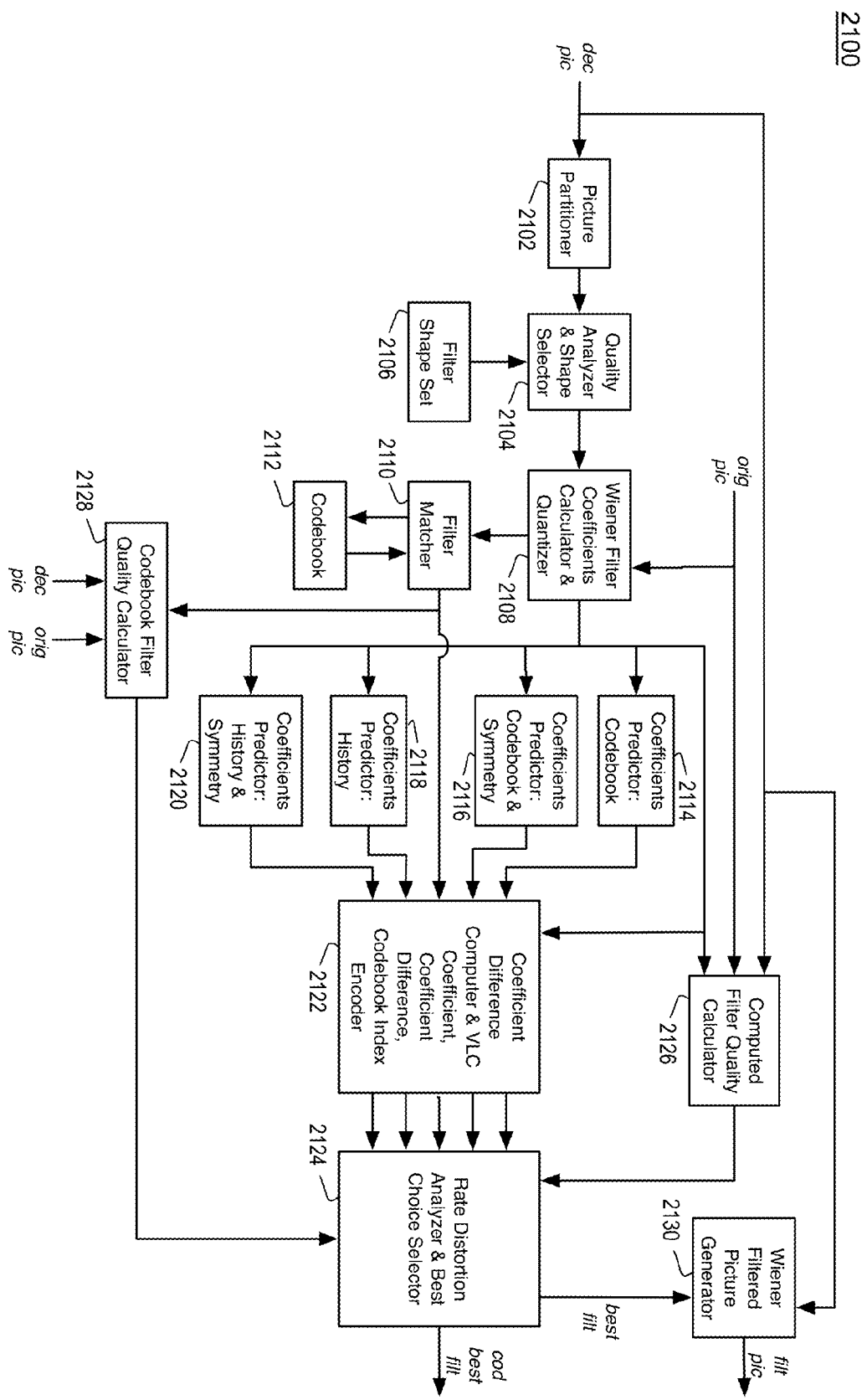
FIG. 21 is an illustrative diagram of an example encoder filter subsystem.

FIG. 21 is an illustrative diagram of an example QR encoder filter subsystem 2100, arranged in accordance with at least some implementations of the present disclosure. As illustrated, in QR encoder filter subsystem 2100, decoded pictures in an encoding loop may be input to a picture partitioner 2102. Picture patitioner 2102 that divides the picture for instance into 3 horizontal strips (e.g., slices). At such that for each such strip, a filter shape is selected via quality analyzer and shape selector 2104. For example, quality analyzer and shape selector 2104 may make such a selection based on quality, with may be is a function of quantizer and/or scene complexity. Such shapes may be selected from a library of such shapes stored as filter shape set 2106.

For each picture strip, as well as for the pre-decided selected shape, a wiener filter (e.g., a set of coefficients) may be calculated via wiener filter coefficients calculator and quantizer 2108. If needed, the accuracy of such a set of wiener filter coefficients may be reduced to enable efficient transmission via quantization.

The filter coefficients may also be matched via filter matcher 2110 to find the most similar filter coefficients from the codebook 2112. The filter coefficients, say for the luma signal, may then be predicted using one of the several prediction methods such as Codebook Prediction 2114, Codebook & Symmetry Prediction 2116, History based Prediction 2118, History and Symmetry Prediction 2120, the like, and/or combinations thereof. Further, Chroma signal use correlation between U and V channels, and are not shown here for simplicity.

Next, coefficient prediction differences may be generated and V LC Encoded in Coefficient Difference Computer & VLC Coef, Coef Difference, Codebook Index Encoder 2122. The output of Coefficient Difference Computer & VLC Coef, Coef Difference, Codebook Index Encoder 2122 may include encoded filter info as well as the associated coding bit cost and may be input to Rate Distortion Analyzer & Best Choice Selector 2124.

Another set of inputs to Rate Distortion Analyzer & Best Choice Selector 2124 may include a measurement of coding quality from computed filter quality calculator 2126 and codebook filter quality calculator 2128. Such a measurement of coding quality may include a Sum of Absolute Difference (SAD) between filtered image and the original image computed both using computed filter (e.g., via computed filter quality calculator 2126), and using codebook matched filter (e.g., via codebook filter quality calculator 2128), for example. The output of Rate Distortion Analyzer & Best Choice Selector 2124 may include both the cod best filter values (e.g., which might represent differential or even an index) as well as the actual filter coefficients, the later may be input to Wiener Filtered Picture Generator 2130, at the output of which is the actual wiener filtered (decoded) image. The decoder follows an inverse procedure but uses the filter values sent via bitstream rather than having to decide about the best selection.

Codebook and Codebook Search

For efficient coding of a filter, a filter codebook is introduced. The filter codebook is simply a collection of pre-computed filters, which was selected based on the good overall performance on various test sequences. There may be 9 filter codebooks, for example, used in the proposed method: Codebook for Luma (Y), Shape 1; Codebook for Luma (Y), Shape 2; Codebook for Luma (Y), Shape 3; Codebook for Chroma (U), Shape 1; Codebook for Chroma (U), Shape 4; Codebook for Chroma (U), Shape 5; Codebook for Chroma (V), Shape 1; Codebook for Chroma (V), Shape 4; and Codebook for Chroma (V), Shape 5.

In principle, a codebook may be used to obtain the closest match to the computed filter, and use it either for the filter prediction (in higher bitrate profiles), or as the actual coded filter (in lower bitrate profiles).

In order to allow for binary search, each codebook may be sorted according to the sum of the 9 center coefficients (center 3×3 area of the filter). To search for the best filter match to the computed filter, the sum of the center 3×3 area of the computed filter may be calculated first. Then, the codebook may be binary searched to obtain the filter with the closest sum. This codebook filter, along with more neighbors (e.g. up to 8 neighbors), on each side determines the (e.g. up to 17) candidate codebook filters. Finally, each of the candidate filters may be used to compute the MSE. The candidate with the smallest MSE may be chosen as the best codebook-based representative of the actual computed filter. The codebook search can be described using the following operations, for example:

Compute a filter F using Wiener-Hopf method;

Calculate the S as the sum of the center 3×3 coefficients of F;

Search for the sum of the center 3×3 area of the filters from the codebook that is closest to S using binary search algorithm;

Mark the corresponding filter match as F';

Select 8+1+8=17 filters from the codebook, centered around F', as the candidate set of matching codebook filters;

Compute MSE for all candidate filters; and

Select the filter with the smallest MSE as the final codebook match of F.

In addition to the codebook, processes described herein may also keep track of the previously selected filters (e.g., up to 8) for each plane, the so-called filter history. At the very first frame in the scene, the history may be empty and thus not used. But if the history is non-empty, it typically yields better prediction results than the codebook. In some examples, the history only keeps track of up to 8 last filters (per YUV plane). At the end of each frame, history may be updated with the encoded filters for the current picture. At that time, the codebooks also may be updated with the encoded filters. To update a codebook with a filter, the pointer to the codebook match may be selected. The filter codebook entries to the left or to the right of the match may be shifted towards the beginning or end, thus making room to insert the computed filter to the left or to the right of the match (depending on the sum of the 3×3 center area of the filter) in order to keep the filter codebook sorted according to the center area sum. The codebook update can be described using the following operations, for example:

Search for the coded filter in the codebook using its sum of center 3×3 area S and the binary search algorithm;

If the codebook filter with the closest sum F' is exactly equal to the coded filter, terminate; otherwise, proceed with codebook update;

Compute $D_F$ as the difference between S and the sum of the center 3×3 area of the first codebook filter, and $D_L$ as the difference between S and the sum of the center 3×3 area of the last codebook filter;

If $D_F<=D_L$ then shift codebook to the right of F' by 1 filter, thus removing the last filter and making room for F to be insert next to F'; otherwise (i.e. if $D_F>D_L$) then shift codebook to the left of F' by 1 filter, thus removing the first filter and making room for F to be insert next to F';

Insert F into the codebook next to F' by keeping the resulting codebook sorted according to the center 3×3 area;

Therefore, the codebook is not static, but it is adaptive and it dynamically changes as the pictures are being processed. Both codebook and history are reset at scene changes.

Filter Prediction

Coding of filter coefficients may be mainly based on a lossless coding of prediction differences. To achieve closest possible prediction, different prediction methods (e.g., up to 6) may be used. These prediction methods are described next. Note that the center coefficient may be excluded from prediction since it can be determined at the decoder due to the fact that the total sum is 1024.

Whenever the bitrate allows it, the in-loop filters may be coded by compressing the coefficient differentials between the actual filter and the predicted filter using an entropy coder. Therefore, it is essential to have a good set of predictors in place in order to minimize the differentials and thus improve the entropy coder-based compression. The following 6 filter prediction methods may be used, for example:

Filter Prediction from Codebook;

Filter Prediction from Codebook and Spatial Symmetries;

Filter Prediction from History;

Filter Prediction from History and Spatial Symmetries;

Filter Prediction for V plane from U plane History; and

Filter Prediction for V plane from U plane History and Spatial Symmetries.

There are three primary methods of prediction: prediction with a match from the codebook, prediction with a match from the history of filters from the corresponding plane, and in case of V plane, prediction with the latest filter from the history of U plane filters, although others could be used. Each of these methods can also have a "symmetric version" in which the so-called symmetric coefficients may be predicted from the already decoded non-symmetric coefficients. This is illustrated in the following example.

Consider the hybrid 9×9 shape defined earlier. In this filter shape, there may be 57 taps and 36 unique coefficients (0, 1, . . . , 35). Suppose a symmetric prediction from the codebook is performed. Then, the coefficients 0, 1, . . . , 27 are matched and predicted from a codebook entry, while coefficients 29, 30, 31, 32, 33, 35, 35 are predicted from the actual coefficients 27, 26, 25, 20, 19, 18, 11, respectively.

See, for example, FIG. 15(b), in which illustrates prediction of symmetric coefficients from already coded non-symmetric coefficients is illustrated. This filter has 7 symmetric coefficients and 36−7=29 non-symmetric ones. Arrows show how the prediction of symmetric coefficients is performed.

Filter Prediction from Codebook

The first method, referred to as the Filter Prediction from Codebook simply uses a predicted filter from the codebook as a final prediction. This method is applicable to all 3 planes. The prediction is set to the codebook filter with the smallest SAD in respect to the computed filter. The tables below show an example of this process.

| Computed Filter Table | | | | | | | | | | | |
| --- | --- | --- | --- | --- | --- | --- | --- | --- | --- | --- | --- |
| — | — | — | — | — | — | −5 | — | — | — | — | — |
| — | — | — | — | — | — | 14 | — | — | — | — | — |
| — | — | — | 0 | 11 | −43 | 11 | 0 | — | — | — | |

| Computed Filter Table | | | | | | | | | | |
|---|---|---|---|---|---|---|---|---|---|---|
| — | — | — | 11 | −49 | 101 | −49 | 11 | — | — | — |
| 5 | −17 | 36 | −74 | 140 | 818 | 138 | −73 | 36 | −17 | 5 |
| — | — | — | 11 | −49 | 102 | −49 | 11 | — | — | — |
| — | — | — | 0 | 11 | −43 | 11 | 0 | — | — | — |
| — | — | — | — | — | 14 | — | — | — | — | — |
| — | — | — | — | — | −5 | — | — | — | — | — |

| Selected Codebook Filter (Prediction) Table | | | | | | | | | | |
|---|---|---|---|---|---|---|---|---|---|---|
| — | — | — | — | — | −6 | — | — | — | — | — |
| — | — | — | — | — | 16 | — | — | — | — | — |
| — | — | — | −2 | 17 | −54 | 17 | −2 | — | — | — |
| — | — | — | 13 | −54 | 110 | −54 | 11 | — | — | — |
| 4 | −11 | 20 | −47 | 101 | * | 105 | −47 | 20 | −11 | 4 |
| — | — | — | 11 | −52 | 111 | −56 | 13 | — | — | — |
| — | — | — | −2 | 17 | −53 | 17 | −2 | — | — | — |
| — | — | — | — | — | 16 | — | — | — | — | — |
| — | — | — | — | — | −6 | — | — | — | — | — |

| Prediction Differences Table | | | | | | | | | | |
|---|---|---|---|---|---|---|---|---|---|---|
| — | — | — | — | — | 1 | — | — | — | — | — |
| — | — | — | — | — | −2 | — | — | — | — | — |
| — | — | — | 2 | −6 | 11 | −6 | 2 | — | — | — |
| — | — | — | −2 | 5 | −9 | 5 | 0 | — | — | — |
| 1 | −6 | 16 | −27 | 39 | * | 33 | −26 | 16 | −6 | 1 |
| — | — | — | 0 | 3 | −9 | 7 | −2 | — | — | — |
| — | — | — | 2 | −6 | 10 | −6 | 2 | — | — | — |
| — | — | — | — | — | −2 | — | — | — | — | — |
| — | — | — | — | — | 1 | — | — | — | — | — |

Filter Prediction from Codebook and Spatial Symmetry

The second method, referred to as the Filter Prediction from Codebook and Spatial Symmetries uses a predicted filter from the codebook as a final prediction of the non-symmetric coefficients and spatial filter symmetries to predict the symmetric ones. A symmetric coefficient is predicted as the symmetrically corresponding previously coded non-symmetric coefficient. This method is also applicable to all 3 planes. The codebook prediction of non-symmetric part of the filter is selected as the codebook filter with the smallest SAD in respect to the non-symmetric part of the computed filter. The tables below show an example of this process.

| Computed Filter Table = | | | | | | | | | | |
|---|---|---|---|---|---|---|---|---|---|---|
| — | — | — | — | — | −5 | — | — | — | — | — |
| — | — | — | — | — | 14 | — | — | — | — | — |
| — | — | — | 0 | 11 | −43 | 11 | 0 | — | — | — |
| — | — | — | 11 | −49 | 101 | −49 | 11 | — | — | — |
| 5 | −17 | 36 | −74 | 140 | 818 | 138 | −73 | 36 | −17 | 5 |
| — | — | — | 11 | −49 | 102 | −49 | 11 | — | — | — |
| — | — | — | 0 | 11 | −43 | 11 | 0 | — | — | — |
| — | — | — | — | — | 14 | — | — | — | — | — |
| — | — | — | — | — | −5 | — | — | — | — | — |

| Selected Codebook Filter (non-symmetric coefficients only) Table = | | | | | | | | | | |
|---|---|---|---|---|---|---|---|---|---|---|
| — | — | — | — | — | −6 | — | — | — | — | — |
| — | — | — | — | — | 16 | — | — | — | — | — |
| — | — | — | −2 | 17 | −54 | 17 | −2 | — | — | — |
| — | — | — | 13 | −54 | 110 | * | * | — | — | — |
| 4 | −11 | 20 | −47 | 101 | * | * | * | * | * | * |
| — | — | — | * | * | * | * | * | — | — | — |
| — | — | — | — | — | * | — | — | — | — | — |
| — | — | — | — | — | * | — | — | — | — | — |

| Prediction with Symmeteric Coefficients Table = | | | | | | | | | | |
|---|---|---|---|---|---|---|---|---|---|---|
| — | — | — | — | — | −6 | — | — | — | — | — |
| — | — | — | — | — | 16 | — | — | — | — | — |
| — | — | — | −2 | 17 | −54 | 17 | −2 | — | — | — |
| — | — | — | 13 | −54 | 110 | −49 | 11 | — | — | — |
| 4 | −11 | 20 | −47 | 101 | * | 140 | −74 | 20 | −11 | 4 |
| — | — | — | 11 | −49 | 101 | −49 | 13 | — | — | — |
| — | — | — | −2 | 17 | −43 | 17 | −2 | — | — | — |
| — | — | — | — | — | 16 | — | — | — | — | — |
| — | — | — | — | — | −6 | — | — | — | — | — |

| Prediction Differences Table = | | | | | | | | | | |
|---|---|---|---|---|---|---|---|---|---|---|
| — | — | — | — | — | 1 | — | — | — | — | — |
| — | — | — | — | — | −2 | — | — | — | — | — |
| — | — | — | 2 | −6 | 11 | −6 | 2 | — | — | — |
| — | — | — | −2 | 5 | −9 | 0 | 0 | — | — | — |
| 1 | −6 | 16 | −27 | 39 | * | −2 | 1 | 16 | −6 | 1 |
| — | — | — | 0 | 0 | 1 | 0 | −2 | — | — | — |
| — | — | — | 2 | −6 | 0 | −6 | 2 | — | — | — |
| — | — | — | — | — | −2 | — | — | — | — | — |
| — | — | — | — | — | 1 | — | — | — | — | — |

Filter Prediction from History

This method, referred to as the Filter Prediction from History simply chooses a filter from the history as a final prediction. This method is applicable to all 3 planes, as long as there is history information available at the given plane. The prediction is set to the history filter with the smallest SAD in respect to the computed filter.

| Computed Filter Table = | | | | | | | | | | |
|---|---|---|---|---|---|---|---|---|---|---|
| — | — | — | — | — | −6 | — | — | — | — | — |
| — | — | — | — | — | 15 | — | — | — | — | — |
| — | — | — | 1 | 8 | −39 | 8 | 1 | — | — | — |
| — | — | — | 13 | −56 | 110 | −55 | 11 | — | — | — |
| 5 | −19 | 38 | −82 | 162 | 792 | 164 | −83 | 38 | −19 | 5 |
| — | — | — | 11 | −52 | 108 | −55 | 13 | — | — | — |
| — | — | — | 1 | 8 | −40 | 8 | 1 | — | — | — |
| — | — | — | — | — | 15 | — | — | — | — | — |
| — | — | — | — | — | −6 | — | — | — | — | — |

| Selected Filter from History (Prediction) Table = | | | | | | | | | | |
|---|---|---|---|---|---|---|---|---|---|---|
| — | — | — | — | — | −5 | — | — | — | — | — |
| — | — | — | — | — | 14 | — | — | — | — | — |
| — | — | — | 0 | 11 | −43 | 11 | 0 | — | — | — |
| — | — | — | 11 | −49 | 101 | −49 | 11 | — | — | — |
| 5 | −17 | 36 | −74 | 140 | * | 138 | −73 | 36 | −17 | 5 |
| — | — | — | 11 | −49 | 102 | −49 | 11 | — | — | — |
| — | — | — | 0 | 11 | −43 | 11 | 0 | — | — | — |
| — | — | — | — | — | 14 | — | — | — | — | — |
| — | — | — | — | — | −5 | — | — | — | — | — |

Prediction Differences Table =

| | | | | | -1 | | | | | |
|---|---|---|---|---|---|---|---|---|---|---|
| — | — | — | — | — | -1 | — | — | — | — | — |
| — | — | — | — | — | 1 | — | — | — | — | — |
| — | — | — | 1 | -3 | 4 | -3 | 1 | — | — | — |
| — | — | — | 2 | -7 | 9 | -6 | 0 | — | — | — |
| 0 | -2 | 2 | -8 | 22 | * | 26 | -10 | 2 | -2 | 0 |
| — | — | — | 0 | -3 | 6 | -6 | 2 | — | — | — |
| — | — | — | 1 | -3 | 3 | -3 | 1 | — | — | — |
| — | — | — | — | — | 1 | — | — | — | — | — |
| — | — | — | — | — | -1 | — | — | — | — | — |

Filter Prediction from History and Spatial Symmetry

The Filter Prediction from History and Spatial Symmetries uses a predicted filter from the history as a final prediction of the non-symmetric coefficients and spatial filter symmetries to predict the symmetric ones. A symmetric coefficient is predicted as the symmetrically corresponding previously coded non-symmetric coefficient. This method is also applicable to all 3 planes, as long as there is a history of filters available at the given plane. The codebook prediction of non-symmetric part of the filter is selected as the history filter with the smallest SAD in respect to the non-symmetric part of the computed filter.

Computed Filter Table =

| | | | | | -6 | | | | | |
|---|---|---|---|---|---|---|---|---|---|---|
| — | — | — | — | — | -6 | — | — | — | — | — |
| — | — | — | — | — | 15 | — | — | — | — | — |
| — | — | — | 1 | 8 | -39 | 8 | 1 | — | — | — |
| — | — | — | 13 | -56 | 110 | -55 | 11 | — | — | — |
| 5 | -19 | 38 | -82 | 162 | 792 | 164 | -83 | 38 | -19 | 5 |
| — | — | — | 11 | -52 | 108 | -55 | 13 | — | — | — |
| — | — | — | 1 | 8 | -40 | 8 | 1 | — | — | — |
| — | — | — | — | — | 15 | — | — | — | — | — |
| — | — | — | — | — | -6 | — | — | — | — | — |

Selected History Filter (non-symmeteric coefficients only) Table =

| | | | | | -5 | | | | | |
|---|---|---|---|---|---|---|---|---|---|---|
| — | — | — | — | — | -5 | — | — | — | — | — |
| — | — | — | — | — | 14 | — | — | — | — | — |
| — | — | — | 0 | 11 | -43 | 11 | 0 | — | — | — |
| — | — | — | 11 | -49 | 101 | * | * | — | — | — |
| 5 | -17 | 36 | -74 | 140 | * | * | * | * | * | * |
| — | — | — | * | * | * | * | * | — | — | — |
| — | — | — | * | * | * | * | * | — | — | — |
| — | — | — | — | — | * | — | — | — | — | — |
| — | — | — | — | — | * | — | — | — | — | — |

Prediction with Symmetric Coefficients Table =

| | | | | | -5 | | | | | |
|---|---|---|---|---|---|---|---|---|---|---|
| — | — | — | — | — | -5 | — | — | — | — | — |
| — | — | — | — | — | 14 | — | — | — | — | — |
| — | — | — | 0 | 11 | -43 | 11 | 0 | — | — | — |
| — | — | — | 11 | -49 | 101 | -56 | 13 | — | — | — |
| 5 | -17 | 36 | -74 | 140 | * | 162 | -82 | 36 | -17 | 5 |
| — | — | — | 13 | -55 | 110 | -56 | 11 | — | — | — |
| — | — | — | 0 | 11 | -39 | 11 | 0 | — | — | — |
| — | — | — | — | — | 14 | — | — | — | — | — |
| — | — | — | — | — | -5 | — | — | — | — | — |

Prediction Differences Table =

| | | | | | -1 | | | | | |
|---|---|---|---|---|---|---|---|---|---|---|
| — | — | — | — | — | -1 | — | — | — | — | — |
| — | — | — | — | — | 1 | — | — | — | — | — |
| — | — | — | 1 | -3 | 4 | -3 | 1 | — | — | — |
| — | — | — | 2 | -7 | 9 | 1 | -2 | — | — | — |
| 0 | -2 | 2 | -8 | 22 | * | 2 | -1 | 2 | -2 | 0 |
| — | — | — | -2 | 3 | -2 | 1 | 2 | — | — | — |
| — | — | — | 1 | -3 | -1 | -3 | 1 | — | — | — |
| — | — | — | — | — | 1 | — | — | — | — | — |
| — | — | — | — | — | 1 | — | — | — | — | — |

Filter Prediction for V-Plane from U-Plane History

This method, referred to as the Filter Prediction for V plane from U plane History chooses the last filter from the U plane history as a final prediction for the V plane filter. This method is only applicable to V plane, as long as there is history information available at the U plane.

Computed Filter Table =

| | | | | | -6 | | | | | |
|---|---|---|---|---|---|---|---|---|---|---|
| — | — | — | — | — | -6 | — | — | — | — | — |
| — | — | — | — | — | 25 | — | — | — | — | — |
| — | — | — | 23 | -30 | -32 | -30 | 23 | — | — | — |
| — | — | — | -47 | 14 | 117 | 17 | -47 | — | — | — |
| -8 | 29 | -22 | -18 | 232 | 539 | 243 | -26 | -22 | 29 | -8 |
| — | — | — | -47 | 19 | 110 | 17 | -47 | — | — | — |
| — | — | — | 23 | -30 | -28 | -30 | 23 | — | — | — |
| — | — | — | — | — | 25 | — | — | — | — | — |
| — | — | — | — | — | -6 | — | — | — | — | — |

Selected Filter from U plane History (Prediction) Table =

| | | | | | -7 | | | | | |
|---|---|---|---|---|---|---|---|---|---|---|
| — | — | — | — | — | -7 | — | — | — | — | — |
| — | — | — | — | — | 19 | — | — | — | — | — |
| — | — | — | 16 | -20 | -23 | -20 | 16 | — | — | — |
| — | — | — | -40 | 16 | 86 | 10 | -41 | — | — | — |
| -7 | 33 | -38 | -26 | 260 | * | 251 | -8 | -38 | 33 | -7 |
| — | — | — | -41 | 24 | 75 | 13 | -40 | — | — | — |
| — | — | — | 16 | -20 | -22 | -20 | 16 | — | — | — |
| — | — | — | — | — | 19 | — | — | — | — | — |
| — | — | — | — | — | -7 | — | — | — | — | — |

Prediction Differences Table =

| | | | | | 1 | | | | | |
|---|---|---|---|---|---|---|---|---|---|---|
| — | — | — | — | — | 1 | — | — | — | — | — |
| — | — | — | — | — | 6 | — | — | — | — | — |
| — | — | — | 7 | -10 | -9 | -10 | 7 | — | — | — |
| — | — | — | -7 | -2 | 31 | 7 | -6 | — | — | — |
| -1 | -4 | 16 | 8 | -28 | * | -8 | -18 | 16 | -4 | -1 |
| — | — | — | -6 | -5 | 35 | 4 | -7 | — | — | — |
| — | — | — | 7 | -10 | -6 | -10 | 7 | — | — | — |
| — | — | — | — | — | 6 | — | — | — | — | — |
| — | — | — | — | — | 1 | — | — | — | — | — |

Filter Prediction for V-Plane from U-Plane History and Spatial Symmetry

The Filter Prediction for V plane from U plane History and Spatial Symmetries method uses the last filter from the U plane history as a final prediction of the non-symmetric coefficients of the V plane filter and spatial filter symmetries to predict the symmetric ones. A symmetric coefficient is predicted as the symmetrically corresponding previously coded non-symmetric coefficient. This method is applicable only to V plane, as long as there is a history of filters available at U plane.

Example computed filter Table =

| | | | | | −6 | | | | | |
|---|---|---|---|---|---|---|---|---|---|---|
| — | — | — | — | — | −6 | — | — | — | — | — |
| — | — | — | — | — | 25 | — | — | — | — | — |
| — | — | — | 23 | −30 | −32 | −30 | 23 | — | — | — |
| — | — | — | −47 | 14 | 117 | 17 | −47 | — | — | — |
| −8 | 29 | −22 | −18 | 232 | 539 | 243 | −26 | −22 | 29 | −8 |
| — | — | — | −47 | 19 | 110 | 17 | −47 | — | — | — |
| — | — | — | 23 | −30 | −28 | −30 | 23 | — | — | — |
| — | — | — | — | — | 25 | — | — | — | — | — |
| — | — | — | — | — | −6 | — | — | — | — | — |

Selected Filter from U plane History (non-symmetric coefficients only) Table =

| | | | | | −7 | | | | | |
|---|---|---|---|---|---|---|---|---|---|---|
| — | — | — | — | — | −7 | — | — | — | — | — |
| — | — | — | — | — | 19 | — | — | — | — | — |
| — | — | — | 16 | −20 | −23 | −20 | 16 | — | — | — |
| — | — | — | −40 | 16 | 86 | 10 | −41 | — | — | — |
| −7 | 33 | −38 | −26 | 260 | * | * | * | * | * | * |
| — | — | — | * | * | * | * | * | — | — | — |
| — | — | — | * | * | * | * | * | — | — | — |
| — | — | — | — | — | * | — | — | — | — | — |
| — | — | — | — | — | * | — | — | — | — | — |

Prediction with Symmeteric Coefficients Table =

| | | | | | −7 | | | | | |
|---|---|---|---|---|---|---|---|---|---|---|
| — | — | — | — | — | −7 | — | — | — | — | — |
| — | — | — | — | — | 19 | — | — | — | — | — |
| — | — | — | 16 | −20 | −23 | −20 | 16 | — | — | — |
| — | — | — | −40 | 16 | 86 | 14 | −47 | — | — | — |
| −7 | 33 | −38 | −26 | 260 | * | 232 | −18 | −38 | 33 | −7 |
| — | — | — | −47 | 17 | 117 | 14 | −40 | — | — | — |
| — | — | — | 16 | −20 | −32 | −20 | 16 | — | — | — |
| — | — | — | — | — | 19 | — | — | — | — | — |
| — | — | — | — | — | −7 | — | — | — | — | — |

Prediction Differences Table =

| | | | | | 1 | | | | | |
|---|---|---|---|---|---|---|---|---|---|---|
| — | — | — | — | — | 1 | — | — | — | — | — |
| — | — | — | — | — | 6 | — | — | — | — | — |
| — | — | — | 7 | −10 | −9 | −10 | 7 | — | — | — |
| — | — | — | −7 | −2 | 31 | 3 | 0 | — | — | — |
| −1 | −4 | 16 | 8 | −28 | * | 11 | −8 | 16 | −4 | −1 |
| — | — | — | 0 | 2 | −7 | 3 | −7 | — | — | — |
| — | — | — | 7 | −10 | 4 | −10 | 7 | — | — | — |
| — | — | — | — | — | 6 | — | — | — | — | — |
| — | — | — | — | — | 1 | — | — | — | — | — |

Filter Coding

In case of coding the prediction differences, each difference is coded with a VLC, which support the range [−2047 . . . 2047]. Coefficients are grouped according to similarity of the prediction error magnitudes likelihood, so that the same VLC table could be used on the entire group. Typically, coefficient location determines how sharp or smooth the VLC table should be used: coefficients closer to the center area of the filter are typically larger in magnitude, so that their prediction differences are slightly larger and hence the smoother VLC tables are more appropriate; on the other hand, the coefficients on the periphery of the filter are likely smaller, thus yielding smaller differences and as such requiring sharper VLCs.

Table 2 shows an example VLC table that is used to code the prediction differences at coefficient location 0. Suppose the actual coefficient at coefficient location 0 is −6 and the predicted one is −4. Then the prediction difference is −6−(−4)=−2 so the cost of coding the difference at this location is 4 bits (0010).

TABLE 2

Sample VLC table for coefficient at location 0

| Value | VLC | Add FLC | Bit Cost |
|---|---|---|---|
| 0 | 01 | 0 | 2 |
| −1 | 10 | 0 | 2 |
| 1 | 11 | 0 | 2 |
| −2 | 0010 | 0 | 4 |
| 2 | 0011 | 0 | 4 |
| −3 | 00010 | 0 | 5 |
| 3 | 00011 | 0 | 5 |
| −4 | 000010 | 0 | 6 |
| 4 | 000011 | 0 | 6 |
| −5 | 00000100 | 0 | 8 |
| 5 | 00000101 | 0 | 8 |
| −6 | 000001100 | 0 | 9 |
| 6 | 000001101 | 0 | 9 |
| −7 | 000001110 | 0 | 9 |
| 7 | 000001111 | 0 | 9 |
| −15 . . . −8, 8 . . . 15 | 0000001 | 4 | 11 |
| −31 . . . −16, 16 . . . 31 | 00000001 | 5 | 13 |
| −63 . . . −32, 32 . . . 63 | 000000001 | 6 | 15 |
| −127 . . . −64, 64 . . . 127 | 0000000001 | 7 | 17 |
| −255 . . . −128, 128 . . . 255 | 00000000001 | 8 | 19 |
| −511 . . . −256, 256 . . . 511 | 000000000001 | 9 | 21 |
| −1023 . . . −512, 512 . . . 1023 | 0000000000001 | 10 | 23 |
| −2047 . . . −1024, 1024 . . . 2047 | 00000000000001 | 11 | 25 |

Codebook Filter Coding

This method is typically used in the lower bitrate profiles where the cost of sending the filter must be very low. The method is based on selecting the codebook filter that yields the smallest or (closest to the smallest) error.

To search for the best filter match to the computed filter, the sum of the center 3×3 area of the computed filter is calculated first. Then, codebook is binary searched to obtain the filter with the closest sum. This codebook filter, along with up to 8 more neighbors on each side determines the (up to 17) candidate codebook filters. Finally, each of the candidate filters is used to compute the MSE according to the formula introduced at the beginning of Section 2. Candidate with the smallest MSE is chosen as the best codebook-based representative of the actual computed filter. The codebook search can be described using the following operations:

Compute a filter F using Wiener-Hopf method;
Calculate the S as the sum of the center 3×3 coefficients of F;
Search for the sum of the center 3×3 area of the filters from the codebook that is closest to S using binary search algorithm;
Mark the corresponding filter match as F';
Select 8+1+8=17 filters from the codebook, centered around F', as the candidate set of matching codebook filters;
Compute MSE for all candidate filters; and
Select the filter with the smallest MSE as the final codebook match of F.

The selected filter may then be simply coded as the VLC map to its codebook index. For example, if there are 128 filters in the codebook, the cost of sending a codebook filter is 7 bits.

Complexity Advantage of our Proposed Technique

Complexity of shape based filtering of the implementations discussed herein depends on the complexity of shape.

For instance, currently 9×9 based non-symmetric filtering is considered computationally complex specially for decoding 1080p video in software. While symmetric shapes reduce complexity, they can also lose quality. Thus the hybrid (part unsymmetric, part symmetric) approach of the implementations discussed herein coupled with adaptive selection of shapes, and efficient predictive coding of coefficients represents an overall efficient solution. Overall the QR filtering system described makes good tradeoffs between gains achievable and complexity as compared to existing approaches and solutions proposed to standards committees.

Figure 22:
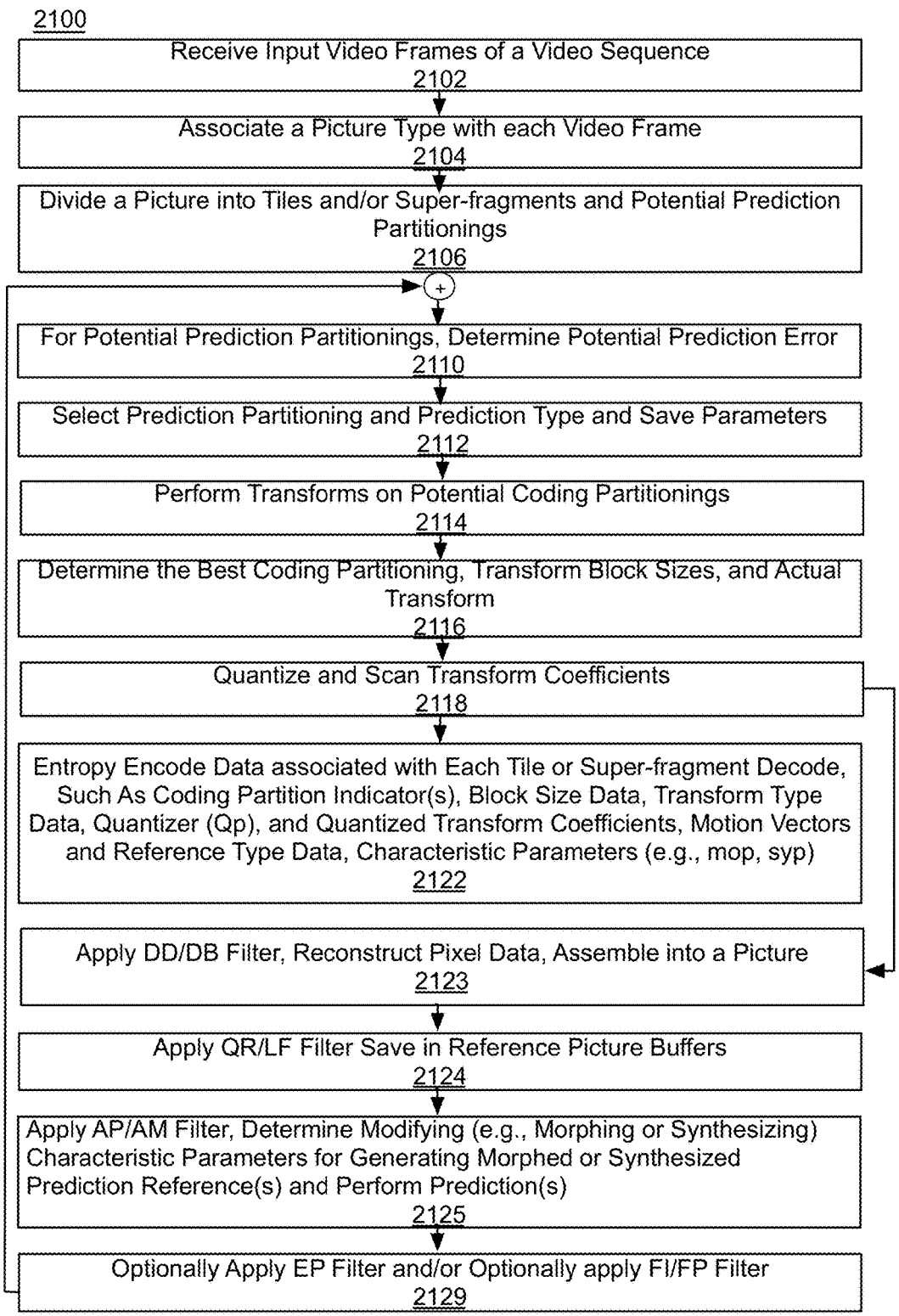
FIG. 22 is a flow diagram illustrating an example encoding process.

FIG. 22 is a flow diagram illustrating an example process 2200, arranged in accordance with at least some implementations of the present disclosure. Process 2200 may include one or more operations, functions or actions as illustrated by one or more operations. Process 2200 may form at least part of a next generation video coding process. By way of non-limiting example, process 2200 may form at least part of a next generation video encoding process as undertaken by encoder system 100 of FIG. 1 and/or any other encoder system or subsystems described herein.

Process 2200 may begin at operation 2202, "Receive Input Video Frames of a Video Sequence", where input video frames of a video sequence may be received via encoder 100 for example.

Process 2200 may continue at operation 2204, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 2203 through 2211) may be performed on a frame or picture of a group of pictures and the processing may be repeated for all frames or pictures of a group and then repeated for all groups of pictures in a video sequence.

Process 2200 may continue at operation 2206, "Divide a Picture into Tiles and/or Super-fragments and Potential Prediction Partitionings", where a picture may be divided into tiles or super-fragments and potential prediction partitions via prediction partitions generator 105 for example.

Process 2200 may continue at operation 2210, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2200 may continue at operation 2212, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2200 may continue at operation 2214, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2200 may continue at operation 2216, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2200 may continue at operation 2218, "Quantize and Scan Transform Coefficients", where transform coefficients associated with coding partitions (and/or transform blocks) may be quantized and scanned in preparation for entropy coding.

Process 2200 may continue at operation 2222, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2200 may continue at operation 2223 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2200 may continue at operation 2224 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2200 may continue at operation 2225, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2212) may include a frame reference, morphing parameters, or synthesizing parameters associated with the prediction partition.

Process 2200 may continue at operation 2229 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 2202 through 2229 may provide for video encoding and bitstream transmission techniques, which may be employed by an encoder system as discussed herein.

FIG. 23 illustrates an example bitstream 2300, arranged in accordance with at least some implementations of the present disclosure. In some examples, bitstream 2300 may correspond to output bitstream 111 as shown in FIG. 1 and/or input bitstream 201 as shown in FIG. 2. Although not shown in FIG. 23 for the sake of clarity of presentation, in some examples bitstream 2300 may include a header portion and a data portion. In various examples, bitstream 2300 may include data, indicators, index values, mode selection data, or the like associated with encoding a video frame as discussed herein.

As discussed, bitstream 2300 may be generated by an encoder such as, for example, encoder 100 and/or received by a decoder 200 for decoding such that decoded video frames may be presented via a display device.

FIG. 24 is a flow diagram illustrating an example process 2400, arranged in accordance with at least some implementations of the present disclosure. Process 2400 may include one or more operations, functions or actions as illustrated by one or more operations. Process 2400 may form at least part of a next generation video coding process. By way of non-limiting example, process 2400 may form at least part of a next generation video decoding process as undertaken by decoder system 200 and/or any other decoder system or subsystems described herein.

Process 2400 may begin at operation 2402, "Receive Encoded Bitstream", where a bitstream may be received. For example, a bitstream encoded as discussed herein may be received at a video decoder. In some examples, bitstream 2400 may be received via decoder 200.

Process 2400 may continue at operation 2404, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2400 may continue at operation 2406, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 2406 may be applied via adaptive inverse quantize module 203.

Process 2400 may continue at operation 2408, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 2400 may continue at operation 2423 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 2400 may continue at operation 2424 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2400 may continue at operation 2425, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 2400 may continue at operation 2429 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 2400 may continue at operation 2430, "Add Prediction Partition to the Decoded Prediction Error Data Partition to Generate a Reconstructed Partition", where a prediction partition may be added to the decoded prediction error data partition to generate a reconstructed prediction partition. For example, the decoded prediction error data partition may be added to the associated prediction partition via adder 206.

Process 2400 may continue at operation 2432, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 2400 may continue at operation 2434, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 2200, 2400 and other processes discussed herein may be illustrated in one or more examples of implementations discussed herein and, in particular, with respect to FIG. 25 below.

Figure 25A:
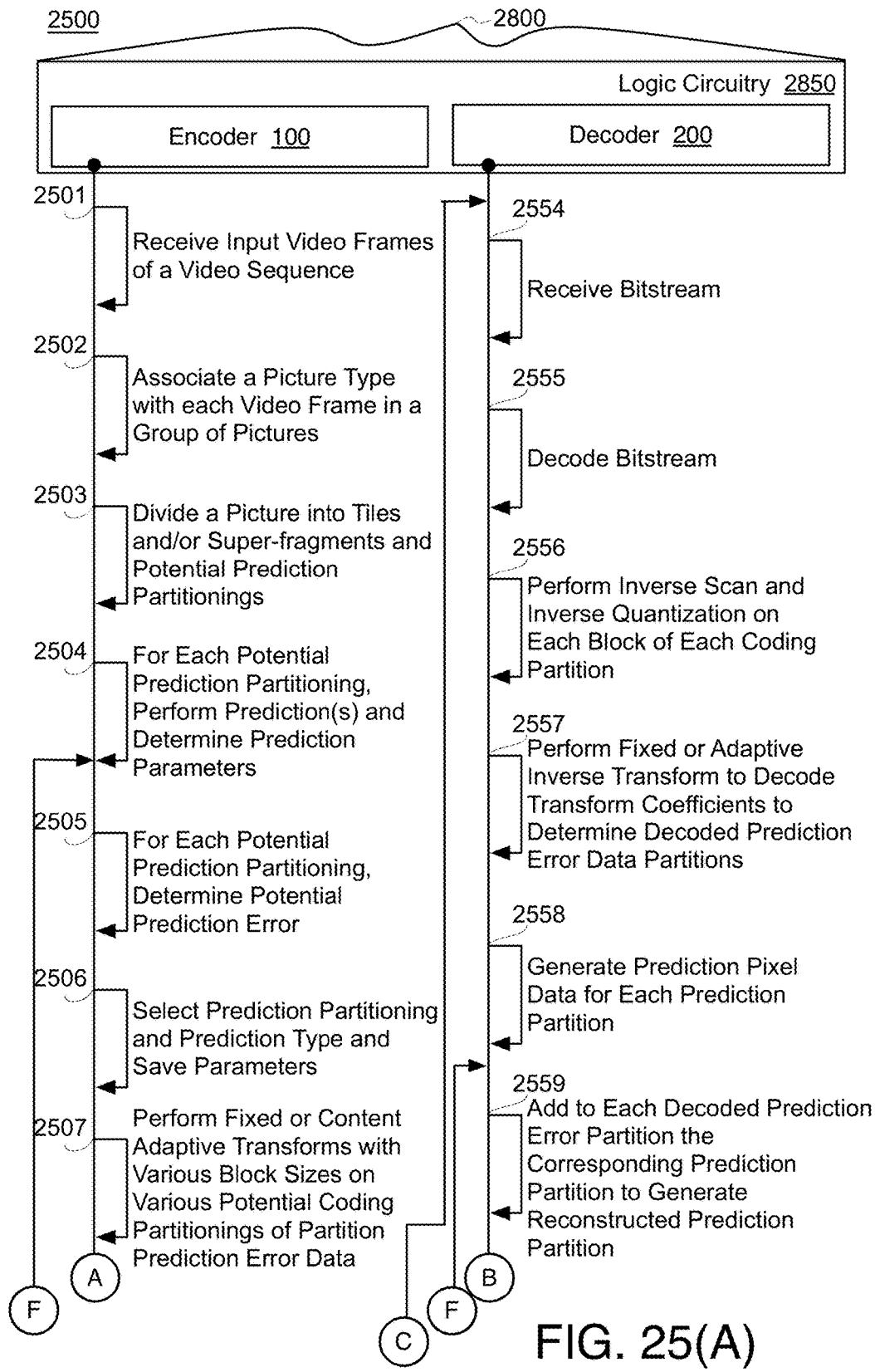
FIGS. 25(a), 25(b), and 25(c) provide an illustrative diagram of an example video coding system and video coding process in operation.
Figure 25B:
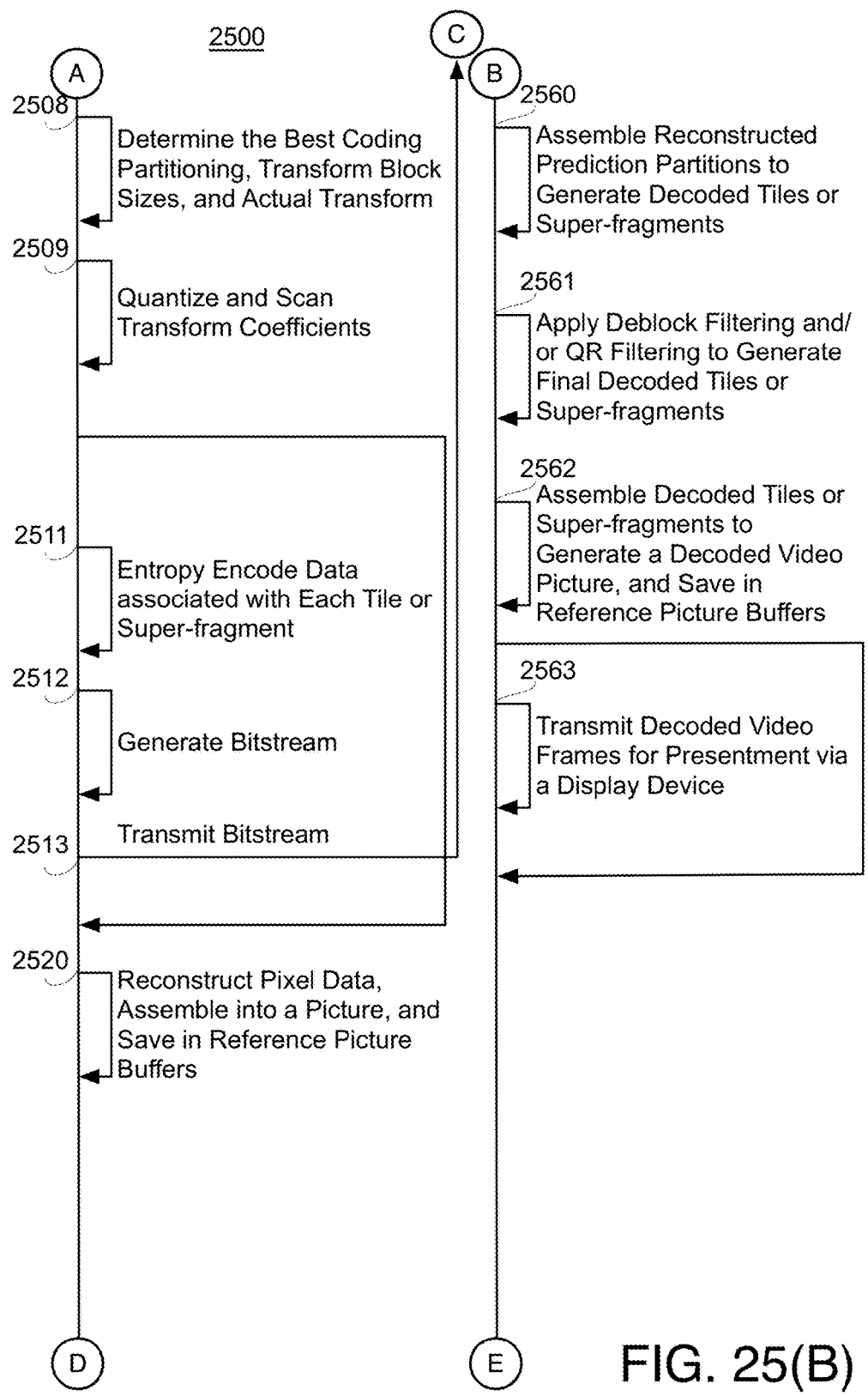
Figure 25C:
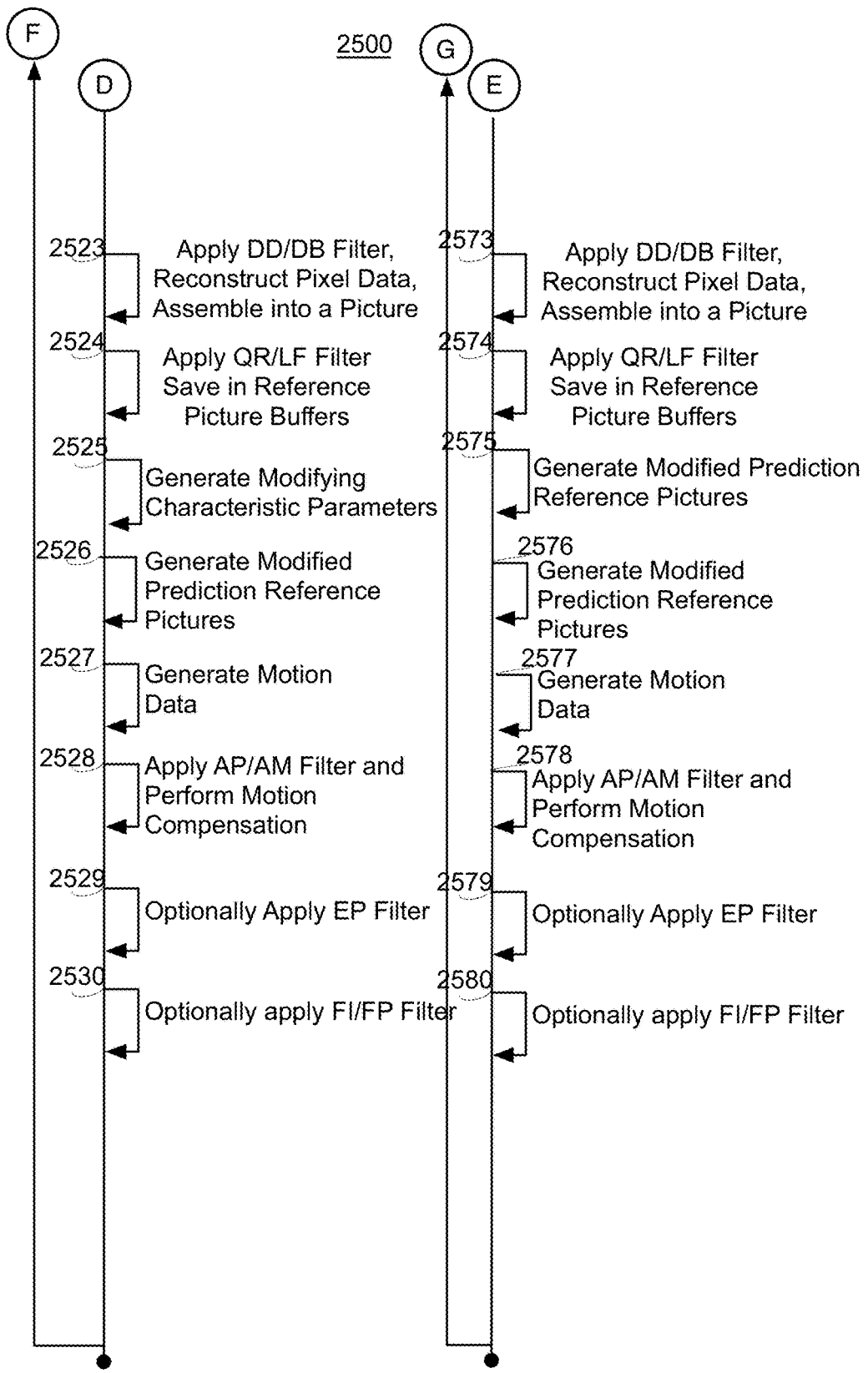

FIGS. 25(A), 25(B), and 25(C) provide an illustrative diagram of an example video coding system 2800 and video coding process 2500 in operation, arranged in accordance with at least some implementations of the present disclosure. In the illustrated implementation, process 2500 may include one or more operations, functions or actions as illustrated by one or more of actions 2501 through 2580. By way of non-limiting example, process 2500 will be described herein with reference to example video coding system 2800 including encoder 100 of FIG. 1 and decoder 200 of FIG. 2, as is discussed further herein below with respect to FIG. 28. In various examples, process 2500 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 2800 may include logic circuitry 2850, the like, and/or combinations thereof. For example, logic circuitry 2850 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 2800, as shown in FIGS. 25(A) through 25(C) may include one particular set of blocks or actions associated with particular modules, these blocks or actions may be associated with different modules than the particular modules illustrated here. Although process 2500, as illustrated, is directed to encoding and decoding, the concepts and/or operations described may be applied to encoding and/or decoding separately, and, more generally, to video coding.

Process 2500 may begin at operation 2501, "Receive Input Video Frames of a Video Sequence", where input video frames of a video sequence may be received via encoder 100 for example.

Process 2500 may continue at operation 2502, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 2503 through 2511) may be performed on a frame or picture of a group of pictures and the processing may be repeated for all frames or pictures of a group and then repeated for all groups of pictures in a video sequence.

Process 2500 may continue at operation 2503, "Divide a Picture into Tiles and/or Super-fragments and Potential Prediction Partitionings", where a picture may be divided into tiles or super-fragments and potential prediction partitions via prediction partitions generator 105 for example.

Process 2500 may continue at operation 2504, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures.

Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2512) may include a frame reference, morphing parameters, or synthesizing parameters associated with the prediction partition.

Process 2500 may continue at operation 2505, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2500 may continue at operation 2506, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2500 may continue at operation 2507, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2500 may continue at operation 2508, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2500 may continue at operation 2509, "Quantize and Scan Transform Coefficients", where transform coefficients associated with coding partitions (and/or transform blocks) may be quantized and scanned in preparation for entropy coding.

Process 2500 may continue at operation 2511, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 2500 may continue at operation 2512, "Generate Bitstream" where a bitstream may be generated based on the entropy encoded data. As discussed, in some examples, the bitstream may include a frame or picture reference, morphing parameters, or synthesizing parameters associated with a prediction partition.

Process 2500 may continue at operation 2513, "Transmit Bitstream", where the bitstream may be transmitted. For example, video coding system 2800 may transmit output bitstream 111, bitstream 2300, or the like via an antenna 2402 (please refer to FIG. 24).

Process 2500 may continue at operation 2520, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 2500 may continue at operation 2523 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2500 may continue at operation 2524 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2500 may continue at operation 2525, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 2500 may continue at operation 2526, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 2500 may continue at operation 2527, "Generate Motion Data", where, motion estimation data may be generated. For example, motion data associated with a prediction partition of a current picture may be generated based at least in part on one of the first modified prediction reference picture or the second modified prediction reference picture.

Process 2500 may continue at operation 2528, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 2500 may feed this information back to operation 2504 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 2500 may continue at operation 2529 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 2500 may continue at operation 2530 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 2501 through 2540 may provide for video encoding and bitstream transmission techniques, which may be employed by an encoder system as discussed herein. The following operations, operations 2554 through 2568 may provide for video decoding and video display techniques, which may be employed by a decoder system as discussed herein.

Process 2500 may continue at operation 2554, "Receive Bitstream", where the bitstream may be received. For example, input bitstream 201, bitstream 2300, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 2500 may continue at operation 2555, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 2500 may continue at operation 2556, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 2500 may continue at operation 2557, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 2500 may continue at operation 2558, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 2500 may continue at operation 2559, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 2500 may continue at operation 2560, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 2500 may continue at operation 2561, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 2500 may continue at operation 2562, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Process 2500 may continue at operation 2563, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2405 (as shown in FIG. 24) for presentment.

Process 2500 may continue at operation 2573 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 2500 may continue at operation 2574 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 2500 may continue at operation 2576, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 2500 may continue at operation 2577, "Generate Motion Data", where, motion estimation data may be generated. For example, motion data associated with a prediction partition of a current picture may be generated based at least in part on one of the third modified prediction reference picture or the third modified prediction reference picture.

Process 2500 may continue at operation 2578, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 2500 may feed this information back to operation 2559 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 2500 may continue at operation 2579 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 2500 may continue at operation 2580 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 2500 may be implemented via any of the coder systems as discussed herein. Further, process 2500 may be repeated either in serial or in parallel on any number of instantiations of video data such as prediction error data partitions, original data partitions, or wavelet data or the like.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Various components of the systems described herein may be implemented in software, firmware, and/or hardware and/or any combination thereof. For example, various components of system 1400 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

FIG. 26 is a flow diagram illustrating an example process 2600, arranged in accordance with at least some implementations of the present disclosure. Process 2600 may include one or more operations, functions or actions as illustrated by one or more operations. Process 2600 may form at least part of a next generation video coding process. By way of non-limiting example, process 2600 may form at least part of a next generation video encoding process as undertaken by encoder system 100 of FIG. 1 and/or any other encoder system or subsystems described herein.

Process 2600 may begin at operation 2602, "DETERMINE A FIRST QUALITY RESTORATION FILTER FOR A FIRST PARTITION OF A RECONSTRUCTED PICTURE AND A SECOND QUALITY RESTORATION FILTER FOR A SECOND PARTITION OF THE RECONSTRUCTED PICTURE", where a first quality restoration filter for a first partition of a reconstructed picture and a second quality restoration filter for a second partition of the reconstructed picture may be determined. For example, the first quality restoration filter for a first partition of a reconstructed picture and the second quality restoration filter may be determined via a quality analyzer and quality restoration filtering module. In some implementations, at least one of a shape or filter coefficients may be different between the first and second quality restoration filters.

Process 2600 may continue at operation 2604, "APPLY THE FIRST QUALITY RESTORATION FILTER TO AT LEAST A PORTION OF THE FIRST PARTITION AND THE SECOND QUALITY RESTORATION FILTER TO AT LEAST A PORTION OF THE SECOND PARTITION TO GENERATE A FINAL RECONSTRUCTED PICTURE", where the first quality restoration filter may be applied. For example, the first quality restoration filter may be applied via the quality analyzer and quality restoration filtering module filtering module.

Process 2600 may continue at operation 2606, "STORE THE FINAL RECONSTRUCTED PICTURE IN A PICTURE BUFFER", where the final reconstructed picture in a picture buffer may be stored.

In some implementations, the first quality restoration filter may be partially half symmetric such that at least a portion of a first plurality of coefficients of the first quality restoration filter may be half symmetric and a second portion of the first plurality of coefficients may not be half symmetric.

In some implementations, the first quality restoration filter may have a first shape including at least one of a substantially diamond shape or a rectangular shape.

In some examples, a computer-implemented method for video coding may further include determining, via the quality analyzer and quality restoration filtering module, whether to apply no filter to a third partition of the reconstructed picture, to apply a third quality restoration filter with codebook determined coefficients (e.g., non-calculated, but from the codebook) to the third partition, or to apply the third quality restoration filter with encoder determined coefficients (e.g., calculated coefficients) to the third partition. The determining may be based on a rate distortion optimization (e.g., rdo0, rdo1, rdo2, where 0=no filter, 1=encoder determined (calculated), 2=codebook determined). The rate distortion optimization may determine a minimum of a no filter rate distortion based on a sum of absolute differences for no filter, a codebook determined coefficients rate distortion based on a total of a sum of absolute differences for codebook determined coefficients and a modified bit cost (e.g., modified means multiplied by a factor, such as by 0.8367) for codebook determined coefficients, and an encoder determined coefficients rate distortion based on a total of a sum of absolute differences for encoder determined coefficients and a modified bit cost for encoder determined coefficients.

In some examples, chroma filters and luma filters may be different from one another on the same partition. For example, a computer-implemented method for video coding may further include determining, via the quality analyzer and quality restoration filtering module, a third quality restoration filter for the first partition of the reconstructed picture for chroma, where the first quality restoration filter may be for luma. At least one of a shape or filter coefficients may be different between the first and third quality restoration filters.

In some examples, the filters may be enabled/disabled on a slice basis. For example, the first quality restoration filter may be applied to at least a portion of the first partition may include applying the first quality restoration filter to a first slice of the first partition and disabling the first quality restoration filter for a second slice of the first partition such that the first quality restoration filter may not be applied to the second slice of the first partition.

In some examples, coefficients that are calculated (e.g., encoder determined) may be sent as differences via the bitstream. For example, the first quality restoration filter may include a first shape and a first plurality of filter coefficients including encoder determined coefficients.

The computer-implemented method for video coding may further include generating, via the quality analyzer and quality restoration filtering module, filter coefficient differences associated with the first quality restoration filter. The filter coefficient differences may include differences between the encoder determined coefficients and prediction coefficients (e.g., these are predicted coefficients) based on a filter coefficient prediction method including at least one of a codebook filter prediction, a codebook with symmetry filter prediction, a historical filter prediction, or a historical with symmetry filter prediction.

In some examples, for coefficients that match a codebook entry, a 3×3 search method may be used for such a search. For example, the second quality restoration filter may include a second shape and a second plurality of filter coefficients including codebook determined coefficients. A computer-implemented method for video coding may further include determining, via the quality analyzer and quality restoration filtering module, the codebook determined coefficients for the second quality restoration filter as best match codebook filter coefficients based on second encoder determined coefficients associated with the second quality restoration filter. Determining the best match codebook filter coefficients may include using a 3×3 shape of filter coefficients from a center portion of the second encoder determined coefficients to search an ordered codebook of filters. A first match codebook filter based on the 3×3 shape of filter coefficients may be found. At least two adjacent filters in the ordered codebook to the first match codebook filter may be evaluated to determine the best match codebook filter coefficients from the first match codebook filter and the adjacent filters.

In some examples, examples with calculated coefficients (e.g., as codebook values or historical values plus differences) and codebook coefficients may be transmitted via a bitstream. For example, the first quality restoration filter may include a first shape and a first plurality of filter coefficients including encoder determined coefficients. The second quality restoration filter may include a second shape and a second plurality of filter coefficients including codebook determined coefficients. A method for computer-implemented video coding may further include generating, via the quality analyzer and quality restoration filtering module, filter coefficient differences associated with the first quality restoration filter. Filter coefficient differences may include differences between the encoder determined coefficients and prediction coefficients based on a filter coefficient prediction method including at least one of a codebook filter prediction, a codebook with symmetry filter prediction, a historical filter prediction, or a historical with symmetry filter prediction. The codebook determined coefficients may be determined, via the quality analyzer and quality restoration filtering module, for the second quality restoration filter as best match codebook filter coefficients based on second encoder determined coefficients associated with the second quality restoration filter. First header and overhead data may be generated, via the quality analyzer and quality restoration filtering module, indicating the first shape, the filter coefficient prediction method, and a first payload of the filter coefficient differences associated with the first quality restoration filter. A second header had overhead data may be generated, via the quality analyzer and quality restoration filtering module, indicating the second shape, a second prediction method from at least one of a second codebook filter prediction or a second codebook with symmetry filter prediction associated with the second quality restoration filter. The first header and overhead data, the first payload, and the second header and overhead data may be encoded, via an adaptive entropy encoder, into a bitstream. The bitstream may be transmitted.

In some implementations, a computer-implemented method for video coding may further include determining, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition. The determining may be based on a rate distortion optimization. The rate distortion optimization may determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients. The third quality restoration filter may have a shape selected from a plurality of available quality restoration filter shapes. A fourth quality restoration filter may be determined, via the quality analyzer and quality restoration filtering module, for the first partition of the reconstructed picture for chroma. The first quality restoration filter may be for luma. At least one of a shape or filter coefficients may be different between the first and fourth quality restoration filters. Applying the first quality restoration filter to at least a portion of the first partition may include applying the first quality restoration filter to a first slice of the first partition and disabling the first quality restoration filter for a second slice of the first partition such that the first quality restoration filter may not be applied to the second slice of the first partition. The first quality restoration filter may include a first shape and a first plurality of filter coefficients including encoder determined coefficients. The second quality restoration filter may include a second shape and a second plurality of filter coefficients including codebook determined coefficients. The fourth quality restoration filter may include a fourth shape and a fourth plurality of filter coefficients. Filter coefficient differences associated with the first quality restoration filter may be generated, via the quality analyzer and quality restoration filtering module, including differences between the encoder determined coefficients and prediction coefficients based on a filter coefficient prediction method including at least one of a codebook filter prediction, a codebook with symmetry filter prediction, a historical filter prediction, or a historical with symmetry filter prediction. First header and overhead data indicating the first shape, the filter coefficient prediction method, and a first payload of the filter coefficient differences associated with the first quality restoration filter may be generated, via the quality analyzer and quality restoration filtering module. The codebook determined coefficients may be determined, via the quality analyzer and quality restoration filtering module, for the second quality restoration filter as best match codebook filter coefficients based on second encoder determined coefficients associated with the second quality restoration filter. Determining the best match codebook filter coefficients may include using a 3×3 shape of filter coefficients from a center portion of the second encoder determined coefficients to search an ordered codebook of filters, finding a first match codebook filter based on the 3×3 shape of filter coefficients, and evaluating at least two adjacent filters in the ordered codebook to the first match codebook filter to determine the best match codebook filter coefficients from the first match codebook filter and the adjacent filters. A second header and overhead data indicating the second shape, and a second prediction method from at least one of a second codebook filter prediction or a second codebook with symmetry filter prediction associated with the second quality restoration filter may be generated, via the quality analyzer and quality restoration filtering module. A no filter flag for the third partition may be generated, via the quality analyzer and quality restoration filtering module, when no filter may be to be applied to the third partition. A no filter slice flag for the second slice of the first partition may be generated, via the quality analyzer and quality restoration filtering module. The first header and overhead data, the first payload, the second header and overhead data, the no filter flag for the third partition, and the no filter slice flag may be encoded, via an adaptive entropy encoder, into a bitstream. The bitstream may be transmitted. The bitstream may be received. The bitstream may be decoded to determine the first header and overhead data indicating the first shape and the first prediction method, the first payload of filter coefficient differences, the second header and overhead data indicating the second shape and the second prediction method, the no filter flag for the third partition, and the no filter slice flag for the second slice of the first partition. The first quality restoration filter for the first partition of a decoded reconstructed picture and the second quality restoration filter for the second partition of the decoded reconstructed picture based on the decoded first shape, first prediction method, and first payload of filter coefficient differences and the decoded second shape and the second prediction method may be determined, via a decoder quality analyzer and quality restoration filtering module. The first quality restoration filter may be applied, via the decoder quality analyzer and quality restoration filtering module, to at least a portion of the first partition and the second quality restoration filter may be applied, via the decoder quality analyzer and quality restoration filtering module, to at least a portion of the second partition to generate a final decoded reconstructed picture. The final decoded reconstructed picture may be transmitted for presentment via a display device. The first quality restoration filter may be partially half symmetric such that at least a portion of the first plurality of coefficients may be half symmetric and a second portion of the first plurality of coefficients may not be half symmetric. The first quality restoration filter being partially half symmetric may include the first quality restoration filter exhibiting at least one of partial point symmetry or partial rotational symmetry. The first quality restoration filter may include a Wiener filter. At least one of the first shape or the second shape may include at least one of a substantially diamond shape or a rectangular shape. The rectangular shape may include the plurality of coefficients being 11 coefficients wide by 9 coefficients high. The diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape. The diamond shape may include at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients. The first quality restoration filter may include a first luma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second luma filter and the shape may include the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape. The first quality restoration filter may include a third luma filter and the shape may include the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape. The first quality restoration filter may include a first chroma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second chroma filter and the shape may include the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape. The first quality restoration filter may include a third chroma filter and the shape may include the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

In other implementations described herein, a process for video coding may include determining, via a quality analyzer and quality restoration filtering module, a first quality restoration filter for a first partition of a reconstructed picture and a second quality restoration filter for a second partition of the reconstructed picture. The filter coefficients associated with the first and/or second quality restoration filters may be based on a filter coefficient prediction method including a historical filter prediction. The quality analyzer and quality restoration filtering module, may apply the first quality restoration filter to at least a portion of the first partition and the second quality restoration filter to at least a portion of the second partition to generate a final reconstructed picture. The final reconstructed picture may be stored in a picture buffer.

In some examples, the filter coefficient prediction method may include at least one of a codebook filter prediction, a codebook with symmetry filter prediction, the historical filter prediction, or a historical with symmetry filter prediction. The filter coefficient prediction method may include a prediction of luma quality restoration filter coefficients using a predictor that predicts filter coefficients from the codebook of quality restoration filters. Additionally or alternatively, the filter coefficient prediction method may include a prediction of luma quality restoration filter coefficients using a predictor that predicts filter coefficients from the codebook with symmetry filter prediction. Additionally or alternatively, the filter coefficient prediction method may include a of luma quality restoration filter coefficients using a predictor that predicts filter coefficients from the historical with symmetry filter prediction. Additionally or alternatively, the filter coefficient prediction method may include a prediction of chroma (V) quality restoration filter coefficients using a predictor that predicts filter coefficients from the historical filter prediction coefficients based on recent history of chroma (U) quality restoration filter coefficients. Additionally or alternatively, the filter coefficient prediction method may include a prediction of chroma (V) quality restoration filter coefficients using a predictor that predicts filter coefficients from the historical with symmetry filter prediction based on recent history of chroma (U) quality restoration filter coefficients.

FIG. 27 is a flow diagram illustrating an example process 2700, arranged in accordance with at least some implementations of the present disclosure. Process 2700 may include one or more operations, functions or actions as illustrated by one or more operations. Process 2700 may form at least part of a next generation video coding process. By way of non-limiting example, process 2700 may form at least part of a next generation video encoding process as undertaken by encoder system 100 of FIG. 1 and/or any other encoder system or subsystems described herein.

Process 2700 may begin at operation 2702, "DETERMINE A QUALITY RESTORATION WIENER FILTER FOR AT LEAST A PARTITION OF A RECONSTRUCTED PICTURE", where a quality restoration Wiener filter for at least a partition of a reconstructed picture may be determined. For example, a quality restoration Wiener filter for at least a partition of a reconstructed picture may be determined via a quality analyzer and quality restoration filtering module. In some implementations, the quality restoration Wiener filter comprises a shape of a plurality of coefficients. In some examples, the quality restoration Wiener filter is partially half symmetric such that at least a portion of the plurality of coefficients are half symmetric and a second portion of the plurality of coefficients are not half symmetric.

Process 2700 may continue at operation 2704, "APPLY THE QUALITY RESTORATION WIENER FILTER MAY BE APPLIED TO AT LEAST A PORTION OF THE PARTITION OF THE RECONSTRUCTED PICTURE", where the quality restoration Wiener filter may be applied to at least a portion of the partition of the reconstructed picture. For example, the quality restoration Wiener filter may be applied, via the quality analyzer and quality restoration filtering module, to generate a final reconstructed picture.

Process 2700 may continue at operation 2706, "STORE THE FINAL RECONSTRUCTED PICTURE IN A PICTURE BUFFER", where the final reconstructed picture in a picture buffer may be stored.

In some examples, the quality restoration may exhibit partial rotational symmetry such that some but not all coefficients may be determined from original or unique coefficients by rotation about the center of the filter by an amount of rotation such as 180 degrees. For example, referring to FIG. 13, the original coefficient c(2) at position 4 from the left and 3 from the top may be copied to position 8 from the left and 7 from the top via a rotation of 180 degrees about the position 6 from the left and 5 from the top (e.g., the center of the filter). However, original coefficient c(6) at position 5 from the left and 4 from the top may not be copied to position 7 from the left and 6 from the top as would be expected via full rotational symmetry via rotation of 180 degrees about the center. Instead, another original coefficient, c(20) may be provided. Therefore, the filter illustrated in FIG. 13 may exhibit partial rotational symmetry (e.g., with respect to the center of the filter).

Additionally or alternatively, the quality restoration may exhibit partial point symmetry such that some but not all coefficients may be determined from original or unique coefficients by inversion through the center of the filter. For example, referring to FIG. 13, the original coefficient c(0) at position 6 from the left and 1 from the top may be copied to position 6 from the left and 9 from the top via an inversion through position 6 from the left and 5 from the top (e.g., the center of the filter). However, original coefficient c(6) at position 5 from the left and 4 from the top may not be copied to position 7 from the left and 6 from the top as would be expected via full point symmetry. Instead, another original coefficient, c(20) may be provided. Therefore, the filter illustrated in FIG. 13 may exhibit partial point symmetry (e.g., with respect to the center of the filter).

In some implementations, the shape may include a rectangular shape with the plurality of coefficients being 11 coefficients wide by 9 coefficients high.

In some implementations, the shape may include a substantially diamond shape having at least one vacant coefficient location at each corner of a rectangle enclosing the diamond shape.

As illustrated by FIG. 13, in some implementations, the quality restoration Wiener filter may include at least one of a luma filter or a chroma filter and the shape may include a substantially diamond shape including the plurality of coefficients having a maximum width of 11 coefficients wide by a maximum height of 9 coefficients high, a total number of the plurality of coefficients being 35 with 22 unique coefficients and 13 symmetric copied coefficients, and sixteen vacant coefficient locations at or extending from each corner of a rectangle enclosing the diamond shape.

As illustrated by FIG. 14, in some implementations, the quality restoration Wiener filter may include a luma filter and the shape may include a substantially diamond shape including the plurality of coefficients having a maximum width of 9 coefficients wide by a maximum height of 9 coefficients high, a total number of the plurality of coefficients being 49 with 32 unique coefficients and 17 symmetric copied coefficients, and eight vacant coefficient locations at or extending from each corner of a rectangle enclosing the diamond shape.

As illustrated by FIG. 15, in some implementations, the quality restoration Wiener filter may include a luma filter and the shape may include a substantially diamond shape including the plurality of coefficients having a maximum width of 9 coefficients wide by a maximum height of 9 coefficients high, a total number of the plurality of coefficients being 57 with 36 unique coefficients and 21 symmetric copied coefficients, and six vacant coefficient locations at or extending from each corner of a rectangle enclosing the diamond shape.

As illustrated by FIG. 16, in some implementations, the quality restoration Wiener filter may include a chroma filter and the shape may include a substantially diamond shape including the plurality of coefficients having a maximum width of 11 coefficients wide by a maximum height of 9 coefficients high, a total number of the plurality of coefficients being 47 with 34 unique coefficients and 13 symmetric copied coefficients, and thirteen vacant coefficient locations at or extending from each corner of a rectangle enclosing the diamond shape.

As illustrated by FIG. 17, in some implementations, the quality restoration Wiener filter may include a chroma filter and the shape may include a substantially diamond shape including the plurality of coefficients having a maximum width of 11 coefficients wide by a maximum height of 9 coefficients high, a total number of the plurality of coefficients being 55 with 33 unique coefficients and 22 symmetric copied coefficients, and eleven vacant coefficient locations at or extending from each corner of a rectangle enclosing the diamond shape.

In some implementations, the shape may include at least one of a substantially diamond shape or a rectangular shape, where the rectangular shape may include the plurality of coefficients being 11 coefficients wide by 9 coefficients high. The diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape. The diamond shape may include at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients. The quality restoration Wiener filter may include a first luma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The quality restoration Wiener filter may include a second luma filter and the shape may include the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape. The quality restoration Wiener filter may include a third luma filter and the shape may include the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape. The quality restoration Wiener filter may include a first chroma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The quality restoration Wiener filter may include a second chroma filter and the shape may include the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape. The quality restoration Wiener filter may include a third chroma filter and the shape may include the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape. The quality restoration Wiener filter being partially half symmetric may include the quality restoration Wiener filter exhibiting at least one of partial point symmetry or partial rotational symmetry.

Figure 28:
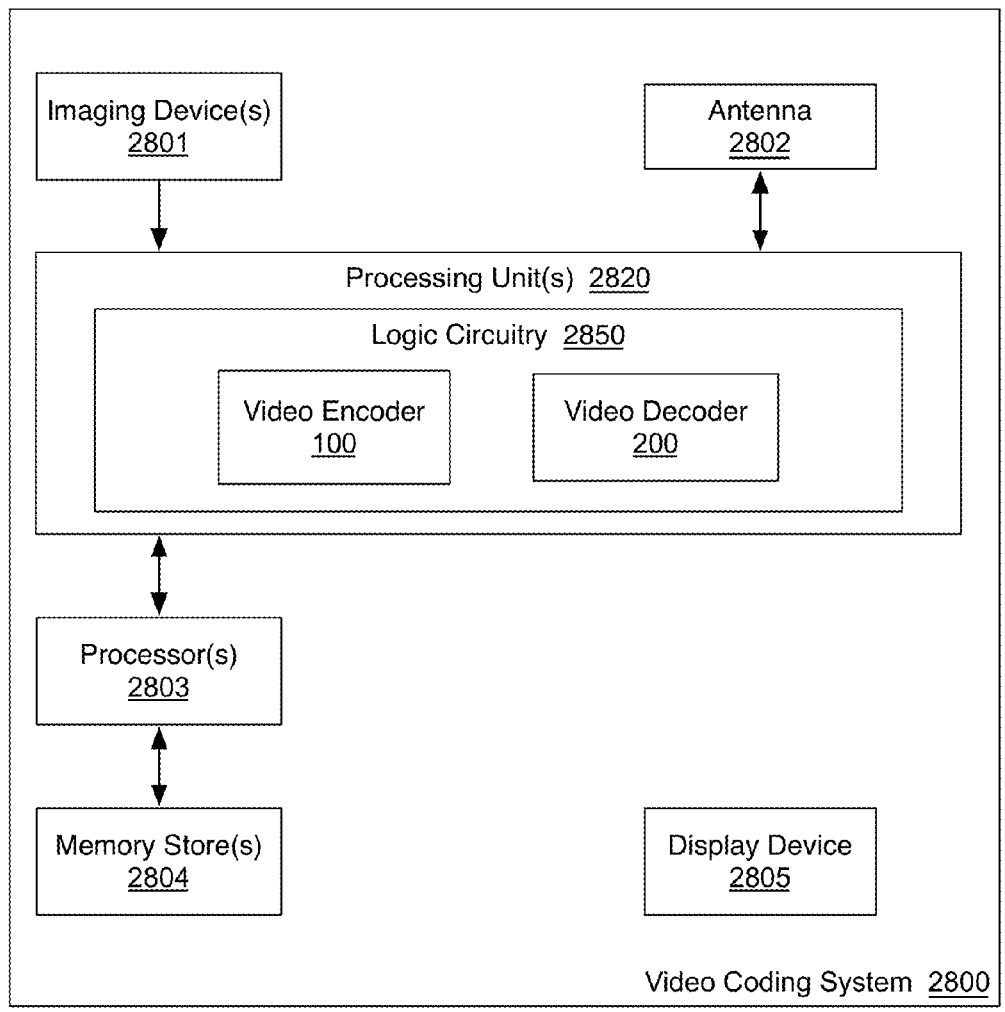
FIG. 28 is an illustrative diagram of an example video coding system.

FIG. 28 is an illustrative diagram of example video coding system 2800, arranged in accordance with at least some implementations of the present disclosure. In the illustrated implementation, video coding system 2800 may include imaging device(s) 2801, video encoder 100, video decoder 200 (and/or a video coder implemented via logic circuitry 2850 of processing unit(s) 2820), an antenna 2802, one or more processor(s) 2803, one or more memory store(s) 2804, and/or a display device 2805.

As illustrated, imaging device(s) 2801, antenna 2802, processing unit(s) 2820, logic circuitry 2850, video encoder 100, video decoder 200, processor(s) 2803, memory store(s) 2804, and/or display device 2805 may be capable of communication with one another. As discussed, although illustrated with both video encoder 100 and video decoder 200, video coding system 2800 may include only video encoder 100 or only video decoder 200 in various examples.

As shown, in some examples, video coding system 2800 may include antenna 2802. Antenna 2802 may be configured to transmit or receive an encoded bitstream of video data, for example. Further, in some examples, video coding system 2800 may include display device 2805. Display device 2805 may be configured to present video data. As shown, in some examples, logic circuitry 2850 may be implemented via processing unit(s) 2820. Processing unit(s) 2820 may include application-specific integrated circuit (ASIC) logic, graphics processor(s), general purpose processor(s), or the like. Video coding system 2800 also may include optional processor(s) 2803, which may similarly include application-specific integrated circuit (ASIC) logic, graphics processor(s), general purpose processor(s), or the like. In some examples, logic circuitry 2850 may be implemented via hardware, video coding dedicated hardware, or the like, and processor(s) 2803 may implemented general purpose software, operating systems, or the like. In addition, memory store(s) 2804 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 2804 may be implemented by cache memory. In some examples, logic circuitry 2850 may access memory store(s) 2804 (for implementation of an image buffer for example). In other examples, logic circuitry 2850 and/or processing unit(s) 2820 may include memory stores (e.g., cache or the like) for the implementation of an image buffer or the like.

In some examples, video encoder 100 implemented via logic circuitry may include an image buffer (e.g., via either processing unit(s) 2820 or memory store(s) 2804)) and a graphics processing unit (e.g., via processing unit(s) 2820). The graphics processing unit may be communicatively coupled to the image buffer. The graphics processing unit may include video encoder 100 as implemented via logic circuitry 2850 to embody the various modules as discussed with respect to FIG. 1 and/or any other encoder system or subsystem described herein. For example, the graphics processing unit may include coding partitions generator logic circuitry, adaptive transform logic circuitry, content pre-analyzer, encode controller logic circuitry, adaptive entropy encoder logic circuitry, and so on. The logic circuitry may be configured to perform the various operations as discussed herein.

In one example, video encoder 100 may include an image buffer and a graphics processing unit communicatively coupled to the image buffer. The graphics processing unit may be configured to determine a first quality restoration filter for a first partition of a reconstructed picture and a second quality restoration filter for a second partition of the reconstructed picture, where at least one of a shape or filter coefficients may be different between the first and second quality restoration filters. The graphics processing unit may be configured to apply the first quality restoration filter to at least a portion of the first partition and the second quality restoration filter to at least a portion of the second partition to generate a final reconstructed picture. The graphics processing unit may be configured to store the final reconstructed picture in a picture buffer.

In some implementations, the graphics processing unit may be further configured to determine whether to apply no filter to a third partition of the reconstructed picture, to apply a third quality restoration filter with codebook determined coefficients to the third partition, or to apply the third quality restoration filter with encoder determined coefficients to the third partition. The determination may be based on a rate distortion optimization. The rate distortion optimization may include the graphics processing unit being configured to determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients. The third quality restoration filter may have a shape may be selected from a plurality of available quality restoration filter shapes. The graphics processing unit may be configured to determine a fourth quality restoration filter for the first partition of the reconstructed picture for chroma. The first quality restoration filter may be for luma. At least one of a shape or filter coefficients may be different between the first and fourth quality restoration filters. To apply the first quality restoration filter to at least a portion of the first partition may include the graphics processing unit being configured to apply the first quality restoration filter to a first slice of the first partition and disable the first quality restoration filter for a second slice of the first partition such that the first quality restoration filter may not be applied to the second slice of the first partition. The first quality restoration filter may include a first shape and a first plurality of filter coefficients including encoder determined coefficients. The second quality restoration filter may include a second shape and a second plurality of filter coefficients including codebook determined coefficients. The fourth quality restoration filter may include a fourth shape and a fourth plurality of filter coefficients. The graphics processing unit may be configured to generate filter coefficient differences associated with the first quality restoration filter, including differences between the encoder determined coefficients and prediction coefficients based on a filter coefficient prediction method including at least one of a codebook filter prediction, a codebook with symmetry filter prediction, a historical filter prediction, or a historical with symmetry filter prediction. The graphics processing unit may be configured to generate first header and overhead data indicating the first shape, the filter coefficient prediction method, and a first payload of the filter coefficient differences associated with the first quality restoration filter. The graphics processing unit may be configured to determine the codebook determined coefficients for the second quality restoration filter as best match codebook filter coefficients based on second encoder determined coefficients associated with the second quality restoration filter. To determine the best match codebook filter coefficients may include the graphics processing unit being configured to use a 3×3 shape of filter coefficients from a center portion of the second encoder determined coefficients to search an ordered codebook of filters, find a first match codebook filter based on the 3×3 shape of filter coefficients, and evaluate at least two adjacent filters in the ordered codebook to the first match codebook filter to determine the best match codebook filter coefficients from the first match codebook filter and the adjacent filters. The graphics processing unit may be configured to generate a second header and overhead data indicating the second shape, a second prediction method from at least one of a second codebook filter prediction or a second codebook with symmetry filter prediction associated with the second quality restoration filter. The graphics processing unit may be configured to generate, when no filter may be to be applied to the third partition, a no filter flag for the third partition. The graphics processing unit may be configured to generate a no filter slice flag for the second slice of the first partition. The graphics processing unit may be configured to encode the first header and overhead data, the first payload, the second header and overhead data, the no filter flag for the third partition, and the no filter slice flag into a bitstream. The graphics processing unit may be configured to transmit the bitstream.

Video decoder 200 may be implemented in a similar manner as implemented via logic circuitry 2850 to embody the various modules as discussed with respect to decoder 200 of FIG. 2 and/or any other decoder system or subsystem described herein. In some examples, video decoder 200 implemented via logic circuitry may include an image buffer (e.g., via either processing unit(s) 2820 or memory store(s) 2804)) and a graphics processing unit (e.g., via processing unit(s) 2820). The graphics processing unit may be communicatively coupled to the image buffer. The graphics processing unit may include video decoder 200 as implemented via logic circuitry 2850 to embody the various modules as discussed with respect to FIG. 2 and/or any other decoder system or subsystem described herein.

In some examples, antenna 2802 of video coding system 2800 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition (e.g., data associated with defining bi-tree partitions or k-d tree partitions using a symbol-run coding or codebook technique or the like)). Video coding system 2800 may also include video decoder 200 coupled to antenna 2802 and configured to decode the encoded bitstream.

In an additional example, a decoder system may include a video decoder 200 configured to decode an encoded bitstream. The video decoder 200 may be configured to decode the encoded bitstream to determine first header and overhead data indicating a first shape and first prediction method associated with a first quality restoration filter for a first partition of a reconstructed picture, a first payload of filter coefficient differences associated with the first quality restoration filter, and second header and overhead data indicating a second shape and a second prediction method associated with a second quality restoration filter for a second partition of the reconstructed picture. The video decoder 200 may be configured to determine the first quality restoration filter including a first plurality of filter coefficients based on the first shape, the first prediction method, and the filter coefficient differences. The video decoder 200 may be configured to determine the second quality restoration filter including a second plurality of filter coefficients based on the second shape and the second prediction method, where at least one of the first shape and the second shape or the first plurality of filter coefficients and the second plurality of filter coefficients may be different. The video decoder 200 may be configured to apply the first quality restoration filter to at least a portion of the first partition and the second quality restoration filter to at least a portion of the second partition to generate a final reconstructed picture. The video decoder 200 may be configured to transmit the final reconstructed for presentment via a display device.

In some implementations, a decoder system may further include antenna 2802 communicatively coupled to the video decoder 200 and configured to receive the encoded bitstream of video data. The decoder system may include a display device 2805 configured to present video frames. The video decoder 200 may be further configured to receive the bitstream. The video decoder may be configured to decode the bitstream to determine a no filter flag for a third partition of the reconstructed picture and a no filter slice flag for a second slice of the first partition. To apply the first quality restoration filter to at least a portion of the first partition may include the video decoder being configured to apply the first quality restoration filter to a first slice of the first partition and disable the first quality restoration filter for the second slice of the first partition such that the first quality restoration filter may not be applied to the second slice of the first partition. The video decoder may be configured to apply no filter to the third partition of the reconstructed picture. To determine the first quality restoration filter may include the video decoder being configured to determine prediction coefficients based on the first prediction method. The first prediction method may include at least one of a codebook filter prediction, a codebook with symmetry filter prediction, a historical filter prediction, or a historical with symmetry filter prediction. The video decoder may be configured to add the filter coefficient differences to the prediction coefficients to generate the first plurality of filter coefficients. To determine the second quality restoration filter may include the video decoder being configured to determine second prediction coefficients based on the second prediction method and to use the second prediction coefficients as the second plurality of filter coefficients. The video decoder may be configured to determine a third quality restoration filter for the first partition of the reconstructed picture for chroma. The first quality restoration filter may be for luma. At least one of a shape or filter coefficients may be different between the first and third quality restoration filters. The first quality restoration filter may be partially half symmetric such that at least a portion of the first plurality of coefficients may be half symmetric and a second portion of the first plurality of coefficients may not be half symmetric. The first quality restoration filter being partially half symmetric may include the first quality restoration filter exhibiting at least one of partial point symmetry or partial rotational symmetry. The first quality restoration filter may include a Wiener filter. At least one of the first shape or the second shape may include at least one of a substantially diamond shape or a rectangular shape. The rectangular shape may include the plurality of coefficients being 11 coefficients wide by 9 coefficients high. The diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape. The diamond shape may include at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients. The first quality restoration filter may include a first luma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second luma filter and the shape may include the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape. The first quality restoration filter may include a third luma filter and the shape may include the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape. The first quality restoration filter may include a first chroma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second chroma filter and the shape may include the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape. The first quality restoration filter may include a third chroma filter and the shape may include the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

In some embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 29:
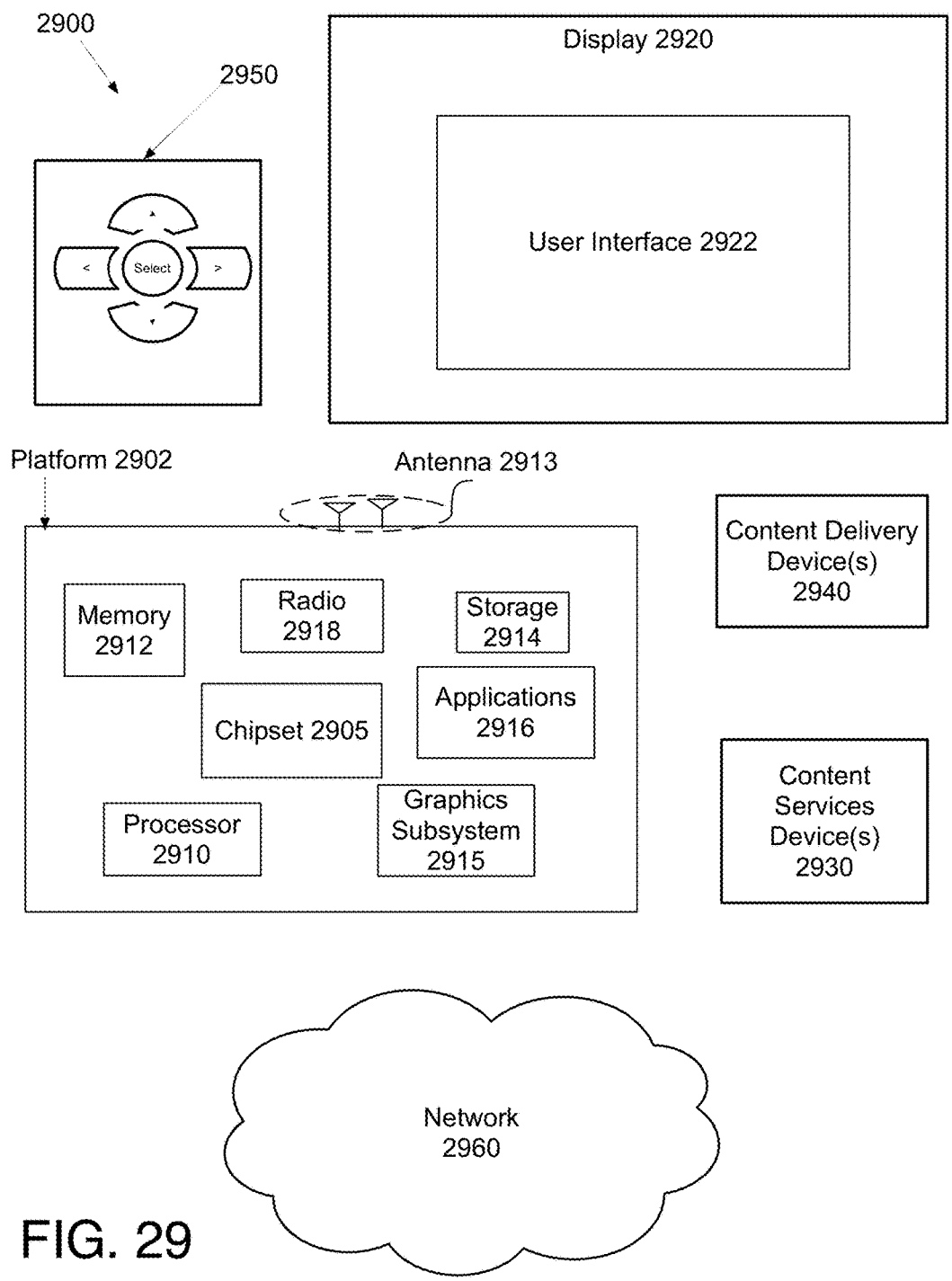
FIG. 29 is an illustrative diagram of an example system.

FIG. 29 is an illustrative diagram of an example system 2900, arranged in accordance with at least some implementations of the present disclosure. In various implementations, system 2900 may be a media system although system 2900 is not limited to this context. For example, system 2900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2900 includes a platform 2902 coupled to a display 2920. Platform 2902 may receive content from a content device such as content services device(s) 2930 or content delivery device(s) 2940 or other similar content sources. A navigation controller 2950 including one or more navigation features may be used to interact with, for example, platform 2902 and/or display 2920. Each of these components is described in greater detail below.

In various implementations, platform 2902 may include any combination of a chipset 2905, processor 2910, memory 2912, antenna 2913, storage 2914, graphics subsystem 2915, applications 2916 and/or radio 2918. Chipset 2905 may provide intercommunication among processor 2910, memory 2912, storage 2914, graphics subsystem 2915, applications 2916 and/or radio 2918. For example, chipset 2905 may include a storage adapter (not depicted) capable of providing intercommunication with storage 2914.

Processor 2910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2910 may be dual-core processor(s), dual-core mobile processor(s), and so forth.

Memory 2912 may be implemented as a volatile memory device such as, but not limited to, a Random Access Memory (RAM), Dynamic Random Access Memory (DRAM), or Static RAM (SRAM).

Storage 2914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2914 may include technology to increase the storage performance enhanced protection for valuable digital media when multiple hard drives are included, for example.

Graphics subsystem 2915 may perform processing of images such as still or video for display. Graphics subsystem 2915 may be a graphics processing unit (GPU) or a visual processing unit (VPU), for example. An analog or digital interface may be used to communicatively couple graphics subsystem 2915 and display 2920. For example, the interface may be any of a High-Definition Multimedia Interface, DisplayPort, wireless HDMI, and/or wireless HD compliant techniques. Graphics subsystem 2915 may be integrated into processor 2910 or chipset 2905. In some implementations, graphics subsystem 2915 may be a stand-alone device communicatively coupled to chipset 2905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2918 may operate in accordance with one or more applicable standards in any version.

In various implementations, display 2920 may include any television type monitor or display. Display 2920 may include, for example, a computer display screen, touch screen display, video monitor, television-like device, and/or a television. Display 2920 may be digital and/or analog. In various implementations, display 2920 may be a holographic display. Also, display 2920 may be a transparent surface that may receive a visual projection. Such projections may convey various forms of information, images, and/or objects. For example, such projections may be a visual overlay for a mobile augmented reality (MAR) application. Under the control of one or more software applications 2916, platform 2902 may display user interface 2922 on display 2920.

In various implementations, content services device(s) 2930 may be hosted by any national, international and/or independent service and thus accessible to platform 2902 via the Internet, for example. Content services device(s) 2930 may be coupled to platform 2902 and/or to display 2920. Platform 2902 and/or content services device(s) 2930 may be coupled to a network 2960 to communicate (e.g., send and/or receive) media information to and from network 2960. Content delivery device(s) 2940 also may be coupled to platform 2902 and/or to display 2920.

In various implementations, content services device(s) 2930 may include a cable television box, personal computer, network, telephone, Internet enabled devices or appliance capable of delivering digital information and/or content, and any other similar device capable of unidirectionally or bidirectionally communicating content between content providers and platform 2902 and/display 2920, via network 2960 or directly. It will be appreciated that the content may be communicated unidirectionally and/or bidirectionally to and from any one of the components in system 2900 and a content provider via network 2960. Examples of content may include any media information including, for example, video, music, medical and gaming information, and so forth.

Content services device(s) 2930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2902 may receive control signals from navigation controller 2950 having one or more navigation features. The navigation features of controller 2950 may be used to interact with user interface 2922, for example. In various embodiments, navigation controller 2950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2950 may be replicated on a display (e.g., display 2920) by movements of a pointer, cursor, focus ring, or other visual indicators displayed on the display. For example, under the control of software applications 2916, the navigation features located on navigation controller 2950 may be mapped to virtual navigation features displayed on user interface 2922. In various embodiments, controller 2950 may not be a separate component but may be integrated into platform 2902 and/or display 2920. The present disclosure, however, is not limited to the elements or in the context shown or described herein.

In various implementations, drivers (not shown) may include technology to enable users to instantly turn on and off platform 2902 like a television with the touch of a button after initial boot-up, when enabled, for example. Program logic may allow platform 2902 to stream content to media adaptors or other content services device(s) 2930 or content delivery device(s) 2940 even when the platform is turned "off" In addition, chipset 2905 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2900 may be integrated. For example, platform 2902 and content services device(s) 2930 may be integrated, or platform 2902 and content delivery device(s) 2940 may be integrated, or platform 2902, content services device(s) 2930, and content delivery device(s) 2940 may be integrated, for example. In various embodiments, platform 2902 and display 2920 may be an integrated unit. Display 2920 and content service device(s) 2930 may be integrated, or display 2920 and content delivery device(s) 2940 may be integrated, for example. These examples are not meant to limit the present disclosure.

In various embodiments, system 2900 may be implemented as a wireless system, a wired system, or a combination of both. When implemented as a wireless system, system 2900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 29.

Figure 30:
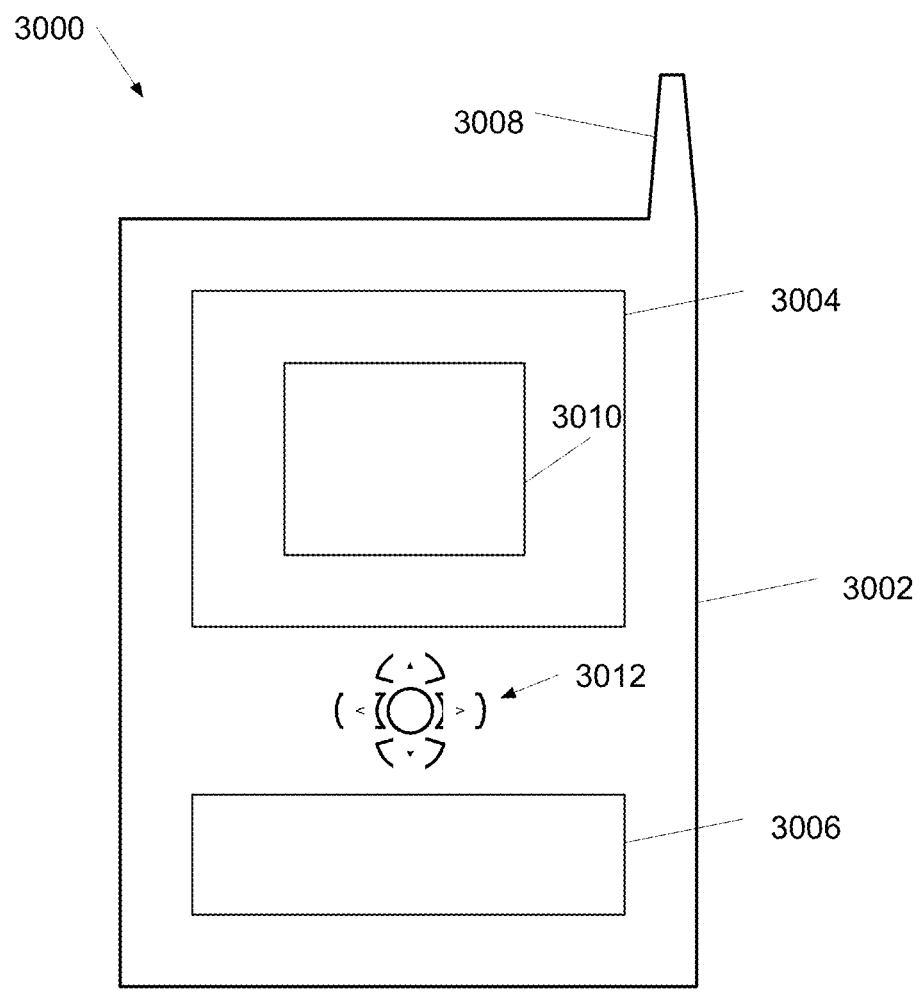
FIG. 30 illustrates an example device, all arranged in accordance with at least some implementations of the present disclosure.

As described above, system 2900 may be embodied in varying physical styles or form factors. FIG. 30 illustrates implementations of a small form factor device 3000 in which system 3000 may be embodied. In various embodiments, for example, device 3000 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 30, device 3000 may include a housing 3002, a display 3004 which may include a user interface 3010, an input/output (I/O) device 3006, and an antenna 3008. Device 3000 also may include navigation features 3012. Display 3004 may include any suitable display unit for displaying information appropriate for a mobile computing device. I/O device 3006 may include any suitable I/O device for entering information into a mobile computing device. Examples for I/O device 3006 may include an alphanumeric keyboard, a numeric keypad, a touch pad, input keys, buttons, switches, rocker switches, microphones, speakers, voice recognition device and software, and so forth. Information also may be entered into device 3000 by way of microphone (not shown). Such information may be digitized by a voice recognition device (not shown). The embodiments are not limited in this context.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include determining, via a quality analyzer and quality restoration filtering module, a first quality restoration filter for a first partition of a reconstructed picture and a second quality restoration filter for a second partition of the reconstructed picture, where at least one of a shape or filter coefficients may be different between the first and second quality restoration filters. The first quality restoration filter may be applied, via the quality analyzer and quality restoration filtering module, to at least a portion of the first partition and the second quality restoration filter to at least a portion of the second partition to generate a final reconstructed picture. The final reconstructed picture may be stored in a picture buffer.

In some implementations, the first quality restoration filter may be partially half symmetric such that at least a portion of a first plurality of coefficients of the first quality restoration filter may be half symmetric and a second portion of the first plurality of coefficients may not be half symmetric.

In some implementations, the first quality restoration filter may have a first shape including at least one of a substantially diamond shape or a rectangular shape.

In some implementations, a computer-implemented method for video coding may further include determining, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition. The determining may be based on a rate distortion optimization. The rate distortion optimization may determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients.

In some implementations, a computer-implemented method for video coding may further include determining, via the quality analyzer and quality restoration filtering module, a third quality restoration filter for the first partition of the reconstructed picture for chroma, where the first quality restoration filter may be for luma. At least one of a shape or filter coefficients may be different between the first and third quality restoration filters.

In some implementations, applying the first quality restoration filter to at least a portion of the first partition may include applying the first quality restoration filter to a first slice of the first partition and disabling the first quality restoration filter for a second slice of the first partition such that the first quality restoration filter may not be applied to the second slice of the first partition.

In some implementations, the first quality restoration filter may include a first shape and a first plurality of filter coefficients including encoder determined coefficients. The computer-implemented method for video coding may further include generating, via the quality analyzer and quality restoration filtering module, filter coefficient differences associated with the first quality restoration filter. The filter coefficient differences may include differences between the encoder determined coefficients and prediction coefficients based on a filter coefficient prediction method including at least one of a codebook filter prediction, a codebook with symmetry filter prediction, a historical filter prediction, or a historical with symmetry filter prediction.

In some implementations, the second quality restoration filter may include a second shape and a second plurality of filter coefficients including codebook determined coefficients. A computer-implemented method for video coding may further include determining, via the quality analyzer and quality restoration filtering module, the codebook determined coefficients for the second quality restoration filter as best match codebook filter coefficients based on second encoder determined coefficients associated with the second quality restoration filter. Determining the best match codebook filter coefficients may include using a 3×3 shape of filter coefficients from a center portion of the second encoder determined coefficients to search an ordered codebook of filters. A first match codebook filter based on the 3×3 shape of filter coefficients may be found. At least two adjacent filters in the ordered codebook to the first match codebook filter may be evaluated to determine the best match codebook filter coefficients from the first match codebook filter and the adjacent filters.

In some implementations, the first quality restoration filter may include a first shape and a first plurality of filter coefficients including encoder determined coefficients. The second quality restoration filter may include a second shape and a second plurality of filter coefficients including codebook determined coefficients. A method for computer-implemented video coding may further include generating, via the quality analyzer and quality restoration filtering module, filter coefficient differences associated with the first quality restoration filter. Filter coefficient differences may include differences between the encoder determined coefficients and prediction coefficients based on a filter coefficient prediction method including at least one of a codebook filter prediction, a codebook with symmetry filter prediction, a historical filter prediction, or a historical with symmetry filter prediction. The codebook determined coefficients may be determined, via the quality analyzer and quality restoration filtering module, for the second quality restoration filter as best match codebook filter coefficients based on second encoder determined coefficients associated with the second quality restoration filter. First header and overhead data may be generated, via the quality analyzer and quality restoration filtering module, indicating the first shape, the filter coefficient prediction method, and a first payload of the filter coefficient differences associated with the first quality restoration filter. A second header had overhead data may be generated, via the quality analyzer and quality restoration filtering module, indicating the second shape, a second prediction method from at least one of a second codebook filter prediction or a second codebook with symmetry filter prediction associated with the second quality restoration filter. The first header and overhead data, the first payload, and the second header and overhead data may be encoded, via an adaptive entropy encoder, into a bitstream. The bitstream may be transmitted.

In some implementations, a computer-implemented method for video coding may further include determining, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition. The determining may be based on a rate distortion optimization. The rate distortion optimization may determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients. The third quality restoration filter may have a shape selected from a plurality of available quality restoration filter shapes. A fourth quality restoration filter may be determined, via the quality analyzer and quality restoration filtering module, for the first partition of the reconstructed picture for chroma. The first quality restoration filter may be for luma. At least one of a shape or filter coefficients may be different between the first and fourth quality restoration filters. Applying the first quality restoration filter to at least a portion of the first partition may include applying the first quality restoration filter to a first slice of the first partition and disabling the first quality restoration filter for a second slice of the first partition such that the first quality restoration filter may not be applied to the second slice of the first partition. The first quality restoration filter may include a first shape and a first plurality of filter coefficients including encoder determined coefficients. The second quality restoration filter may include a second shape and a second plurality of filter coefficients including codebook determined coefficients. The fourth quality restoration filter may include a fourth shape and a fourth plurality of filter coefficients. Filter coefficient differences associated with the first quality restoration filter may be generated, via the quality analyzer and quality restoration filtering module, including differences between the encoder determined coefficients and prediction coefficients based on a filter coefficient prediction method including at least one of a codebook filter prediction, a codebook with symmetry filter prediction, a historical filter prediction, or a historical with symmetry filter prediction. First header and overhead data indicating the first shape, the filter coefficient prediction method, and a first payload of the filter coefficient differences associated with the first quality restoration filter may be generated, via the quality analyzer and quality restoration filtering module. The codebook determined coefficients may be determined, via the quality analyzer and quality restoration filtering module, for the second quality restoration filter as best match codebook filter coefficients based on second encoder determined coefficients associated with the second quality restoration filter. Determining the best match codebook filter coefficients may include using a 3×3 shape of filter coefficients from a center portion of the second encoder determined coefficients to search an ordered codebook of filters, finding a first match codebook filter based on the 3×3 shape of filter coefficients, and evaluating at least two adjacent filters in the ordered codebook to the first match codebook filter to determine the best match codebook filter coefficients from the first match codebook filter and the adjacent filters. A second header and overhead data indicating the second shape, and a second prediction method from at least one of a second codebook filter prediction or a second codebook with symmetry filter prediction associated with the second quality restoration filter may be generated, via the quality analyzer and quality restoration filtering module. A no filter flag for the third partition may be generated, via the quality analyzer and quality restoration filtering module, when no filter may be to be applied to the third partition. A no filter slice flag for the second slice of the first partition may be generated, via the quality analyzer and quality restoration filtering module. The first header and overhead data, the first payload, the second header and overhead data, the no filter flag for the third partition, and the no filter slice flag may be encoded, via an adaptive entropy encoder, into a bitstream. The bitstream may be transmitted. The bitstream may be received. The bitstream may be decoded to determine the first header and overhead data indicating the first shape and the first prediction method, the first payload of filter coefficient differences, the second header and overhead data indicating the second shape and the second prediction method, the no filter flag for the third partition, and the no filter slice flag for the second slice of the first partition. The first quality restoration filter for the first partition of a decoded reconstructed picture and the second quality restoration filter for the second partition of the decoded reconstructed picture based on the decoded first shape, first prediction method, and first payload of filter coefficient differences and the decoded second shape and the second prediction method may be determined, via a decoder quality analyzer and quality restoration filtering module. The first quality restoration filter may be applied, via the decoder quality analyzer and quality restoration filtering module, to at least a portion of the first partition and the second quality restoration filter may be applied, via the decoder quality analyzer and quality restoration filtering module, to at least a portion of the second partition to generate a final decoded reconstructed picture. The final decoded reconstructed picture may be transmitted for presentment via a display device. The first quality restoration filter may be partially half symmetric such that at least a portion of the first plurality of coefficients may be half symmetric and a second portion of the first plurality of coefficients may not be half symmetric. The first quality restoration filter being partially half symmetric may include the first quality restoration filter exhibiting at least one of partial point symmetry or partial rotational symmetry. The first quality restoration filter may include a Wiener filter. At least one of the first shape or the second shape may include at least one of a substantially diamond shape or a rectangular shape. The rectangular shape may include the plurality of coefficients being 11 coefficients wide by 9 coefficients high. The diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape. The diamond shape may include at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients. The first quality restoration filter may include a first luma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second luma filter and the shape may include the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape. The first quality restoration filter may include a third luma filter and the shape may include the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape. The first quality restoration filter may include a first chroma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second chroma filter and the shape may include the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape. The first quality restoration filter may include a third chroma filter and the shape may include the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

In another example, a computer-implemented method for video coding may include determining, via a quality analyzer and quality restoration filtering module, a quality restoration Wiener filter for at least a partition of a reconstructed picture, where the quality restoration Wiener filter may include a shape of a plurality of coefficients. The quality restoration Wiener filter may be partially half symmetric such that at least a portion of the plurality of coefficients may be half symmetric and a second portion of the plurality of coefficients may not be half symmetric. The quality restoration Wiener filter may be applied, via the quality analyzer and quality restoration filtering module, to at least a portion of the partition of the reconstructed picture to generate a final reconstructed picture. The final reconstructed picture may be stored in a picture buffer.

In some implementations, the shape may include a rectangular shape with the plurality of coefficients being 11 coefficients wide by 9 coefficients high.

In some implementations, the shape may include a substantially diamond shape having at least one vacant coefficient location at each corner of a rectangle enclosing the diamond shape.

In some implementations, the quality restoration Wiener filter may include at least one of a luma filter or a chroma filter and the shape may include a substantially diamond shape including the plurality of coefficients having a maximum width of 11 coefficients wide by a maximum height of 9 coefficients high, a total number of the plurality of coefficients being 35 with 22 unique coefficients and 13 symmetric copied coefficients, and sixteen vacant coefficient locations at or extending from each corner of a rectangle enclosing the diamond shape.

In some implementations, the quality restoration Wiener filter may include a luma filter and the shape may include a substantially diamond shape including the plurality of coefficients having a maximum width of 9 coefficients wide by a maximum height of 9 coefficients high, a total number of the plurality of coefficients being 49 with 32 unique coefficients and 17 symmetric copied coefficients, and eight vacant coefficient locations at or extending from each corner of a rectangle enclosing the diamond shape.

In some implementations, the quality restoration Wiener filter may include a luma filter and the shape may include a substantially diamond shape including the plurality of coefficients having a maximum width of 9 coefficients wide by a maximum height of 9 coefficients high, a total number of the plurality of coefficients being 57 with 36 unique coefficients and 21 symmetric copied coefficients, and six vacant coefficient locations at or extending from each corner of a rectangle enclosing the diamond shape.

In some implementations, the quality restoration Wiener filter may include a chroma filter and the shape may include a substantially diamond shape including the plurality of coefficients having a maximum width of 11 coefficients wide by a maximum height of 9 coefficients high, a total number of the plurality of coefficients being 47 with 34 unique coefficients and 13 symmetric copied coefficients, and thirteen vacant coefficient locations at or extending from each corner of a rectangle enclosing the diamond shape.

In some implementations, the quality restoration Wiener filter may include a chroma filter and the shape may include a substantially diamond shape including the plurality of coefficients having a maximum width of 11 coefficients wide by a maximum height of 9 coefficients high, a total number of the plurality of coefficients being 55 with 33 unique coefficients and 22 symmetric copied coefficients, and eleven vacant coefficient locations at or extending from each corner of a rectangle enclosing the diamond shape.

In some implementations, the shape may include at least one of a substantially diamond shape or a rectangular shape, where the rectangular shape may include the plurality of coefficients being 11 coefficients wide by 9 coefficients high. The diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape. The diamond shape may include at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients. The quality restoration Wiener filter may include a first luma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The quality restoration Wiener filter may include a second luma filter and the shape may include the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape. The quality restoration Wiener filter may include a third luma filter and the shape may include the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape. The quality restoration Wiener filter may include a first chroma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The quality restoration Wiener filter may include a second chroma filter and the shape may include the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape. The quality restoration Wiener filter may include a third chroma filter and the shape may include the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape. The quality restoration Wiener filter being partially half symmetric may include the quality restoration Wiener filter exhibiting at least one of partial point symmetry or partial rotational symmetry.

In a further example, a video encoder may include an image buffer and a graphics processing unit communicatively coupled to the image buffer. The graphics processing unit may be configured to determine a first quality restoration filter for a first partition of a reconstructed picture and a second quality restoration filter for a second partition of the reconstructed picture, where at least one of a shape or filter coefficients may be different between the first and second quality restoration filters. The graphics processing unit may be configured to apply the first quality restoration filter to at least a portion of the first partition and the second quality restoration filter to at least a portion of the second partition to generate a final reconstructed picture. The graphics processing unit may be configured to store the final reconstructed picture in a picture buffer.

In some implementations, the first quality restoration filter may be partially half symmetric such that at least a portion of a first plurality of coefficients of the first quality restoration filter may be half symmetric and a second portion of the first plurality of coefficients may not be half symmetric.

In some implementations, the first quality restoration filter may have a first shape including at least one of a substantially diamond shape or a rectangular shape.

In some implementations, the graphics processing unit may be further configured to determine whether to apply no filter to a third partition of the reconstructed picture, to apply a third quality restoration filter with codebook determined coefficients to the third partition, or to apply the third quality restoration filter with encoder determined coefficients to the third partition. The determination may be based on a rate distortion optimization. The rate distortion optimization may include the graphics processing unit being configured to determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients.

In some implementations, the graphics processing unit may be further configured to determine a third quality restoration filter for the first partition of the reconstructed picture for chroma. The first quality restoration filter may be for luma. At least one of a shape or filter coefficients may be different between the first and third quality restoration filters.

In some implementations, to apply the first quality restoration filter to at least a portion of the first partition may include the graphics processing unit being configured to apply the first quality restoration filter to a first slice of the first partition and disable the first quality restoration filter for a second slice of the first partition such that the first quality restoration filter may not be applied to the second slice of the first partition.

In some implementations, the first quality restoration filter may include a first shape and a first plurality of filter coefficients including encoder determined coefficients. The graphics processing unit may be further configured to generate filter coefficient differences associated with the first quality restoration filter, including differences between the encoder determined coefficients and prediction coefficients based on a filter coefficient prediction method including at least one of a codebook filter prediction, a codebook with symmetry filter prediction, a historical filter prediction, or a historical with symmetry filter prediction.

In some implementations, the second quality restoration filter may include a second shape and a second plurality of filter coefficients including codebook determined coefficients. The graphics processing unit may be further configured to determine the codebook determined coefficients for the second quality restoration filter as best match codebook filter coefficients based on second encoder determined coefficients associated with the second quality restoration filter. To determine the best match codebook filter coefficients may include the graphics processing unit being configured to use a 3×3 shape of filter coefficients from a center portion of the second encoder determined coefficients to search an ordered codebook of filters, find a first match codebook filter based on the 3×3 shape of filter coefficients, and evaluate at least two adjacent filters in the ordered codebook to the first match codebook filter to determine the best match codebook filter coefficients from the first match codebook filter and the adjacent filters.

In some implementations, the first quality restoration filter may have a first shape including a substantially diamond shape and the diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape.

In some implementations, the graphics processing unit may be further configured to determine whether to apply no filter to a third partition of the reconstructed picture, to apply a third quality restoration filter with codebook determined coefficients to the third partition, or to apply the third quality restoration filter with encoder determined coefficients to the third partition. The determination may be based on a rate distortion optimization. The rate distortion optimization may include the graphics processing unit being configured to determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients. The third quality restoration filter may have a shape may be selected from a plurality of available quality restoration filter shapes. The graphics processing unit may be configured to determine a fourth quality restoration filter for the first partition of the reconstructed picture for chroma. The first quality restoration filter may be for luma. At least one of a shape or filter coefficients may be different between the first and fourth quality restoration filters. To apply the first quality restoration filter to at least a portion of the first partition may include the graphics processing unit being configured to apply the first quality restoration filter to a first slice of the first partition and disable the first quality restoration filter for a second slice of the first partition such that the first quality restoration filter may not be applied to the second slice of the first partition. The first quality restoration filter may include a first shape and a first plurality of filter coefficients including encoder determined coefficients. The second quality restoration filter may include a second shape and a second plurality of filter coefficients including codebook determined coefficients. The fourth quality restoration filter may include a fourth shape and a fourth plurality of filter coefficients. The graphics processing unit may be configured to generate filter coefficient differences associated with the first quality restoration filter, including differences between the encoder determined coefficients and prediction coefficients based on a filter coefficient prediction method including at least one of a codebook filter prediction, a codebook with symmetry filter prediction, a historical filter prediction, or a historical with symmetry filter prediction. The graphics processing unit may be configured to generate first header and overhead data indicating the first shape, the filter coefficient prediction method, and a first payload of the filter coefficient differences associated with the first quality restoration filter. The graphics processing unit may be configured to determine the codebook determined coefficients for the second quality restoration filter as best match codebook filter coefficients based on second encoder determined coefficients associated with the second quality restoration filter. To determine the best match codebook filter coefficients may include the graphics processing unit being configured to use a 3×3 shape of filter coefficients from a center portion of the second encoder determined coefficients to search an ordered codebook of filters, find a first match codebook filter based on the 3×3 shape of filter coefficients, and evaluate at least two adjacent filters in the ordered codebook to the first match codebook filter to determine the best match codebook filter coefficients from the first match codebook filter and the adjacent filters. The graphics processing unit may be configured to generate a second header and overhead data indicating the second shape, a second prediction method from at least one of a second codebook filter prediction or a second codebook with symmetry filter prediction associated with the second quality restoration filter. The graphics processing unit may be configured to generate, when no filter may be to be applied to the third partition, a no filter flag for the third partition. The graphics processing unit may be configured to generate a no filter slice flag for the second slice of the first partition. The graphics processing unit may be configured to encode the first header and overhead data, the first payload, the second header and overhead data, the no filter flag for the third partition, and the no filter slice flag into a bitstream. The graphics processing unit may be configured to transmit the bitstream.

In an additional example, a decoder system may include a video decoder configured to decode an encoded bitstream. The video decoder may be configured to decode the encoded bitstream to determine first header and overhead data indicating a first shape and first prediction method associated with a first quality restoration filter for a first partition of a reconstructed picture, a first payload of filter coefficient differences associated with the first quality restoration filter, and second header and overhead data indicating a second shape and a second prediction method associated with a second quality restoration filter for a second partition of the reconstructed picture. The video decoder may be configured to determine the first quality restoration filter including a first plurality of filter coefficients based on the first shape, the first prediction method, and the filter coefficient differences. The video decoder may be configured to determine the second quality restoration filter including a second plurality of filter coefficients based on the second shape and the second prediction method, where at least one of the first shape and the second shape or the first plurality of filter coefficients and the second plurality of filter coefficients may be different. The video decoder may be configured to apply the first quality restoration filter to at least a portion of the first partition and the second quality restoration filter to at least a portion of the second partition to generate a final reconstructed picture. The video decoder may be configured to transmit the final reconstructed for presentment via a display device.

In some implementations, a decoder system may further include an antenna communicatively coupled to the video decoder and configured to receive the encoded bitstream of video data and a display device configured to present video frames.

In some implementations, the video decoder may be further configured to determine a third quality restoration filter for the first partition of the reconstructed picture for chroma. The first quality restoration filter may be for luma. At least one of a shape or filter coefficients may be different between the first and third quality restoration filters.

In some implementations, the video decoder may be further configured to decode the bitstream to determine a no filter flag for a third partition of the reconstructed picture and a no filter slice flag for a second slice of the first partition. To apply the first quality restoration filter to at least a portion of the first partition may include the video decoder being configured to apply the first quality restoration filter to a first slice of the first partition and disable the first quality restoration filter for the second slice of the first partition such that the first quality restoration filter may not be applied to the second slice of the first partition.

In some implementations, to determine the first quality restoration filter may include the video decoder being configured to determine prediction coefficients based on the first prediction method and to add the filter coefficient differences to the prediction coefficients to generate the first plurality of filter coefficients. The first prediction method may include at least one of a codebook filter prediction, a codebook with symmetry filter prediction, a historical filter prediction, or a historical with symmetry filter prediction.

In some implementations, to determine the second quality restoration filter may include the video decoder being configured to determine second prediction coefficients based on the second prediction method and to use the second prediction coefficients as the second plurality of filter coefficients.

In some implementations, to determine the first quality restoration filter may include the video decoder being configured to determine prediction coefficients based on the first prediction method. The first prediction method may include at least one of a codebook filter prediction, a codebook with symmetry filter prediction, a historical filter prediction, or a historical with symmetry filter prediction. The video decoder may be configured to add the filter coefficient differences to the prediction coefficients to generate the first plurality of filter coefficients. To determine the second quality restoration filter may include the video decoder being configured to determine second prediction coefficients based on the second prediction method and to use the second prediction coefficients as the second plurality of filter coefficients.

In some implementations, the first quality restoration filter may be partially half symmetric such that at least a portion of a first plurality of coefficients of the first quality restoration filter may be half symmetric and a second portion of the first plurality of coefficients may not be half symmetric.

In some implementations, the first quality restoration filter may have a first shape including at least one of a substantially diamond shape or a rectangular shape.

In some implementations, a decoder system may further include an antenna communicatively coupled to the video decoder and configured to receive the encoded bitstream of video data. The decoder system may include a display device configured to present video frames. The video decoder may be further configured to receive the bitstream. The video decoder may be configured to decode the bitstream to determine a no filter flag for a third partition of the reconstructed picture and a no filter slice flag for a second slice of the first partition. To apply the first quality restoration filter to at least a portion of the first partition may include the video decoder being configured to apply the first quality restoration filter to a first slice of the first partition and disable the first quality restoration filter for the second slice of the first partition such that the first quality restoration filter may not be applied to the second slice of the first partition. The video decoder may be configured to apply no filter to the third partition of the reconstructed picture. To determine the first quality restoration filter may include the video decoder being configured to determine prediction coefficients based on the first prediction method. The first prediction method may include at least one of a codebook filter prediction, a codebook with symmetry filter prediction, a historical filter prediction, or a historical with symmetry filter prediction. The video decoder may be configured to add the filter coefficient differences to the prediction coefficients to generate the first plurality of filter coefficients. To determine the second quality restoration filter may include the video decoder being configured to determine second prediction coefficients based on the second prediction method and to use the second prediction coefficients as the second plurality of filter coefficients. The video decoder may be configured to determine a third quality restoration filter for the first partition of the reconstructed picture for chroma. The first quality restoration filter may be for luma. At least one of a shape or filter coefficients may be different between the first and third quality restoration filters. The first quality restoration filter may be partially half symmetric such that at least a portion of the first plurality of coefficients may be half symmetric and a second portion of the first plurality of coefficients may not be half symmetric. The first quality restoration filter being partially half symmetric may include the first quality restoration filter exhibiting at least one of partial point symmetry or partial rotational symmetry. The first quality restoration filter may include a Wiener filter. At least one of the first shape or the second shape may include at least one of a substantially diamond shape or a rectangular shape. The rectangular shape may include the plurality of coefficients being 11 coefficients wide by 9 coefficients high. The diamond shape may include at least one of the plurality of coefficients having a maximum width of 11 coefficients wide by a maximum height of 9 coefficients high or the plurality of coefficients having a maximum width of 9 coefficients wide by a maximum height of 9 coefficients high. The diamond shape may include at least one vacant coefficient location at each corner of a rectangle enclosing the diamond shape. The diamond shape may include at least one of sixteen, eight, six, thirteen, or eleven vacant coefficient locations at or extending from each corner of the rectangle enclosing the diamond shape. The diamond shape may include at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients. The first quality restoration filter may include a first luma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second luma filter and the shape may include the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape. The first quality restoration filter may include a third luma filter and the shape may include the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape. The first quality restoration filter may include a first chroma filter and the shape may include the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape. The first quality restoration filter may include a second chroma filter and the shape may include the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape. The first quality restoration filter may include a third chroma filter and the shape may include the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

In other implementations described herein, a process for video coding may include determining, via a quality analyzer and quality restoration filtering module, a first quality restoration filter for a first partition of a reconstructed picture and a second quality restoration filter for a second partition of the reconstructed picture. The filter coefficients associated with the first and/or second quality restoration filters may be based on a filter coefficient prediction method including a historical filter prediction. The quality analyzer and quality restoration filtering module, may apply the first quality restoration filter to at least a portion of the first partition and the second quality restoration filter to at least a portion of the second partition to generate a final reconstructed picture. The final reconstructed picture may be stored in a picture buffer.

In some examples, the filter coefficient prediction method may include at least one of a codebook filter prediction, a codebook with symmetry filter prediction, the historical filter prediction, or a historical with symmetry filter prediction. The filter coefficient prediction method may include a prediction of luma quality restoration filter coefficients using a predictor that predicts filter coefficients from the codebook of quality restoration filters. Additionally or alternatively, the filter coefficient prediction method may include a prediction of luma quality restoration filter coefficients using a predictor that predicts filter coefficients from the codebook with symmetry filter prediction. Additionally or alternatively, the filter coefficient prediction method may include a of luma quality restoration filter coefficients using a predictor that predicts filter coefficients from the historical with symmetry filter prediction. Additionally or alternatively, the filter coefficient prediction method may include a prediction of chroma (V) quality restoration filter coefficients using a predictor that predicts filter coefficients from the historical filter prediction coefficients based on recent history of chroma (U) quality restoration filter coefficients. Additionally or alternatively, the filter coefficient prediction method may include a prediction of chroma (V) quality restoration filter coefficients using a predictor that predicts filter coefficients from the historical with symmetry filter prediction based on recent history of chroma (U) quality restoration filter coefficients.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   determining, via a quality analyzer and quality restoration filtering module, a first quality restoration filter for a first partition of a reconstructed picture and a second quality restoration filter for a second partition of the reconstructed picture, wherein at least one of a shape or filter coefficients are different between the first and second quality restoration filters;
   applying, via the quality analyzer and quality restoration filtering module, the first quality restoration filter to at least a portion of the first partition and the second quality restoration filter to at least a portion of the second partition to generate a final reconstructed picture; and
   storing the final reconstructed picture in a picture buffer, wherein the first quality restoration filter is partially half symmetric such that at least a portion of a first plurality coefficients of the first quality restoration filter are non-unique coefficients that are half symmetric and a second portion of the first plurality of coefficients are unique coefficients that are non-symmetric.

2. The method of claim 1, wherein the first quality restoration filter has a first shape comprising at least one of a substantially diamond shape or a rectangular shape.

3. The method of claim 1, further comprising:
   determining, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition, wherein the determining is based on a rate distortion optimization, wherein the rate distortion optimization determines a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients.

4. The method of claim 1, further comprising:
   determining, via the quality analyzer and quality restoration filtering module, a third quality restoration filter for the first partition of the reconstructed picture for chroma, wherein the first quality restoration filter is for luma, and wherein at least one of a shape or filter coefficients are different between the first and third quality restoration filters.

5. The method of claim 1, wherein applying the first quality restoration filter to at least a portion of the first partition comprises applying the first quality restoration filter to a first slice of the first partition and disabling the first quality restoration filter for a second slice of the first partition such that the first quality restoration filter is not applied to the second slice of the first partition.

6. The method of claim 1, wherein the first quality restoration filter comprises a first shape and a first plurality of filter coefficients comprising encoder determined coefficients, and wherein the method further comprises:
   generating, via the quality analyzer and quality restoration filtering module, filter coefficient differences associated with the first quality restoration filter and comprising differences between the encoder determined coefficients and prediction coefficients based on a filter coefficient prediction method comprising at least one of a codebook filter prediction, a codebook with symmetry filter prediction, a historical filter prediction, or a historical with symmetry filter prediction.

7. The method of claim 1, wherein the second quality restoration filter comprises a second shape and a second plurality of filter coefficients comprising codebook determined coefficients, and wherein the method further comprises:
determining, via the quality analyzer and quality restoration filtering module, the codebook determined coefficients for the second quality restoration filter as best match codebook filter coefficients based on second encoder determined coefficients associated with the second quality restoration filter, wherein determining the best match codebook filter coefficients comprises using a 3×3 shape of filter coefficients from a center portion of the second encoder determined coefficients to search an ordered codebook of filters, finding a first match codebook filter based on the 3×3 shape of filter coefficients, and evaluating at least two adjacent filters in the ordered codebook to the first match codebook filter to determine the best match codebook filter coefficients from the first match codebook filter and the adjacent filters.

8. The method of claim 1, wherein the first quality restoration filter comprises a first shape and a first plurality of filter coefficients comprising encoder determined coefficients and wherein the second quality restoration filter comprises a second shape and a second plurality of filter coefficients comprising codebook determined coefficients, and wherein the method further comprises:
generating, via the quality analyzer and quality restoration filtering module, filter coefficient differences associated with the first quality restoration filter and comprising differences between the encoder determined coefficients and prediction coefficients based on a filter coefficient prediction method comprising at least one of a codebook filter prediction, a codebook with symmetry filter prediction, a historical filter prediction, or a historical with symmetry filter prediction;
determining, via the quality analyzer and quality restoration filtering module, the codebook determined coefficients for the second quality restoration filter as best match codebook filter coefficients based on second encoder determined coefficients associated with the second quality restoration filter;
generating, via the quality analyzer and quality restoration filtering module, first header and overhead data indicating the first shape, the filter coefficient prediction method, and a first payload of the filter coefficient differences associated with the first quality restoration filter;
generating, via the quality analyzer and quality restoration filtering module, a second header and overhead data indicating the second shape, a second prediction method from at least one of a second codebook filter prediction or a second codebook with symmetry filter prediction associated with the second quality restoration filter;
encoding, via an adaptive entropy encoder, the first header and overhead data, the first payload and the second header and overhead data into a bitstream; and
transmitting the bitstream.

9. The method of claim 1, further comprising:
determining, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition, wherein the determining is based on a rate distortion optimization, wherein the rate distortion optimization determines a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients, and wherein the third quality restoration filter has a shape selected from a plurality of available quality restoration filter shapes;
determining, via the quality analyzer and quality restoration filtering module, a fourth quality restoration filter for the first partition of the reconstructed picture for chroma, wherein the first quality restoration filter is for luma, and wherein at least one of a shape or filter coefficients are different between the first and fourth quality restoration filters,
wherein applying the first quality restoration filter to at least a portion of the first partition comprises applying the first quality restoration filter to a first slice of the first partition and disabling the first quality restoration filter for a second slice of the first partition such that the first quality restoration filter is not applied to the second slice of the first partition,
wherein the first quality restoration filter comprises a first shape and a first plurality of filter coefficients comprising encoder determined coefficients,
wherein the second quality restoration filter comprises a second shape and a second plurality of filter coefficients comprising codebook determined coefficients, and
wherein the fourth quality restoration filter comprises a fourth shape and a fourth plurality of filter coefficients;
generating, via the quality analyzer and quality restoration filtering module, filter coefficient differences associated with the first quality restoration filter and comprising differences between the encoder determined coefficients and prediction coefficients based on a filter coefficient prediction method comprising at least one of a codebook filter prediction, a codebook with symmetry filter prediction, a historical filter prediction, or a historical with symmetry filter prediction;
generating, via the quality analyzer and quality restoration filtering module, first header and overhead data indicating the first shape, the filter coefficient prediction method, and a first payload of the filter coefficient differences associated with the first quality restoration filter;
determining, via the quality analyzer and quality restoration filtering module, the codebook determined coefficients for the second quality restoration filter as best match codebook filter coefficients based on second encoder determined coefficients associated with the second quality restoration filter, wherein determining the best match codebook filter coefficients comprises using a 3×3 shape of filter coefficients from a center portion of the second encoder determined coefficients to search an ordered codebook of filters, finding a first match codebook filter based on the 3×3 shape of filter coefficients, and evaluating at least two adjacent filters in the ordered codebook to the first match codebook filter to determine the best match codebook filter coefficients from the first match codebook filter and the adjacent filters;

generating, via the quality analyzer and quality restoration filtering module, a second header and overhead data indicating the second shape, a second prediction method from at least one of a second codebook filter prediction or a second codebook with symmetry filter prediction associated with the second quality restoration filter;

generating, via the quality analyzer and quality restoration filtering module and when no filter is to be applied to the third partition, a no filter flag for the third partition;

generating, via the quality analyzer and quality restoration filtering module, a no filter slice flag for the second slice of the first partition;

encoding, via an adaptive entropy encoder, the first header and overhead data, the first payload, the second header and overhead data, the no filter flag for the third partition, and the no filter slice flag into a bitstream;

transmitting the bitstream;

receiving the bitstream;

decoding the bitstream to determine the first header and overhead data indicating the first shape and the first prediction method, the first payload of filter coefficient differences, the second header and overhead data indicating the second shape and the second prediction method, the no filter flag for the third partition, and the no filter slice flag for the second slice of the first partition;

determining, via a decoder quality analyzer and quality restoration filtering module, the first quality restoration filter for the first partition of a decoded reconstructed picture and the second quality restoration filter for the second partition of the decoded reconstructed picture based on the decoded first shape, first prediction method, and first payload of filter coefficient differences and the decoded second shape and the second prediction method;

applying, via the decoder quality analyzer and quality restoration filtering module, the first quality restoration filter to at least a portion of the first partition and the second quality restoration filter to at least a portion of the second partition to generate a final decoded reconstructed picture; and transmitting the final decoded reconstructed picture for presentment via a display device, wherein the first quality restoration filter is partially half symmetric such that at least a portion of the first plurality of coefficients are half symmetric and a second portion of the first plurality of coefficients are not half symmetric, wherein the first quality restoration filter being partially half symmetric comprises the first quality restoration filter exhibiting at least one of partial point symmetry or partial rotational symmetry, wherein the first quality restoration filter comprises a Wiener filter, wherein at least one of the first shape or the second shape comprises at least one of a substantially diamond shape or a rectangular shape, wherein the rectangular shape comprises the plurality of coefficients being 11 coefficients wide by 9 coefficients high, wherein the diamond shape comprises at least one of the plurality of coefficients having a maximum width of 11 coefficients wide by a maximum height of 9 coefficients high or the plurality of coefficients having a maximum width of 9 coefficients wide by a maximum height of 9 coefficients high, wherein the diamond shape comprises at least one vacant coefficient location at each corner of a rectangle enclosing the diamond shape, wherein the diamond shape comprises at least one of sixteen, eight, six, thirteen, or eleven vacant coefficient locations at or extending from each corner of the rectangle enclosing the diamond shape, wherein the diamond shape comprises at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients, wherein the first quality restoration filter comprises a first luma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second luma filter and wherein the shape comprises the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape, wherein the first quality restoration filter comprises a third luma filter and wherein the shape comprises the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape, wherein the first quality restoration filter comprises a first chroma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second chroma filter and wherein the shape comprises the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape, wherein the first quality restoration filter comprises a third chroma filter and wherein the shape comprises the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

10. A computer-implemented method for video coding, comprising:

determining, via a quality analyzer and quality restoration filtering module, a quality restoration Wiener filter for at least a partition of a reconstructed picture, wherein the quality restoration Wiener filter comprises a shape of a plurality of coefficients, wherein the quality restoration Wiener filter is partially half symmetric such that at least a portion of the plurality of coefficients are non-unique coefficients that are half symmetric and a second portion of the plurality of coefficients are unique coefficients that are non-symmetric;

applying, via the quality analyzer and quality restoration filtering module, the quality restoration Wiener filter to at least a portion of the partition of the reconstructed picture to generate a final reconstructed picture; and storing the final reconstructed picture in a picture buffer.

11. The method of claim 10, wherein the shape comprises at least one of a substantially diamond shape or a rectangular shape, wherein the rectangular shape comprises the plurality of coefficients being 11 coefficients wide by 9 coefficients high, wherein the diamond shape comprises at least one of the plurality of coefficients having a maximum width of 11 coefficients wide by a maximum height of 9 coefficients high or the plurality of coefficients having a maximum width of 9 coefficients wide by a maximum height of 9 coefficients high, wherein the diamond shape comprises at least one vacant coefficient location at each corner of a rectangle enclosing the diamond shape, wherein the diamond shape comprises at least one of sixteen, eight, six, thirteen, or eleven vacant coefficient locations at or extending from each corner of the rectangle enclosing the diamond shape, wherein the diamond shape comprises at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients, wherein the quality restoration Wiener filter comprises a first luma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the quality restoration Wiener filter comprises a second luma filter and wherein the shape comprises the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape, wherein the quality restoration Wiener filter comprises a third luma filter and wherein the shape comprises the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape, wherein the quality restoration Wiener filter comprises a first chroma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the quality restoration Wiener filter comprises a second chroma filter and wherein the shape comprises the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape, wherein the quality restoration Wiener filter comprises a third chroma filter and wherein the shape comprises the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape, and wherein the quality restoration Wiener filter being partially half symmetric comprises the quality restoration Wiener filter exhibiting at least one of partial point symmetry or partial rotational symmetry.

12. A video encoder comprising:
an image buffer;
a graphics processing unit communicatively coupled to the image buffer and configured to:
determine a first quality restoration filter for a first partition of a reconstructed picture and a second quality restoration filter for a second partition of the reconstructed picture, wherein at least one of a shape or filter coefficients are different between the first and second quality restoration filters;
apply the first quality restoration filter to at least a portion of the first partition and the second quality restoration filter to at least a portion of the second partition to generate a final reconstructed picture; and
store the final reconstructed picture in a picture buffer, wherein the first quality restoration filter is partially half symmetric such that at least a portion of a first plurality coefficients of the first quality restoration filter are non-unique coefficients that are half symmetric and a second portion of the first plurality of coefficients are unique coefficients that are non-symmetric.

13. The video encoder of claim 12, wherein the first quality restoration filter has a first shape comprising at least one of a substantially diamond shape or a rectangular shape.

14. The video encoder of claim 12, wherein the graphics processing unit is further configured to:
determine whether to apply no filter to a third partition of the reconstructed picture, to apply a third quality restoration filter with codebook determined coefficients to the third partition, or to apply the third quality restoration filter with encoder determined coefficients to the third partition, wherein the determination is based on a rate distortion optimization, wherein the rate distortion optimization comprises the graphics processing unit being configured to determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients.

15. The video encoder of claim 12, wherein the graphics processing unit is further configured to:
determine a third quality restoration filter for the first partition of the reconstructed picture for chroma, wherein the first quality restoration filter is for luma, and wherein at least one of a shape or filter coefficients are different between the first and third quality restoration filters.

16. The video encoder of claim 12, wherein to apply the first quality restoration filter to at least a portion of the first partition comprises the graphics processing unit being configured to apply the first quality restoration filter to a first slice of the first partition and disable the first quality restoration filter for a second slice of the first partition such that the first quality restoration filter is not applied to the second slice of the first partition.

17. The video encoder of claim 12, wherein the first quality restoration filter comprises a first shape and a first plurality of filter coefficients comprising encoder determined coefficients, and wherein the wherein the graphics processing unit is further configured to:
generate filter coefficient differences associated with the first quality restoration filter and comprising differences between the encoder determined coefficients and prediction coefficients based on a filter coefficient prediction method comprising at least one of a codebook filter prediction, a codebook with symmetry filter prediction, a historical filter prediction, or a historical with symmetry filter prediction.

18. The video encoder of claim 12, wherein the second quality restoration filter comprises a second shape and a second plurality of filter coefficients comprising codebook determined coefficients, and wherein the graphics processing unit is further configured to:
determine the codebook determined coefficients for the second quality restoration filter as best match codebook filter coefficients based on second encoder determined coefficients associated with the second quality restoration filter, wherein to determine the best match codebook filter coefficients comprises the graphics processing unit being configured to use a 3×3 shape of filter coefficients from a center portion of the second encoder determined coefficients to search an ordered codebook of filters, find a first match codebook filter based on the 3×3 shape of filter coefficients, and evaluate at least two adjacent filters in the ordered codebook to the first match codebook filter to determine the best match codebook filter coefficients from the first match codebook filter and the adjacent filters.

19. The video encoder of claim 12, wherein the first quality restoration filter has a first shape comprising a substantially diamond shape and wherein the diamond shape comprises at least one of the plurality of coefficients having a maximum width of 11 coefficients wide by a maximum height of 9 coefficients high or the plurality of coefficients having a maximum width of 9 coefficients wide by a maximum height of 9 coefficients high, wherein the diamond shape comprises at least one vacant coefficient location at each corner of a rectangle enclosing the diamond shape, wherein the diamond shape comprises at least one of sixteen, eight, six, thirteen, or eleven vacant coefficient locations at or extending from each corner of the rectangle enclosing the diamond shape.

20. The video encoder of claim 12, wherein the graphics processing unit is further configured to:
determine whether to apply no filter to a third partition of the reconstructed picture, to apply a third quality restoration filter with codebook determined coefficients to the third partition, or to apply the third quality restoration filter with encoder determined coefficients to the third partition, wherein the determination is based on a rate distortion optimization, wherein the rate distortion optimization comprises the graphics processing unit being configured to determine a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients, and wherein the third quality restoration filter has a shape is selected from a plurality of available quality restoration filter shapes;

determine a fourth quality restoration filter for the first partition of the reconstructed picture for chroma, wherein the first quality restoration filter is for luma, and wherein at least one of a shape or filter coefficients are different between the first and fourth quality restoration filters, wherein to apply the first quality restoration filter to at least a portion of the first partition comprises the graphics processing unit being configured to apply the first quality restoration filter to a first slice of the first partition and disable the first quality restoration filter for a second slice of the first partition such that the first quality restoration filter is not applied to the second slice of the first partition, wherein the first quality restoration filter comprises a first shape and a first plurality of filter coefficients comprising encoder determined coefficients, wherein the second quality restoration filter comprises a second shape and a second plurality of filter coefficients comprising codebook determined coefficients, and wherein the fourth quality restoration filter comprises a fourth shape and a fourth plurality of filter coefficients;

generate filter coefficient differences associated with the first quality restoration filter and comprising differences between the encoder determined coefficients and prediction coefficients based on a filter coefficient prediction method comprising at least one of a codebook filter prediction, a codebook with symmetry filter prediction, a historical filter prediction, or a historical with symmetry filter prediction;

generate first header and overhead data indicating the first shape, the filter coefficient prediction method, and a first payload of the filter coefficient differences associated with the first quality restoration filter;

determine the codebook determined coefficients for the second quality restoration filter as best match codebook filter coefficients based on second encoder determined coefficients associated with the second quality restoration filter, wherein to determine the best match codebook filter coefficients comprises the graphics processing unit being configured to use a 3×3 shape of filter coefficients from a center portion of the second encoder determined coefficients to search an ordered codebook of filters, find a first match codebook filter based on the 3×3 shape of filter coefficients, and evaluate at least two adjacent filters in the ordered codebook to the first match codebook filter to determine the best match codebook filter coefficients from the first match codebook filter and the adjacent filters;

generate a second header and overhead data indicating the second shape, a second prediction method from at least one of a second codebook filter prediction or a second codebook with symmetry filter prediction associated with the second quality restoration filter;

generate, when no filter is to be applied to the third partition, a no filter flag for the third partition;

generate a no filter slice flag for the second slice of the first partition;

encode the first header and overhead data, the first payload, the second header and overhead data, the no filter flag for the third partition, and the no filter slice flag into a bitstream; and transmit the bitstream.

21. A decoder system comprising:
a video decoder configured to decode an encoded bitstream, wherein the video decoder is configured to:
decode the encoded bitstream to determine first header and overhead data indicating a first shape and first prediction method associated with a first quality restoration filter for a first partition of a reconstructed picture, a first payload of filter coefficient differences associated with the first quality restoration filter, and second header and overhead data indicating a second shape and a second prediction method associated with a second quality restoration filter for a second partition of the reconstructed picture;

determine the first quality restoration filter comprising a first plurality of filter coefficients based on the first shape, the first prediction method, and the filter coefficient differences;

determine the second quality restoration filter comprising a second plurality of filter coefficients based on the second shape and the second prediction method, wherein at least one of the first shape and the second shape or the first plurality of filter coefficients and the second plurality of filter coefficients are different;

apply the first quality restoration filter to at least a portion of the first partition and the second quality restoration filter to at least a portion of the second partition to generate a final reconstructed picture; and transmit the final reconstructed for presentment via a display device, wherein the first quality restoration filter is partially half symmetric such that at least a portion of a first plurality coefficients of the first quality restoration filter are non-unique coefficients that are half symmetric and a second portion of the first plurality of coefficients are unique coefficients that are non-symmetric.

22. The decoder system of claim 21, further comprising:
an antenna communicatively coupled to the video decoder and configured to receive the encoded bitstream of video data; and
a display device configured to present video frames,
wherein the video decoder is further configured to:
receive the bitstream;
decode the bitstream to determine a no filter flag for a third partition of the reconstructed picture and a no filter slice flag for a second slice of the first partition,
wherein to apply the first quality restoration filter to at least a portion of the first partition comprises the video decoder being configured to apply the first quality restoration filter to a first slice of the first partition and disable the first quality restoration filter for the second slice of the first partition such that the first quality restoration filter is not applied to the second slice of the first partition,
wherein the video decoder is configured to apply no filter to the third partition of the reconstructed picture,
wherein to determine the first quality restoration filter comprises the video decoder being configured to determine prediction coefficients based on the first prediction method, wherein the first prediction method comprises at least one of a codebook filter prediction, a codebook with symmetry filter prediction, a historical filter prediction, or a historical with symmetry filter prediction and add the filter coefficient differences to the prediction coefficients to generate the first plurality of filter coefficients,
wherein to determine the second quality restoration filter comprises the video decoder being configured to determine second prediction coefficients based on the second prediction method, and to use the second prediction coefficients as the second plurality of filter coefficients; and determine a third quality restoration filter for the first partition of the reconstructed picture for chroma, wherein the first quality restoration filter is for luma, and wherein at least one of a shape or filter coefficients are different between the first and third quality restoration filters, wherein the first quality restoration filter being partially half symmetric comprises the first quality restoration filter exhibiting at least one of partial point symmetry or partial rotational symmetry, wherein the first quality restoration filter comprises a Wiener filter, wherein at least one of the first shape or the second shape comprises at least one of a substantially diamond shape or a rectangular shape, wherein the rectangular shape comprises the plurality of coefficients being 11 coefficients wide by 9 coefficients high, wherein the diamond shape comprises at least one of the plurality of coefficients having a maximum width of 11 coefficients wide by a maximum height of 9 coefficients high or the plurality of coefficients having a maximum width of 9 coefficients wide by a maximum height of 9 coefficients high, wherein the diamond shape comprises at least one vacant coefficient location at each corner of a rectangle enclosing the diamond shape, wherein the diamond shape comprises at least one of sixteen, eight, six, thirteen, or eleven vacant coefficient locations at or extending from each corner of the rectangle enclosing the diamond shape, wherein the diamond shape comprises at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients, wherein the first quality restoration filter comprises a first luma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second luma filter and wherein the shape comprises the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape, wherein the first quality restoration filter comprises a third luma filter and wherein the shape comprises the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape, wherein the first quality restoration filter comprises a first chroma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second chroma filter and wherein the shape comprises the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape, wherein the first quality restoration filter comprises a third chroma filter and wherein the shape comprises the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

23. A computer-implemented method for video coding, comprising: determining, via a quality analyzer and quality restoration filtering module, a first quality restoration filter for a first partition of a reconstructed picture and a second quality restoration filter for a second partition of the reconstructed picture, wherein filter coefficients associated with the first and/or second quality restoration filters is based on a filter coefficient prediction method comprising a historical filter prediction; applying, via the quality analyzer and quality restoration filtering module, the first quality restoration filter to at least a portion of the first partition and the second quality restoration filter to at least a portion of the second partition to generate a final reconstructed picture; and storing the final reconstructed picture in a picture buffer, wherein the first quality restoration filter is partially half symmetric such that at least a portion of a first plurality coefficients of the first quality restoration filter are non-unique coefficients that are half symmetric and a second portion of the first plurality of coefficients are unique coefficients that are non-symmetric.

24. The method of claim 23, further comprising: wherein at least one of a shape or filter coefficients are different between the first and second quality restoration filters; determining, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition, wherein the determining is based on a rate distortion optimization, wherein the rate distortion optimization determines a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients, and wherein the third quality restoration filter has a shape selected from a plurality of available quality restoration filter shapes; determining, via the quality analyzer and quality restoration filtering module, a fourth quality restoration filter for the first partition of the reconstructed picture for chroma, wherein the first quality restoration filter is for luma, and wherein at least one of a shape or filter coefficients are different between the first and fourth quality restoration filters, wherein applying the first quality restoration filter to at least a portion of the first partition comprises applying the first quality restoration filter to a first slice of the first partition and disabling the first quality restoration filter for a second slice of the first partition such that the first quality restoration filter is not applied to the second slice of the first partition, wherein the first quality restoration filter comprises a first shape and a first plurality of filter coefficients comprising encoder determined coefficients, wherein the second quality restoration filter comprises a second shape and a second plurality of filter coefficients comprising codebook determined coefficients, and wherein the fourth quality restoration filter comprises a fourth shape and a fourth plurality of filter coefficients; generating, via the quality analyzer and quality restoration filtering module, filter coefficient differences associated with the first quality restoration filter and comprising differences between the encoder determined coefficients and prediction coefficients; wherein the filter coefficient prediction method comprises at least one of a codebook filter prediction, a codebook with symmetry filter prediction, the historical filter prediction, or a historical with symmetry filter prediction, and further comprising: wherein the filter coefficient prediction method comprises a prediction of luma quality restoration filter coefficients using a predictor that predicts filter coefficients from the codebook of quality restoration filters, wherein the filter coefficient prediction method comprises a prediction of luma quality restoration filter coefficients using a predictor that predicts filter coefficients from the codebook with symmetry filter prediction, wherein the filter coefficient prediction method comprises a of luma quality restoration filter coefficients using a predictor that predicts filter coefficients from the historical with symmetry filter prediction, wherein the filter coefficient prediction method comprises a prediction of chroma (V) quality restoration filter coefficients using a predictor that predicts filter coefficients from the historical filter prediction coefficients based on recent history of chroma (U) quality restoration filter coefficients, and wherein the filter coefficient prediction method comprises a prediction of chroma (V) quality restoration filter coefficients using a predictor that predicts filter coefficients from the historical with symmetry filter prediction based on recent history of chroma (U) quality restoration filter coefficients; generating, via the quality analyzer and quality restoration filtering module, first header and overhead data indicating the first shape, the filter coefficient prediction method, and a first payload of the filter coefficient differences associated with the first quality restoration filter; determining, via the quality analyzer and quality restoration filtering module, the codebook determined coefficients for the second quality restoration filter as best match codebook filter coefficients based on second encoder determined coefficients associated with the second quality restoration filter, wherein determining the best match codebook filter coefficients comprises using a 3×3 shape of filter coefficients from a center portion of the second encoder determined coefficients to search an ordered codebook of filters, finding a first match codebook filter based on the 3×3 shape of filter coefficients, and evaluating at least two adjacent filters in the ordered codebook to the first match codebook filter to determine the best match codebook filter coefficients from the first match codebook filter and the adjacent filters; generating, via the quality analyzer and quality restoration filtering module, a second header and overhead data indicating the second shape, a second prediction method from at least one of a second codebook filter prediction or a second codebook with symmetry filter prediction associated with the second quality restoration filter; generating, via the quality analyzer and quality restoration filtering module and when no filter is to be applied to the third partition, a no filter flag for the third partition; generating, via the quality analyzer and quality restoration filtering module, a no filter slice flag for the second slice of the first partition; encoding, via an adaptive entropy encoder, the first header and overhead data, the first payload, the second header and overhead data, the no filter flag for the third partition, and the no filter slice flag into a bitstream; transmitting the bitstream; receiving the bitstream; decoding the bitstream to determine the first header and overhead data indicating the first shape and the first prediction method, the first payload of filter coefficient differences, the second header and overhead data indicating the second shape and the second prediction method, the no filter flag for the third partition, and the no filter slice flag for the second slice of the first partition; determining, via a decoder quality analyzer and quality restoration filtering module, the first quality restoration filter for the first partition of a decoded reconstructed picture and the second quality restoration filter for the second partition of the decoded reconstructed picture based on the decoded first shape, first prediction method, and first payload of filter coefficient differences and the decoded second shape and the second prediction method; applying, via the decoder quality analyzer and quality restoration filtering module, the first quality restoration filter to at least a portion of the first partition and the second quality restoration filter to at least a portion of the second partition to generate a final decoded reconstructed picture; and transmitting the final decoded reconstructed picture for presentment via a display device, wherein the first quality restoration filter being partially half symmetric comprises the first quality restoration filter exhibiting at least one of partial point symmetry or partial rotational symmetry, wherein the first quality restoration filter comprises a Wiener filter, wherein at least one of the first shape or the second shape comprises at least one of a substantially diamond shape or a rectangular shape, wherein the rectangular shape comprises the plurality of coefficients being 11 coefficients wide by 9 coefficients high, wherein the diamond shape comprises at least one of the plurality of coefficients having a maximum width of 11 coefficients wide by a maximum height of 9 coefficients high or the plurality of coefficients having a maximum width of 9 coefficients wide by a maximum height of 9 coefficients high, wherein the diamond shape comprises at least one vacant coefficient location at each corner of a rectangle enclosing the diamond shape, wherein the diamond shape comprises at least one of sixteen, eight, six, thirteen, or eleven vacant coefficient locations at or extending from each corner of the rectangle enclosing the diamond shape, wherein the diamond shape comprises at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients, wherein the first quality restoration filter comprises a first luma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second luma filter and wherein the shape comprises the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape, wherein the first quality restoration filter comprises a third luma filter and wherein the shape comprises the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape, wherein the first quality restoration filter comprises a first chroma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second chroma filter and wherein the shape comprises the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape, wherein the first quality restoration filter comprises a third chroma filter and wherein the shape comprises the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

25. At least one non-transitory machine readable medium comprising a plurality of instructions that in response to being executed on a computing device, cause the computing device to:
   determine, via a quality analyzer and quality restoration filtering module, a first quality restoration filter for a first partition of a reconstructed picture and a second quality restoration filter for a second partition of the reconstructed picture, wherein at least one of a shape or filter coefficients are different between the first and second quality restoration filters;
   apply, via the quality analyzer and quality restoration filtering module, the first quality restoration filter to at least a portion of the first partition and the second quality restoration filter to at least a portion of the second partition to generate a final reconstructed picture; and
   store the final reconstructed picture in a picture buffer,
   wherein the first quality restoration filter is partially half symmetric such that at least a portion of a first plurality coefficients of the first quality restoration filter are non-unique coefficients that are half symmetric and a second portion of the first plurality of coefficients are unique coefficients that are non-symmetric.

26. The machine readable medium of claim 25, further comprising instructions that in response to being executed on the computing device, cause the computing device to:
   determine, via the quality analyzer and quality restoration filtering module, whether to apply no filter to a third partition of the reconstructed picture, to apply a third quality restoration filter with codebook determined coefficients to the third partition, or to apply the third quality restoration filter with encoder determined coefficients to the third partition, wherein the determining is based on a rate distortion optimization, wherein the rate distortion optimization determines a minimum of a no filter rate distortion based on a sum of absolute differences for no filter, a codebook determined coefficients rate distortion based on a total of a sum of absolute differences for codebook determined coefficients and a modified bit cost for codebook determined coefficients, and an encoder determined coefficients rate distortion based on a total of a sum of absolute differences for encoder determined coefficients and a modified bit cost for encoder determined coefficients, and wherein the third quality restoration filter has a shape selected from a plurality of available quality restoration filter shapes;
   determine, via the quality analyzer and quality restoration filtering module, a fourth quality restoration filter for the first partition of the reconstructed picture for chroma, wherein the first quality restoration filter is for luma, and wherein at least one of a shape or filter coefficients are different between the first and fourth quality restoration filters,
   wherein applying the first quality restoration filter to at least a portion of the first partition comprises applying the first quality restoration filter to a first slice of the first partition and disabling the first quality restoration filter for a second slice of the first partition such that the first quality restoration filter is not applied to the second slice of the first partition, wherein the first quality restoration filter comprises a first shape and a first plurality of filter coefficients comprising encoder determined coefficients, wherein the second quality restoration filter comprises a second shape and a second plurality of filter coefficients comprising codebook determined coefficients, and wherein the fourth quality restoration filter comprises a fourth shape and a fourth plurality of filter coefficients;

generate, via the quality analyzer and quality restoration filtering module, filter coefficient differences associated with the first quality restoration filter and comprising differences between the encoder determined coefficients and prediction coefficients based on a filter coefficient prediction method comprising at least one of a codebook filter prediction, a codebook with symmetry filter prediction, a historical filter prediction, or a historical with symmetry filter prediction;

generate, via the quality analyzer and quality restoration filtering module, first header and overhead data indicating the first shape, the filter coefficient prediction method, and a first payload of the filter coefficient differences associated with the first quality restoration filter;

determine, via the quality analyzer and quality restoration filtering module, the codebook determined coefficients for the second quality restoration filter as best match codebook filter coefficients based on second encoder determined coefficients associated with the second quality restoration filter, wherein determining the best match codebook filter coefficients comprises using a 3×3 shape of filter coefficients from a center portion of the second encoder determined coefficients to search an ordered codebook of filters, finding a first match codebook filter based on the 3×3 shape of filter coefficients, and evaluating at least two adjacent filters in the ordered codebook to the first match codebook filter to determine the best match codebook filter coefficients from the first match codebook filter and the adjacent filters;

generate, via the quality analyzer and quality restoration filtering module, a second header and overhead data indicating the second shape, a second prediction method from at least one of a second codebook filter prediction or a second codebook with symmetry filter prediction associated with the second quality restoration filter;

generate, via the quality analyzer and quality restoration filtering module and when no filter is to be applied to the third partition, a no filter flag for the third partition;

generate, via the quality analyzer and quality restoration filtering module, a no filter slice flag for the second slice of the first partition;

encode, via an adaptive entropy encoder, the first header and overhead data, the first payload, the second header and overhead data, the no filter flag for the third partition, and the no filter slice flag into a bitstream;

transmit the bitstream;

receive the bitstream;

decode the bitstream to determine the first header and overhead data indicating the first shape and the first prediction method, the first payload of filter coefficient differences, the second header and overhead data indicating the second shape and the second prediction method, the no filter flag for the third partition, and the no filter slice flag for the second slice of the first partition;

determine, via a decoder quality analyzer and quality restoration filtering module, the first quality restoration filter for the first partition of a decoded reconstructed picture and the second quality restoration filter for the second partition of the decoded reconstructed picture based on the decoded first shape, first prediction method, and first payload of filter coefficient differences and the decoded second shape and the second prediction method;

apply, via the decoder quality analyzer and quality restoration filter module, the first quality restoration filter to at least a portion of the first partition and the second quality restoration filter to at least a portion of the second partition to generate a final decoded reconstructed picture; and transmit the final decoded reconstructed picture for presentment via a display device, wherein the first quality restoration filter being partially half symmetric comprises the first quality restoration filter exhibiting at least one of partial point symmetry or partial rotational symmetry, wherein the first quality restoration filter comprises a Wiener filter, wherein at least one of the first shape or the second shape comprises at least one of a substantially diamond shape or a rectangular shape, wherein the rectangular shape comprises the plurality of coefficients being 11 coefficients wide by 9 coefficients high, wherein the diamond shape comprises at least one of the plurality of coefficients having a maximum width of 11 coefficients wide by a maximum height of 9 coefficients high or the plurality of coefficients having a maximum width of 9 coefficients wide by a maximum height of 9 coefficients high, wherein the diamond shape comprises at least one vacant coefficient location at each corner of a rectangle enclosing the diamond shape, wherein the diamond shape comprises at least one of sixteen, eight, six, thirteen, or eleven vacant coefficient locations at or extending from each corner of the rectangle enclosing the diamond shape, wherein the diamond shape comprises at least one of a total number of the plurality of coefficients being 35 with 22 unique coefficients and 13 symmetric copied coefficients, the total number of the plurality of coefficients being 49 with 32 unique coefficients and 17 symmetric copied coefficients, the total number of the plurality of coefficients being 57 with 36 unique coefficients and 11 symmetric copied coefficients, the total number of the plurality of coefficients being 47 with 34 unique coefficients and 13 symmetric copied coefficients, or the total number of the plurality of coefficients being 55 with 33 unique coefficients and 22 symmetric copied coefficients, wherein the first quality restoration filter comprises a first luma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second luma filter and wherein the shape comprises the substantially diamond shape having the plurality of coefficients having the maximum width of 9 coefficients wide by the maximum height of 9 coefficients high, the total number of the plurality of coefficients being 49 with 32 unique coefficients and 17 symmetric copied coefficients, and eight vacant coefficient locations at or extending from each corner of the rectangle enclosing the diamond shape, wherein the first quality restoration filter comprises a third luma filter and wherein the shape comprises the substantially diamond shape having the plurality of coefficients having the maximum width of 9 coefficients wide by the maximum height of 9 coefficients high, the total number of the plurality of coefficients being 57 with 36 unique coefficients and 21 symmetric copied coefficients, and six vacant coefficient locations at or extending from each corner of the rectangle enclosing the diamond shape, wherein the first quality restoration filter comprises a first chroma filter and wherein the shape comprises the substantially diamond shape having the plurality of coefficients having the maximum width of 11 coefficients wide by the maximum height of 9 coefficients high, the total number of the plurality of coefficients being 35 with 22 unique coefficients and 13 symmetric copied coefficients, and sixteen vacant coefficient locations at or extending from each corner of the rectangle enclosing the diamond shape, wherein the first quality restoration filter comprises a second chroma filter and wherein the shape comprises the substantially diamond shape having the plurality of coefficients having the maximum width of 11 coefficients wide by the maximum height of 9 coefficients high, the total number of the plurality of coefficients being 47 with 34 unique coefficients and 13 symmetric copied coefficients, and thirteen vacant coefficient locations at or extending from each corner of the rectangle enclosing the diamond shape, wherein the first quality restoration filter comprises a third chroma filter and wherein the shape comprises the substantially diamond shape having the plurality of coefficients having the maximum width of 11 coefficients wide by the maximum height of 9 coefficients high, the total number of the plurality of coefficients being 55 with 33 unique coefficients and 22 symmetric copied coefficients, and eleven vacant coefficient locations at or extending from each corner of the rectangle enclosing the diamond shape.

* * * * *